United States Patent
Shmueli et al.

(10) Patent No.: US 12,346,297 B2
(45) Date of Patent: Jul. 1, 2025

(54) DATABASE RECORD LINEAGE AND VECTOR SEARCH

(71) Applicant: Technion Research & Development Foundation Limited, Haifa (IL)

(72) Inventors: Oded Shmueli, Haifa (IL); Michael Leybovich, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 219 days.

(21) Appl. No.: 17/888,560

(22) Filed: Aug. 16, 2022

(65) Prior Publication Data

US 2023/0061341 A1 Mar. 2, 2023

Related U.S. Application Data

(60) Provisional application No. 63/238,167, filed on Aug. 29, 2021.

(51) Int. Cl.
*G06F 16/22* (2019.01)
*G06F 16/2453* (2019.01)
*G06F 16/25* (2019.01)
*G06F 16/28* (2019.01)

(52) U.S. Cl.
CPC .... *G06F 16/2237* (2019.01); *G06F 16/24537* (2019.01); *G06F 16/258* (2019.01); *G06F 16/285* (2019.01)

(58) Field of Classification Search
CPC .................................................. G06F 16/2237
See application file for complete search history.

(56) References Cited

U.S. PATENT DOCUMENTS

| | | | |
|---|---|---|---|
| 8,005,817 B1 * | 8/2011 | Amer-Yahia | G06F 16/835 707/715 |
| 10,255,323 B1 | 4/2019 | Guo et al. | |
| 10,984,030 B2 | 4/2021 | Bordawekar et al. | |
| 2018/0075095 A1 * | 3/2018 | Srivastava | G06F 16/213 |
| 2018/0365579 A1 * | 12/2018 | Wan | G06F 16/3334 |
| 2019/0220471 A1 * | 7/2019 | Mota Toledo | G06F 16/906 |
| 2020/0074274 A1 * | 3/2020 | Fan | G06F 17/18 |

(Continued)

OTHER PUBLICATIONS

Ainy et al. "Approximated Summarization of Data Provenance", Proceedings of the 24th ACM International Conference on Information and Knowledge Management, CIKM '15, Melbourne, Australia, Oct. 19-23, 2015, p. 483-492, Oct. 19, 2015.

(Continued)

*Primary Examiner* — Mohammad S Rostami

(57) ABSTRACT

There is provided a method of computing lineage, comprising: managing a dataset of records, each record associated with set(s) of vectors of real numbers that encode an approximation of lineage of the respective record, the set(s) of vectors computed by an encoding process, obtaining result record(s) in response to executing a query on the dataset, computing set(s) of vectors for the result record(s), searching the set(s) of vectors on the records of the dataset to identify a record associated with a subset of vectors that are statistically similar to the set(s) of vectors for the result record(s), and providing a subset of the records corresponding to the identified subset of records, the subset of the records having a likelihood of contributing to the existence of the result record(s) in response to execution of the query.

24 Claims, 29 Drawing Sheets

(56) References Cited

U.S. PATENT DOCUMENTS

| | | | |
|---|---|---|---|
| 2021/0158918 A1* | 5/2021 | Neumann | G16H 20/60 |
| 2021/0182293 A1* | 6/2021 | Zhang | G06F 16/221 |
| 2021/0192282 A1* | 6/2021 | Goodsitt | G06F 18/2413 |
| 2021/0294780 A1* | 9/2021 | Lifsches | G06F 16/2468 |
| 2021/0326400 A1* | 10/2021 | Qiu | G06F 16/9535 |
| 2022/0012538 A1* | 1/2022 | Mizoguchi | G06N 3/044 |
| 2022/0121636 A1* | 4/2022 | Zheng | G06F 40/284 |
| 2024/0152495 A1* | 5/2024 | Joyce | G06N 5/04 |

OTHER PUBLICATIONS

Almeida et al. "Scalable Bloom Filters", Information Processing Letters, 101(6): 255-261, Available Online Nov. 22, 2006.

Andoni et al. "Practical and Optimal LSH for Angular Distance", Advances in Neural Information Processing Systems, NIPS 2015, 28: 1225-1233, Dec. 7, 2015.

Arora et al. "On Embeddings in Relational Databases", ArXiv Preprint ArXiv:2005.06437v1, p. 1-9, May 13, 2020.

Arya et al. "Approximate Nearest Neighbor Queries in Fixed Dimensions", Proceedings of the Fourth Annual ACM-SIAM Symposium on Discrete Algorithms, SODA '93, Chap.30: 271-280, Jan. 1993.

Bordawekar et al. "Cognitive Database: A Step Towards Endowing Relational Databases With Artificial Intelligence Capabilities", ArXiv Preprint ArXiv:1712.07199v1, p. 1-14, Dec. 19, 2017.

Bordawekar et al. "Enabling Cognitive Intelligence Queries in Relational Databases Using Low-Dimensional Word Embeddings", ArXiv Preprint ArXiv: 1603.07185v1, p. 1-12, Mar. 23, 2016.

Bordawekar et al. "Using Word Embedding to Enable Semantic Queries in Relational Databases", Proceedings of the 1st Workshop on Data Management for End-to-End Machine Learning, DEEM '17, Chicago, IL, USA, May 14, 2017, 5: 1-4, May 14, 2017.

Brecheisen et al. "Efficient Similarity Search on Vector Sets", Datenbanksysteme in Business, Technologie und Web, 11. Fachtagung des GIFachbereichs Datenbanken und Informationssysteme, DBIS, p. 1-19, 2005.

Buneman et al. "Provenance in Databases (Tutorial Outline)", Proceedings of the 2007 ACM SIGMOD International Conference on Management of Data, SIGMOD '07, Beijing, China, Jun. 12-14, 2007, p. 1171-1173, Jun. 12, 2007.

Buneman et al. "Why and Where: A Characterization of Data Provenance", Proceedings of the 8th International Conference on Database Theory, ICDT '01, LNCS 1973: 316-330, Jan. 4, 2001.

Cappuzzo et al. "Creating Embeddings of Heterogeneous Relational Datasets for Data Integration Tasks", Proceedings of the 2020 ACM SIGMOD International Conference on Management of Data, SIGMOD '20, Portland, Oregon, USA, Jun. 14-19, 2020, p. 1335-1349, Jun. 14, 2020.

Cer et al. "Universal Sentence Encoder", ArXiv Preprint ArXiv:1803. 11175v2, p. 1-7, Apr. 12, 2018.

Cui et al. "Tracing the Lineage of View Data in a Warehousing Environment", ACM Transactions on Database Systems, TODS, 25(2): 179-227, Jun. 1, 2000.

Deutch et al. "Circuit for Dialog Provenance", Proceedings of the 17th International Conference on Database Theory, ICDT, Athens, Greece, Mar. 24-28, 2014, p. 201-212, Mar. 24, 2014.

Deutch et al. "Provenance for Natural Language Queries", Proceedings of the VLDB Endowment, 10(5); 577-588, Jan. 1, 2017.

Deutch et al. "Selective Provenance for Datalog Programs Using Top-K Queries", Proceedings of the VLDB Endowment, 8(12): 1394-1405, Aug. 1, 2015.

Devlin et al. "BERT: Pre-Training of Deep Bidirectional Transformers for Language Understanding", Proceedings of the 2019 Conference of the North American Chapter of the Association for Computational Linguistics: Human Language Technologies, Minneapolis, Minnesota, USA, Jun. 2-7, 2019, ArXiv Preprint ArXiv: 1810.04805v2, p. 1-16, May 24, 2019.

Gillick et al. "Multilingual Language Processing From Bytes", ArXiv Preprint ArXiv:1512.00103v2, p. 1-11, Apr. 2, 2016.

Gionis et al. "Similarity Search in High Dimensions Via Hashing", Proceedings of the 25th International Conference on Very Large Data Bases, VLDB' 99, Edinburgh, Scotland, UK, Sep. 7, 1999, 99(6): 518-529, Sep. 7, 1999.

Green et al. "Provenance Semirings", Proceedings of the Twenty-Sixth ACM SIGMOD-SIGACT-SIGART Symposium on Principles of Database Systems, PODS '07, Beijing, China, Jun. 11-13, 2007, p. 31-40, Jun. 11, 2007.

Guenther et al. "Pre-Trained Web Table Embeddings for Table Discovery", Fourth Workshop in Exploiting AI Techniques for Data Management, aiDM'21, Virtual Event, China, Jun. 20-25, 2021, p. 24-31, Jun. 20, 2021.

Guo et al. "Quantization Based Fast Inner Product Search", Proceedings of the 19th International Conference on Artificial Intelligence and Statistics, AISTATS 2016, Cadiz, Spain, May 9-11, 2016, 41: 482-490, May 9, 2016.

Harper et al. "The MovieLens Datasets: History and Context", ACM Transactions on Interactive Intelligent Systems, 5(4): Art.19-1-19-19, Dec. 2015.

Houle et al. "Rank-Based Similarity Search: Reducing the Dimensional Dependence", IEEE Transactions on Pattern Analysis and Machine Intelligence, 37(1): 136-150, Published Online Jul. 25, 2014.

Ives et al. "Dataset Relationship Management", Proceedings of Conference on Innovative Database Systems Research, CIDR '19, Asilomar, CA, USA, Jan. 2019, p. 1-7, Jan. 2019.

Ives et al. "The Orchestra Collaborative Data Sharing System", SIGMOD Recvord, 37(3): 26-32, Sep. 2008.

Jegou et al. "Product Quantization for Nearest Neighbor Search", IEEE Transactions on Pattern Analysis and Machine Intelligence, 33(1): 117-128, Pubished Online Feb. 25, 2010.

Karvounarakis et al. "Querying Data Provenance", Proceedings of the 2010 ACM SIGMOD International Conference on Management of Data, SIGMOD '10, Indianapolis, Indiana, USA, Jun. 6-11, 2010, p. 951-962, Jun. 6, 2010.

Karvounarakis et al. "Semiring-Annotated Data: Queries and Provenance", SIGMOD Record, 41(3): 5-14, Sep. 2012.

Klein et al. "Corpus-Based Induction of Syntactic Structure: Models of Dependency and Constituency", Proceedings of the 42nd Annual Meeting on Association for Computational Linguistics, ACL '04, p. 478-1-478-8, Jul. 21, 2004.

Kretser et al. "A Partnership for Public Health: USDA Branded Food Products Database", Journal of Food Composition and Analysis, 64: 10-12, Dec. 1, 2017.

Lee et al. "Integrating Approximate Summarization With Provenance Capture", Proceedings of the 9th USENIX Conference on Theory and Practice of Provenance, TaPP '17, Seattle, Washington, USA, Jun. 22-23, 2017, p. 2-1-2-6, Jun. 22, 2017.

Lee et al. "Provenance Summaries for Answers and Non-Answers", Proceedings of the VLDB Endowment, 11(12): 1954-1957, Aug. 1, 2018.

Lelarge et al. "Hooks in PostgreSQL", Dalibo, Blog, p. 1-56, Feb. 2012.

Leybovich et al. "Efficient Approximate Search for Sets of Vectors", ArXiv Preprint ArXiv:2107.06817v2, p. 1-8, Aug. 30, 2021.

Leybovich et al. "ML Based Lineage in Databases [Regular Papers]", Proceedings of the 2nd International Workshop on Applied AI for Database Systems and Applications, AIDB '20, Tokyo, Japan, Aug. 31, 2020, p. 1-12, Aug. 31, 2020.

Maas et al. "Learning Word Vectors for Sentiment Analysis", Proceedings of the 49th Annual Meeting of the Association for Computational Linguistics, Portland, Oregon, USA, Jun. 19-24, 2011, p. 142-150, Jun. 19, 2011.

Malkov et al. "Efficient and Robust Approximate Nearest Neighbor Search Using Hierarchical Navigable Small World Graphs", IEEE Transactions on Pattern Analysis and Machine Intelligence, 42(4): 824-836, Published Online Dec. 28, 2018.

Mel'cuk "Dependency Syntax: Theory and Practice", SUNY Series in Linguistics, State University of New York Press, p. 1-430, 1988. (Part 1).

Mel'cuk "Dependency Syntax: Theory and Practice", SUNY Series in Linguistics, State University of New York Press, p. 1-430, 1988. (Part 2).

(56) References Cited

OTHER PUBLICATIONS

Mel'cuk "Dependency Syntax: Theory and Practice", SUNY Series in Linguistics, State University of New York Press, p. 1-430, 1988. (Part 3).

Mel'cuk "Dependency Syntax: Theory and Practice", SUNY Series in Linguistics, State University of New York Press, p. 1-430, 1988. (Part 4).

Mikolov et al. "Distributed Representations of Words and Phrases and Their Compositionality", Proceedings of the 26th International Conference on Neural Information Processing Systems, NIPS '13, 2: 3111-3119, Dec. 5, 2013.

Mikolov et al. "Efficient Estimation of Word Representations in Vector Space", Workshop Track Proceedings of the 1st International Conference on Learning Representations, ICLR 2013, Scottsdale, Arizona, USA, May 2-4, 2013, ArXiv Preprint ArXiv:1301.3781v1, Jan. 16, 2013.

Mikolov et al. "Linguistic Regularities in Continuous Space Word Representations", Proceedings of NAACL-HLT 2013, Atlanta, Georgia, USA, Jun. 9-14, 2013, p. 746-751, Jun. 9, 2013.

Muja et al. "Scalable Nearest Neighbor Algorithms for High Dimensional Data", IEEE Transactions on Pattern Analysis and Machine Intelligence, 36(11): 2227-2240, Published Online Apr. 30, 2014.

Pennington et al. "GloVe: Global Vectors for Word Representation", Proceedings of the 2014 Conference on Empirical Methods in Natural Language Processing, EMNLP '14, Doha, Quatar, Oct. 25-29, 2014, p. 1532-1543, Oct. 25, 2014.

Re et al. "Approximate Lineage for Probabilistic Databases", Proceedings of the VLDB Endowment, PVLSB '08, Auckland, New Zealand, Aug. 23-28, 2008, 1(1): 797-808, Aug. 23, 2008.

Rehurek et al. "Software Framework for Topic Modelling With Large Corpora", Proceedings of the LREC 2010 Workshop on New Challenges for NLP Frameworks, La Valetta, Malta, May 22, 2010, p. 46-50, May 22, 2010.

Senellart "Provenance and Probabilities in Relational Databases: From Theory to Practice", ACM SIGMOD Record, 46(4): 5-15, Dec. 2017.

Senellart et al. "ProvSQL: Provenance and Probability Management in PostgreSQL", Proceedings of the VLDB Endowment, 11(12): 2034-2037, Aug. 2018.

Sugawara et al. "On Approximately Searching for Similar Word Embeddings", Proceedings of the 54th Annual Meeting of the Association for Computational Linguistics, Berlin, Germany, Aug. 7-12, 2016, p. 2265-2275, Aug. 7, 2016.

Wu et al. "Google's Neural Machine Translation System: Bridging the Gap Between Human and Machine Translation", ArXiv Preprint ArXiv:1609.08144v2, p. 1-23, Oct. 8, 2016.

\* cited by examiner

Input: a pre-trained word embeddings model $M$, an input database $D$

Result: calculate an initial lineage vector $v_t$ for every tuple $t$ in $D$ 1 for $t \in D.tuples$ do
2     /* $M$ is a pre-trained word embeddings model and $t$ is a DB tuple */
3     $word\_vectors_t = \{M(w) \mid w \in t\}$;
4     /* An intra and inter-column weighted average over the vectors of every word in $t$ */
5     $v_t = WeightedAverage(word\_vectors_t)$;
6 end

FIG. 3

Hyper-Parameters: *max_vectors* - maximum number of vectors per-tuple

Input: two sets of lineage vectors $LV_1, LV_2$ that represent the lineage of two tuples $t_1$ and $t_2$, respectively

Result: a new set of lineage vectors $LV_3$, that represents $t_1 + t_2$

1  /* Call this algorithm via +($LV_1, LV_2$) or using the infix notation $LV_1 + LV_2$            */
2  $LV_3 = LV_1 \cup LV_2$;
3  if $|LV_3| > $ *max_vectors* then
4     /* Divide the vectors into max_vectors groups using k-means and return the centers            */
5     $LV_3$ = ClusterVectorsUsingKMeans($LV_3$);
6  end

FIG. 4

Hyper-Parameters: *max_vectors* - maximum number of vectors per-tuple

Input: two sets of lineage vectors $LV_1, LV_2$ that represent the lineage of two tuples $t_1$ and $t_2$, respectively

Result: a new set of lineage vectors $LV_3$, that represents $t_1 \cdot t_2$ 1  /* Call this algorithm via $\cdot(LV_1, LV_2)$ or using the infix notation $LV_1 \cdot LV_2$                             */
2  $LV_3 = \{\text{Avg}(v_1, v_2) \mid v_1, v_2 \in \text{CartesianProduct}(LV_1, LV_2)\};$
3  if $|LV_3| > $ *max_vectors* then
4  \quad /* Divide the vectors into max_vectors groups using k-means and return the centers                */
5  \quad $LV_3 = \text{ClusterVectorsUsingKMeans}(LV_3);$
6  end

FIG. 5

Input: two maps of: *columns* → *sets of lineage vectors* $CV_1, CV_2$ that represent the lineage of two tuples $t_1$ and $t_2$, respectively

Result: a new map of: *columns* → *sets of lineage vectors* $CV_3$, that represents $t_1 + t_2$ 1  $CV_3 = \{\} \rightarrow \{\}$;  // an empty map of: columns → sets of lineage vectors
2  foreach *column* $c \in (CV_1.columns \cup CV_2.columns)$ do
3      /* $CV_j.columns$ is the domain and $CV_j[c]$ is the corresponding set of lineage vectors of tuple $t_j$ for the column $c \in CV_j.columns$ */
4      if $c \in (CV_1.columns \cap CV_2.columns)$ then
5          $CV_3[c] = CV_1[c] + CV_2[c]$;  // see Algorithm 2
6      else if $c \in CV_1.columns$ then
7          $CV_3[c] = CV_1[c]$;
8      else
9          $CV_3[c] = CV_2[c]$;
10     end
11 end

FIG. 6

Input: two maps of: *columns* → *sets of lineage vectors* $CV_1, CV_2$ that represent the lineage of two tuples $t_1$ and $t_2$, respectively

Result: a new map of: *columns* → *sets of lineage vectors* $CV_3$, that represents $t_1 \cdot t_2$ 1   $CV_3 = \{\} \rightarrow \{\}$;    // an empty map of: columns → sets of lineage vectors
2   foreach *column* $c \in (CV_1.columns \cup CV_2.columns)$ do
3     /* $CV_i.columns$ is the domain and $CV_i[c]$ is the corresponding set of lineage vectors of tuple $t_i$ for the column $c \in CV_i.columns$    */
4     if $c \in (CV_1.columns \cap CV_2.columns)$ then
5       $CV_3[c] = CV_1[c] \cdot CV_2[c]$;    // see Algorithm 3
6     else if $c \in CV_1.columns$ then
7       $CV_3[c] = CV_1[c]$;
8     else
9       $CV_3[c] = CV_2[c]$;
10    end
11 end

FIG. 7

Let $A$ be a target set of vectors of cardinality $N$, with corresponding $N^2$ long target vectors $\vec{\tau}_{1,1}, ..., \vec{\tau}_{N,N}$. Let us denote the set of all the candidate vector sets (of cardinality $N$) for $A$ by $C_A$.

Definition 5.1. We define $OPT_A = \{V \in C_A \mid \text{sim}(A,V) \text{ is maximal}\}$. That is, $OPT_A$ is a set of the *optimal* candidate vector sets for $A$ with a maximal similarity to $A$.

Definition 5.2. For each $V \in C_A$ we define a set of long target vectors $\mathcal{T}_V = \{\vec{\tau}_{i,j} \mid i,j \in [1,N] \wedge \vec{a}_i \in A \wedge \vec{v}_j \in V \wedge \frac{\vec{a}_i}{\|\vec{a}_i\|} \cdot \frac{\vec{v}_j}{\|\vec{v}_j\|} = max(ps)\}$. Here, $ps$ is the set of pair-wise cosine similarities between a pair of vectors, one taken from set $A$ and one taken from set $V$.

LEMMA 5.1. *Let $V \in C_A$ be a candidate set of vectors for $A$ with a corresponding long candidate vector $\vec{L}_V$. Then, $\forall i,j \in [1,N]$: $\text{sim}(A,V) \geq \vec{\tau}_{i,j} \cdot \vec{L}_V$.*

PROOF. Consider a pair of indices $i, j \in [1, N]$. By definition of set-set similarity (see formula in section 2.2):

$$\text{sim}(A,V) \underset{def.}{=} \frac{w_{max} \cdot max(ps) + w_{avg} \cdot avg(ps)}{w_{max} + w_{avg}} =$$

$$\underset{ps}{=} \frac{w_{max} \cdot max(\{\frac{\vec{a}_k}{\|\vec{a}_k\|} \cdot \frac{\vec{v}_l}{\|\vec{v}_l\|} \mid k,l \in [1,N]\}) + w_{avg} \cdot avg(ps)}{w_{max} + w_{avg}} \geq$$

$$\underset{max}{\geq} \frac{w_{max} \cdot \frac{\vec{a}_i}{\|\vec{a}_i\|} \cdot \frac{\vec{v}_j}{\|\vec{v}_j\|} + w_{avg} \cdot avg(ps)}{w_{max} + w_{avg}} = \vec{\tau}_{i,j} \cdot \vec{L}_V$$

FIG. 8 where the last equality stems from the construction shown in "7." of the process for long vectors construction, LEMMA 5.2. *Let $V \in C_A$ be a candidate set of vectors for $A$ with a corresponding long candidate vector $\vec{L}_V$. Then, $\forall \vec{\tau}_{i,j} \in \mathcal{T}_V : \text{sim}(A, V) = \vec{\tau}_{i,j} \cdot \vec{L}_V$.*

PROOF. Consider a long target vector $\vec{\tau}_{i,j} \in \mathcal{T}_V$.

$$\Rightarrow \text{sim}(A, V) \underset{def.}{=} \frac{w_{max} \cdot max(ps) + w_{avg} \cdot avg(ps)}{w_{max} + w_{avg}} =$$

$$\underset{\text{Definition 5.2}}{=} \frac{w_{max} \cdot \frac{\vec{a}_i}{\|\vec{a}_i\|} \cdot \frac{\vec{v}_j}{\|\vec{v}_j\|} + w_{avg} \cdot avg(ps)}{w_{max} + w_{avg}} = \vec{\tau}_{i,j} \cdot \vec{L}_V$$

where the last equality stems from the construction shown in "7." of the process for long vectors construction.

FIG. 8 CONT.

THEOREM 5.3. *The search method of section 3.2 correctly identifies and outputs a candidate set of vectors $V' \in OPT_A$ (see Definition 5.1) in the final step (5).*

PROOF. We first prove that (∗) there exists an optimal set $\hat{V} \in OPT_A$ such that $\vec{L}_{\hat{V}}$ is discovered in step (4) of section 3.2 when considering some long target vector $\vec{\tau}_{\hat{V}} \in \mathcal{T}_{\hat{V}}$. Then, we conclude that (∗∗) the output in the final step (5) of section 3.2 is an optimal candidate set $V' \in OPT_A$, which is associated with the long candidate vector $\vec{L}_{V'}$.

(∗) Let us assume, by way of contradiction, that none of the optimal sets $V \in OPT_A$ (via its associated long candidate vector $\vec{L}_V$) is discovered in step (4) of section 3.2 when considering any of its respective long target vectors $\vec{\tau}_V \in \mathcal{T}_V$. I.e., for each $V \in OPT_A$ and for each $\vec{\tau}_V \in \mathcal{T}_V$ there is a long candidate vector $\vec{L}_X \in S$ such that $\vec{\tau}_V \cdot \vec{L}_X > \vec{\tau}_V \cdot \vec{L}_V$ ($S$ here is the set of vectors in the search structure).

$$\Rightarrow \operatorname{sim}(A, X) \underset{\text{Lemma 5.1}}{\geq} \vec{\tau}_V \cdot \vec{L}_X > \vec{\tau}_V \cdot \vec{L}_V \underset{\text{Lemma 5.2}}{=} \operatorname{sim}(A, V)$$

$$\Rightarrow \operatorname{sim}(A, X) > \operatorname{sim}(A, V)$$

FIG. 9 which is a contradiction to the maximality of $\text{sim}(A, V)$. Consequently, we deduce that there exists a set $\hat{V} \in OPT_A$ and a long target vector $\vec{\tau}_{\hat{V}} \in \mathcal{T}_{\hat{V}}$ such that $\vec{L}_{\hat{V}}$ is discovered in step (4) of section 3.2 as the closest (dot-product wise) long candidate vector in $S$ to $\vec{\tau}_{\hat{V}}$.

(∗∗) Let us assume, by way of contradiction, that the output in the final step (5) of section 3.2 is *not* an optimal set from $OPT_A$. I.e., in particular, there is a pair of indices $x, y \in [1, N]$, with respective long target and candidate vectors $\vec{\tau}_{x,y}$ and $\vec{L}_{x,y}$, such that $\vec{\tau}_{x,y} \cdot \vec{L}_{x,y} > \vec{\tau}_{\hat{V}} \cdot \vec{L}_{\hat{V}}$. We denote the set of vectors that is associated with $\vec{L}_{x,y}$ as $V_{x,y} \notin OPT_A$.

$$\Rightarrow \text{sim}(A, V_{x,y}) \underset{\text{Lemma 5.1}}{\geq} \vec{\tau}_{x,y} \cdot \vec{L}_{x,y} > \vec{\tau}_{\hat{V}} \cdot \vec{L}_{\hat{V}} \underset{\text{Lemma 5.2}}{=} \text{sim}(A, \hat{V})$$

$$\Rightarrow \text{sim}(A, V_{x,y}) > \text{sim}(A, \hat{V})$$

which is a contradiction to the maximality of $\text{sim}(A, \hat{V})$. Hence, we conclude that some set $V' \in OPT_A$, which is associated with the long candidate vector $\vec{L}_{V'}$, is output in the final step (5) of section 3.2, as required. □

FIG. 9 CONT.

Hyperparameters: $D$ - a constant vector dimension
Data: $S$ - a long-vector search structure
  $M$ - a mapping from long candidate vectors to candidate sets
Input: $A$ - a target vector set $A = \{\vec{a}_1, ..., \vec{a}_{|A|}\}$, $\vec{a}_i \in \mathbb{R}^D$
  $k$ - desired number of closest candidate sets of vectors
Result: $top\_k$ - $k$ closest candidate sets of vectors to $A$, according to our set-oriented similarity formula 1 $\vec{L}_{a_1}, ..., \vec{L}_{a_{|A|}} = \text{set\_to\_long\_vectors}(A)$ ;   // Algorithm 2
2 $k^* = k$;   // initial number of closest long vectors to search in S
3 $closest\_lvs = \{\} \rightarrow \{\}$;   // an empty map of: indices of target long vectors → sets of candidate long vectors
4 foreach $1 \leq i \leq |A|$ do
5 $\quad closest\_lvs[i] = S.find\_closest\_long\_vectors(\vec{L}_{a_i}, k^*)$;
6 end
7 $closest\_lvs\_all = \bigcup_{1 \leq i \leq |A|} closest\_lvs[i]$;
8 // $M(lv)$ is a set
9 $closest\_sets\_all = \{M(lv) \mid lv \in closest\_lvs\_all\}$;
10 $top\_k = closest\_sets\_all.unique\_top(k)$ ;   // by similarity
11 // if identified fewer than $k$ sets
12 if $|top\_k| < k$ then
13 $\quad k^* = k^* \cdot 2$; // here 2 may be replaced with some other hyperparameter > 1
14 $\quad$ go to 3;
15 end
16 return $top\_k$

FIG. 10

Hyperparameters: $w_{avg}, w_{min}$ - user-specified weights, see 5.1
$D$ - a constant vector dimension
$PC$ - a fixed set of possible cardinalities Input: $A$ - a vector set $A = \{\vec{a}_1, ..., \vec{a}_{|A|}\}, \vec{a}_i \in \mathbb{R}^D$
$type$ - indicates whether $A$ is a CANDIDATE or a TARGET set Result: $|PC| \cdot |A|$ long representative vectors $\vec{\alpha}_1^c, ..., \vec{\alpha}_{|A|}^c$ for all $c \in PC$, s.t. $\vec{\alpha}_i^c \in \mathbb{R}^{(|A| \cdot c + 1) \cdot D}$ 1 foreach $c \in PC$ do    // each c is a possible cardinality
2     $\vec{L}_A^c = ()$;                              // an empty vector
3     if $type$ is CANDIDATE then
4         foreach $\vec{a}_i \in A$ do
5             foreach $1 \leq j \leq c$ do
6                 $\vec{L}_A^c$ = concatenate($\vec{L}_A^c, \vec{a}_i$);
7             end
8         end
9     else // type is TARGET
10         foreach $1 \leq j \leq c$ do       // invert loops order
11             foreach $\vec{a}_i \in A$ do
12                 $\vec{L}_A^c$ = concatenate($\vec{L}_A^c, \vec{a}_i$);
13             end
14         end
15     end
16     foreach $\vec{a}_i \in A$ do
17         $\vec{\alpha}_i^c = \dfrac{\text{concatenate}(\sqrt{\frac{w_{avg}}{|A| \cdot c}} \cdot \vec{L}_A^c, \sqrt{w_{min}} \cdot \vec{a}_i)}{\sqrt{w_{avg} + w_{min}}}$ ;
18     end
19 end
20 return $\vec{\alpha}_1^c, ..., \vec{\alpha}_{|A|}^c$ for all $c \in PC$

FIG. 11

| | Target Tuple | Lineage Size | | | | Precision | | | | Recall | |
|---|---|---|---|---|---|---|---|---|---|---|---|
| Provenance Method | manufacturer | Total | L{1} | L{2} | L{3} | $1.00^{Top}$ | $0.75^{Top}$ | $0.50^{Top}$ | $0.25^{Top}$ | L{1} | L{3} |
| 0 Tuple Vectors | red gold | 160 | 63 | 0 | 160 | 0.6 | 0.64 | 0.64 | 0.50 | 0.33 | 0.6 |
| 1 Column Vectors | red gold | 160 | 63 | 0 | 160 | 0.74 | 0.95 | 0.95 | 1 | 0.78 | 0.74 |

FIG. 13

|   | An Analyst's View | | | Hindsight | |
|---|---|---|---|---|---|
|   | Tuple ID | Origin Table | Similarity | Lineage Level(s) | Lineage |
| 0 | $id_1$ | nutrients | 0.95 | 3 | Yes |
| 1 | $id_2$ | products | 0.86 | 1, 3 | Yes |
| 2 | $id_3$ | products | 0.86 | 1, 3 | Yes |
| 3 | $id_4$ | products | 0.86 | 1, 3 | Yes |
| 4 | $id_5$ | products | 0.86 | 1, 3 | Yes |
| 5 | $id_6$ | products | 0.86 | 1, 3 | Yes |
| ⋮ | | ⋮ | | ⋮ | |
| 16 | $id_{17}$ | products | 0.85 | 1, 3 | Yes |
| 17 | $id_{18}$ | products | 0.85 | 1, 3 | Yes |
| 18 | $id_{19}$ | products | 0.85 | 3 | Yes |
| 19 | $id_{20}$ | products | 0.85 | 3 | Yes |

FIG. 14

| | An Analyst's View | | | Hindsight | |
|---|---|---|---|---|---|
| | Tuple ID | Origin Table | Similarity | Lineage Level(s) | Lineage |
| 0 | $id_1$ | products | | 1, 3 | Yes |
| 1 | $id_2$ | products | | 1, 3 | Yes |
| 2 | $id_3$ | products | | 1, 3 | Yes |
| 3 | $id_4$ | products | | 1, 3 | Yes |
| 4 | $id_5$ | products | | 1, 3 | Yes |
| 5 | $id_6$ | serving_size | | 3 | Yes |
| 6 | $id_7$ | products | | 1, 3 | Yes |
| 7 | $id_8$ | products | | 1, 3 | Yes |
| 8 | $id_9$ | products | | 1, 3 | Yes |
| 9 | $id_{10}$ | serving_size | | 3 | Yes |
| 10 | $id_{11}$ | nutrients | | | No |
| 11 | $id_{12}$ | serving_size | | 3 | Yes |
| 12 | $id_{13}$ | serving_size | | 3 | Yes |
| 13 | $id_{14}$ | nutrients | | 3 | Yes |
| 14 | $id_{15}$ | serving_size | | 3 | Yes |
| 15 | $id_{16}$ | products | | 1, 3 | Yes |
| 16 | $id_{17}$ | nutrients | | | No |
| 17 | $id_{18}$ | nutrients | | | No |
| 18 | $id_{19}$ | serving_size | | 3 | Yes |
| 19 | $id_{20}$ | nutrients | | | No |

| | An Analyst's View | | | Hindsight | |
|---|---|---|---|---|---|
| | Tuple ID | Origin Table | Similarity | Lineage Level(s) | Lineage |
| 0 | $id_1$ | sugars | 0.95 | 1 | Yes |
| 1 | $id_2$ | protein | 0.94 | | No |
| 2 | $id_3$ | $exp_2$ | 0.94 | 1 | Yes |
| 3 | $id_4$ | sugars | 0.93 | | No |
| 4 | $id_5$ | unprepared | 0.91 | 2 | Yes |
| 5 | $id_6$ | protein | 0.91 | | No |
| 6 | $id_7$ | sugars | 0.89 | | No |
| 7 | $id_8$ | protein | 0.89 | 2 | Yes |
| 8 | $id_9$ | sugars | 0.89 | | No |
| 9 | $id_{10}$ | unprepared | 0.89 | 2 | Yes |
| 10 | $id_{11}$ | sugars | 0.89 | | No |
| 11 | $id_{12}$ | protein | 0.89 | 2 | Yes |
| 12 | $id_{13}$ | protein | 0.88 | 2 | Yes |
| 13 | $id_{14}$ | protein | 0.86 | 2 | Yes |
| 14 | $id_{15}$ | protein | 0.85 | 2 | Yes |

FIG. 17

| | An Analyst's View | | | Hindsight | |
|---|---|---|---|---|---|
| | Tuple ID | Origin Table | Similarity | Lineage Level(s) | Lineage |
| 0 | $id_1$ | sugars | 0.97 | 1 | Yes |
| 1 | $id_2$ | protein | 0.96 | | No |
| 2 | $id_3$ | unprepared | 0.96 | 2 | Yes |
| 3 | $id_4$ | sugars | | | No |
| 4 | $id_5$ | $exp_2$ | | 1 | Yes |
| 5 | $id_6$ | protein | | | No |
| 6 | $id_7$ | unprepared | | 2 | Yes |
| 7 | $id_8$ | $exp_2$ | | | No |
| 8 | $id_9$ | sugars | | | No |
| 9 | $id_{10}$ | sugars | | | No |
| 10 | $id_{11}$ | sugars | | | No |
| 11 | $id_{12}$ | protein | | 2 | Yes |
| 12 | $id_{13}$ | protein | | 2 | Yes |
| 13 | $id_{14}$ | protein | | 2 | Yes |
| 14 | $id_{15}$ | sugars | | | No |

FIG. 18

| | Target Tuple | | | Lineage Size | | | | | Precision | | | | Recall | | |
|---|---|---|---|---|---|---|---|---|---|---|---|---|---|---|---|
| Provenance Method | manufacturer | name | Total | L{1} | L{2} | L{3} | L{4} | $1.00^{Top}$ | $0.75^{Top}$ | $0.50^{Top}$ | $0.25^{Top}$ | L{1} | L{2} | L{3} | L{4} |
| 0 | Tuple Vectors | campbell soup company | v8 beverage carrot mango | 82 | 2 | 0 | 4 | 80 | 0.2 | 0.19 | 0.24 | 0.29 | | | | 0.18 |
| 1 | | campbell soup company | v8 vfusion beverage peach mango | 82 | 2 | 0 | 4 | 80 | 0.18 | 0.23 | 0.26 | 0.33 | | | | 0.16 |
| 0 | Column Vectors | campbell soup company | v8 beverage carrot mango | 82 | 2 | 0 | 4 | 80 | 0.81 | 0.77 | 0.81 | 0.81 | | | 0.5 | 0.03 |
| 1 | | campbell soup company | v8 vfusion beverage peach mango | 82 | 2 | 0 | 4 | 80 | 0.81 | 0.77 | 0.75 | 0.81 | | | 0.5 | 0.04 |

FIG. 19

| | An Analyst's View | | | Hindsight | |
|---|---|---|---|---|---|
| | Tuple ID | Origin Table | Similarity | Lineage Level(s) | Lineage |
| 0 | $id_1$ | products | 0.99 | 1, 3, 4 | Yes |
| 1 | $id_2$ | products | 0.99 | 1, 3, 4 | Yes |
| 2 | $id_3$ | products | 0.96 | 4 | Yes |
| 3 | $id_4$ | products | 0.95 | | No |
| 4 | $id_5$ | products | 0.95 | 4 | Yes |
| 5 | $id_6$ | products | 0.95 | 4 | Yes |
| ⋮ | ⋮ | ⋮ | | ⋮ | |
| 14 | $id_{15}$ | products | 0.94 | 4 | Yes |
| 15 | $id_{16}$ | products | 0.94 | | No |
| 16 | $id_{17}$ | products | 0.94 | 4 | Yes |
| ⋮ | ⋮ | ⋮ | | ⋮ | |
| 79 | $id_{80}$ | serving_size | 0.91 | 3 | Yes |
| ⋮ | | | | | |
| 82 | $id_{83}$ | serving_size | 0.89 | 3 | Yes |

FIG. 20

| | An Analyst's View | | | Hindsight | |
|---|---|---|---|---|---|
| | Tuple ID | Origin Table | Similarity | Lineage Level(s) | Lineage |
| 0 | $id_1$ | products | 0.97 | 1, 3, 4 | Yes |
| 1 | $id_2$ | products | 0.96 | 1, 3, 4 | Yes |
| 2 | $id_3$ | serving_size | 0.85 | 3 | Yes |
| 3 | $id_4$ | serving_size | 0.84 | 3 | Yes |
| 4 | $id_5$ | nutrients | 0.83 | 4 | Yes |
| 5 | $id_6$ | nutrients | 0.82 | 4 | Yes |
| 6 | $id_7$ | nutrients | 0.82 | | No |
| 7 | $id_8$ | nutrients | 0.81 | | No |
| 8 | $id_9$ | nutrients | 0.81 | | No |
| 9 | $id_{10}$ | nutrients | 0.81 | | No |
| ⋮ | ⋮ | | ⋮ | | |
| 18 | $id_{19}$ | nutrients | 0.5 | | No |
| 19 | $id_{20}$ | nutrients | 0.5 | | No |

FIG. 21

Cosine similarity based Long Vectors - Construction

Target

$$A = \{\vec{a}_1, \vec{a}_2, \vec{a}_3\}$$

$$\vec{a}_{avg} = \frac{\frac{\vec{a}_1}{||\vec{a}_1||} + \frac{\vec{a}_2}{||\vec{a}_2||} + \frac{\vec{a}_3}{||\vec{a}_3||}}{3}$$

Candidate

$$B = \{\vec{b}_1, \vec{b}_2\}$$

$$\vec{b}_{avg} = \frac{\frac{\vec{b}_1}{||\vec{b}_1||} + \frac{\vec{b}_2}{||\vec{b}_2||}}{2}$$

FIG. 24

Cosine similarity based Long Vectors - Construction

Target

$A = \{\vec{a}_1, \vec{a}_2, \vec{a}_3\}$ $$\vec{a}_{avg} = \frac{\frac{\vec{a}_1}{\|\vec{a}_1\|} + \frac{\vec{a}_2}{\|\vec{a}_2\|} + \frac{\vec{a}_3}{\|\vec{a}_3\|}}{3}$$

$$\vec{L}_{a_1} = \frac{\text{concatenate}(\sqrt{w_{avg}} \cdot \vec{a}_{avg}, \sqrt{w_{max}} \cdot \vec{a}_1)}{\sqrt{w_{avg} + w_{max}}}$$

$$\vec{L}_{a_2} = \frac{\text{concatenate}(\sqrt{w_{avg}} \cdot \vec{a}_{avg}, \sqrt{w_{max}} \cdot \vec{a}_2)}{\sqrt{w_{avg} + w_{max}}}$$

$$\vec{L}_{a_3} = \frac{\text{concatenate}(\sqrt{w_{avg}} \cdot \vec{a}_{avg}, \sqrt{w_{max}} \cdot \vec{a}_3)}{\sqrt{w_{avg} + w_{max}}}$$

Candidate

$B = \{\vec{b}_1, \vec{b}_2\}$ $$\vec{b}_{avg} = \frac{\frac{\vec{b}_1}{\|\vec{b}_1\|} + \frac{\vec{b}_2}{\|\vec{b}_2\|}}{2}$$

$$\vec{L}_{b_1} = \frac{\text{concatenate}(\sqrt{w_{avg}} \cdot \vec{b}_{avg}, \sqrt{w_{max}} \cdot \frac{\vec{b}_1}{\|\vec{b}_1\|})}{\sqrt{w_{avg} + w_{max}}}$$

$$\vec{L}_{b_2} = \frac{\text{concatenate}(\sqrt{w_{avg}} \cdot \vec{b}_{avg}, \sqrt{w_{max}} \cdot \frac{\vec{b}_2}{\|\vec{b}_2\|})}{\sqrt{w_{avg} + w_{max}}}$$

FIG. 25

Cosine similarity based Long Vectors - Construction $$\vec{L}_{a_i} \cdot \vec{L}_{b_j} =$$

$$= \frac{w_{avg} \left[ \vec{a}_{avg} \cdot \vec{b}_{avg} \right] + w_{max} \cdot \boxed{\frac{\vec{a}_i}{\|\vec{a}_i\|} \cdot \frac{\vec{b}_j}{\|\vec{b}_j\|}}}{w_{avg} + w_{max}}$$

$$= \frac{w_{avg} \cdot \left[ \left( \frac{1}{|A|} \cdot \sum_{\vec{a}_i \in A} \frac{\vec{a}_i}{\|\vec{a}_i\|} \right) \cdot \left( \frac{1}{|B|} \cdot \sum_{\vec{b}_j \in B} \frac{\vec{b}_j}{\|\vec{b}_j\|} \right) \right] + w_{max} \cdot \frac{\vec{a}_i \cdot \vec{b}_j}{\|\vec{a}_i\| \cdot \|\vec{b}_j\|}}{w_{avg} + w_{max}}$$

$$= \frac{w_{avg} \cdot \boxed{\frac{\sum_{\vec{a}_i \in A, \vec{b}_j \in B} \frac{\vec{a}_i \cdot \vec{b}_j}{\|\vec{a}_i\| \cdot \|\vec{b}_j\|}}{|A| \cdot |B|}} + w_{max} \cdot \frac{\vec{a}_i \cdot \vec{b}_j}{\|\vec{a}_i\| \cdot \|\vec{b}_j\|}}{w_{avg} + w_{max}}$$

$$= \frac{w_{avg} \cdot \boxed{avg(ps)} + w_{max} \cdot \frac{\vec{a}_i \cdot \vec{b}_j}{\|\vec{a}_i\| \cdot \|\vec{b}_j\|}}{w_{avg} + w_{max}}$$

FIG. 26

Hyperparameters: $w_{avg}$, $w_{max}$ - user-specified weights,
$D$ - a constant vector dimension
Input: a vector set $A = \{\vec{a}_1, ..., \vec{a}_{|A|}\}, \vec{a}_i \in \mathbb{R}^D$
Result: $|A|$ long representative vectors $\vec{L}_{a_1}, ..., \vec{L}_{a_{|A|}} \in \mathbb{R}^{2 \cdot D}$ 1   $\vec{a}_{avg} = \frac{1}{|A|} \cdot \sum_{\vec{a}_i \in A} \frac{\vec{a}_i}{\|\vec{a}_i\|}$;
2   foreach $\vec{a}_i \in A$ do
3     $\vec{L}_{a_i} = \frac{\text{concatenate}(\sqrt{w_{avg}} \cdot \vec{a}_{avg}, \sqrt{w_{max}} \cdot \frac{\vec{a}_i}{\|\vec{a}_i\|})}{\sqrt{w_{avg} + w_{max}}}$ ;
4   end
5   return $\vec{L}_{a_1}, ..., \vec{L}_{a_{|A|}}$

FIG. 27

DATABASE RECORD LINEAGE AND VECTOR SEARCH

RELATED APPLICATION

This application claims the benefit of priority of U.S. Provisional Patent Application No. 63/238,167 filed on Aug. 29, 2021, the contents of which are incorporated herein by reference in their entirety.

FIELD AND BACKGROUND OF THE INVENTION

The present invention, in some embodiments thereof, relates to databases and/or searches and, more specifically, but not exclusively, to systems and methods for estimating lineage of database records and/or searching sets of vectors.

SUMMARY OF THE INVENTION

According to a first aspect, a computer implemented method of computing lineage for a query for execution on a dataset, comprises: managing a dataset of a plurality of records, each record associated with at least one set of vectors of real numbers that encode an approximation of lineage of the respective record, the at least one set of vectors computed by an encoding process, obtaining at least one result record in response to executing a query on the dataset, computing at least one set of vectors for the at least one result record, searching the at least one set of vectors on the plurality of records of the dataset to identify a record associated with a subset of vectors that are statistically similar to the at least one set of vectors for the at least one result record, and providing a subset of the plurality of records corresponding to the identified subset of records, the subset of the plurality of records having a likelihood of contributing to the existence of the at least one result record in response to execution of the query.

In a further implementation form of the first aspect, further comprising: converting, for each dataset record, the at least one set of vectors to a single long vector, converting the at least one set of vectors computed for the at least one result record to a single long vector, wherein searching comprises searching a plurality of single long vector of the plurality of records to identify a subset of long vectors associated with the plurality of records such that each long vector is statistically similar to the single long vector computed for the at least one result record.

In a further implementation form of the first aspect, the query comprises insertion of a new record into the dataset, computing comprises computing at least one set of vectors for the new record formed by an encoding process, annotating the new record with the at least one set of vectors computed for the new record, and inserting the annotated new record into the dataset.

In a further implementation form of the first aspect, the query comprises at least one operation executed on the plurality of records to generate at least one result record, computing comprises computing the at least one set of vectors for the at least one result record by executing the at least one operation on the at least one set of vectors of the plurality of dataset records according to the query.

In a further implementation form of the first aspect, the at least one operation comprises an OR operator indicating alternative use of data, and computing the at least one set of vectors for the at least one result record comprises computation of a lineage embedding of two records using the OR operator.

In a further implementation form of the first aspect, the lineage embedding of two records using the OR operator is computed by: computing a union vector set by a union operation between the at least one set of vectors of the first record and the at least one set of vectors of the second record, when the number of vector members of the union vector set is greater than a maximum allowed number of vectors, clustering the vector members of the union vector set into clusters, wherein the number of clusters is set according to the maximum allowed number of vectors, and setting the lineage embedding as at least one set of vectors that includes vectors of centroids of the clusters, wherein the number of vectors of centroids matches the maximum allowed number of vectors.

In a further implementation form of the first aspect, the at least one operation comprises an AND operator indicating joint use of data, and computing the at least one set of vectors for the at least one new record comprises computation of a lineage embedding of two records using the AND operator.

In a further implementation form of the first aspect, the lineage embedding of two records using the AND operator is computed by: computing a Cartesian product of the at least one set of vectors of the first record and the at least one set of vectors of the second record, to obtain a set of pairs of vectors, computing a respective average vector for each pair of vectors of the Cartesian product, and setting the lineage embedding as at least one set of vectors that includes a plurality of average vectors.

In a further implementation form of the first aspect, the at least one set of vectors for each of the plurality of records of the dataset is computed by: obtaining a corpus of the dataset, converting words of records of the corpus into a single text unit, and training a word embedding model on the single text unit, wherein the encoding process comprises the word embedding model that is trained.

In a further implementation form of the first aspect, further comprising: for each respective record: feeding each of a plurality of words of the respective record into the word embedding model to obtain a plurality of word vectors, computing an intra and inter-field weighted average over the word vectors of each word of the respective record, and setting the at least one set of vectors as the intra and inter-field weighted average.

In a further implementation form of the first aspect, each column of each record is associated with at least one set of vectors.

In a further implementation form of the first aspect, further comprising verifying the subset of the plurality of records, by applying the query to the subset of the plurality of records in the identified subset of records, the subset of the plurality of records having a likelihood of contributing to the existence of the at least one result record in response to execution of the query.

In a further implementation form of the first aspect, a respective record of the plurality of dataset records is associated with a respective timestamp indicating when the respective record was created, and further comprising at least one of: (i) filtering out from the identified subset of records, records which are non-lineage records according to their later timestamps, and (ii) filtering out, from the identified subset of records, records which fall outside the target time interval from the searching.

In a further implementation form of the first aspect, further comprising: analyzing the query to identify at least one column of interest, and wherein the searching is performed by assigning larger weights to records having the at least one column of interest.

In a further implementation form of the first aspect, further comprising: storing for each respective record, at least one previous query where the respective record was involved in the evaluation of the at least one previous query and/or where the at least one previous query inserted the respective record, and using the stored at least one previous query for filtering out records that are similar to the identified subset of records but that were not involved in the evaluation of the query.

In a further implementation form of the first aspect, further comprising: tracking dependencies between queries in a directed acyclic graph (DAG) structure, wherein during searching, weights assigned to the identified subset of records are inversely proportional to a distance on the DAG between the query and other queries that created records corresponding to the identified subset.

In a further implementation form of the first aspect, the searching is performed by balancing a minimum squared Euclidean distance between a vector from the set of vectors associated with a record of the dataset and a vector from the set of vectors associated with the at least one result record, and an average of squared Euclidean distances for pairs of vectors including one vector from the set of vectors associated with a record of the dataset and one vector from the set of vectors associated with the at least one result record.

In a further implementation form of the first aspect, the searching is performed by balancing between a maximum cosine similarity between a vector from the set of vectors associated with a record of the dataset and a vector from the set of vectors associated with the at least one result record, and an average of pair-wise cosine similarities for pairs of vectors including one vector from the set of vectors associated with a record of the dataset and one vector from the set of vectors associated with the at least one result record.

According to a second aspect, a method of searching a dataset, comprises: accessing a search query comprising at least one set of vectors for searching on a dataset of a plurality of records, each record including at least one set of vectors, converting, for each record, the at least one set of vectors to single long vector, converting the at least one set of vectors computed for the query's at least one output record to a single long vector, searching a plurality of single long vectors of the plurality of records to identify a subset in which each vector is statistically similar to the single long vector computed for the query, and providing the at least one set of vectors and the associated records of the identified subset being statistically similar to the at least one set of vectors of the search query.

In a further implementation form of the second aspect, each one of the vectors of a set of vectors is of a same dimension, and a dot product between a first single long vector computed from a first set of vectors and a second single long vector computed from a second set of vectors computes similarities between two sets corresponding to the first set of vectors and the second set of vectors.

In a further implementation form of the second aspect, each single long vector includes a first component used for computation of the average of pair-wise similarities between the two sets and a second component used for computation of the maximum of the pair-wise similarities used for the searching.

In a further implementation form of the second aspect, the pair-wise similarities is at least one of: (i) balancing a minimum squared Euclidean distance between a single long vector of the dataset and the single long vector of the at least one output record, and an average of squared Euclidean distances for pairs of single long vectors including one single long vector from the dataset and one single long vector from the at least one output record, and (ii) balancing between a maximum cosine similarity amongst pairs of single long vectors of the dataset, including one single long vector from the dataset and one single long vector from the at least one output record, and an average of the pair-wise cosine similarities between the pairs of single long vectors.

In a further implementation form of the second aspect, further comprising normalizing vectors in each set of vectors.

In a further implementation form of the second aspect, each one of the vectors of one set of vectors is of a same dimension, and wherein the single long vector is created by concatenating a number of copies of each normalized one of the vectors of the one set of vectors, where the number of copies equals the number of vectors in the one set of vectors, wherein each vectors that is concatenated is a normalized vector of the one set of vectors repeated a number of times equal to the number of vectors.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is a pseudocode for initialization of lineage vectors of records, in accordance with some embodiments of the present invention;

FIG. 4 is a pseudocode for performing an addition operation between lineage vectors, in accordance with some embodiments of the present invention;

FIG. 5 is a pseudocode for performing a multiplication operation between lineage vectors, in accordance with some embodiments of the present invention;

FIG. 6 is a pseudocode for computing addition of column lineage vectors, in accordance with some embodiments of the present invention;

FIG. 7 is a pseudocode for computing multiplication of column lineage vectors, in accordance with some embodiments of the present invention;

FIG. 8 is an exemplary proof of correctness of constant cardinality of sets of vectors, in accordance with some embodiments of the present invention;

FIG. 9 is another exemplary proof of correctness of constant cardinality of sets of vectors, in accordance with some embodiments of the present invention;

FIG. 10 is a pseudocode for another exemplary search approach for searching using long vectors created from sets of vectors, in accordance with some embodiments of the present invention;

FIG. 11 is a pseudocode of another exemplary approach for converting a set of vectors to a single long vector, in accordance with some embodiments of the present invention;

FIG. 13 is a table presenting results of Experiment 1, in accordance with some embodiments of the present invention;

FIG. 14 is another table presenting results of Experiment 1, for the querying of lineage for the tuple red gold vs. related base tables with column vectors, including an analyst's view, in accordance with some embodiments of the present invention;

FIG. 15 is another table presenting results of Experiment 1, for the querying of lineage for the tuple red gold vs. related base tables with tuple vectors, including an analyst's view, in accordance with some embodiments of the present invention;

FIG. 16 is a table of experimental results for Experiment 2, in accordance with some embodiments of the present invention;

FIG. 17 is another table of experimental results for Experiment 2, for the querying of lineage for the result tuple No. 2 vs. related materialized views with column vectors, including an analyst's view, in accordance with some embodiments of the present invention;

FIG. 18 is another table of experimental results for Experiment 2, for the querying of lineage for the result tuple No. 2 vs. related materialized views with tuple vectors, including an analyst's view, in accordance with some embodiments of the present invention;

FIG. 19 is a table of experimental results for Experiment 3, in accordance with some embodiments of the present invention;

FIG. 20 is another table of experimental results for Experiment 3, for the querying of lineage for the result tuple No. 0 vs. related base tables with column vectors, including an analyst's view, in accordance with some embodiments of the present invention;

FIG. 21 is another table of experimental results for Experiment 3, for the querying of lineage for the result tuple No. 0 vs. related base tables with tuple vectors, including an analyst's view, in accordance with some embodiments of the present invention;

FIG. 24 displays the construction of the average vectors for set A (target) and B (candidate), in accordance with some embodiments of the present invention;

FIG. 25 displays the construction of long vectors obtained by concatenating a copy of the average vector of A with each vector of A, multiplied by appropriate weighting parameters, and similarly for set B, in accordance with some embodiments of the present invention;

FIG. 26 presents a calculation showing that the dot product between the constructed long target and candidate vectors properly computes the similarity measure, assuming that the maximum similarity is realized by the vectors $\vec{a}_i$ and $\vec{b}_j$, in accordance with some embodiments of the present invention; and FIG. 27 is a pseudocode for an exemplary approach for construction of long vectors, in accordance with some embodiments of the present invention.

DESCRIPTION OF SPECIFIC EMBODIMENTS OF THE INVENTION

Figure 1:
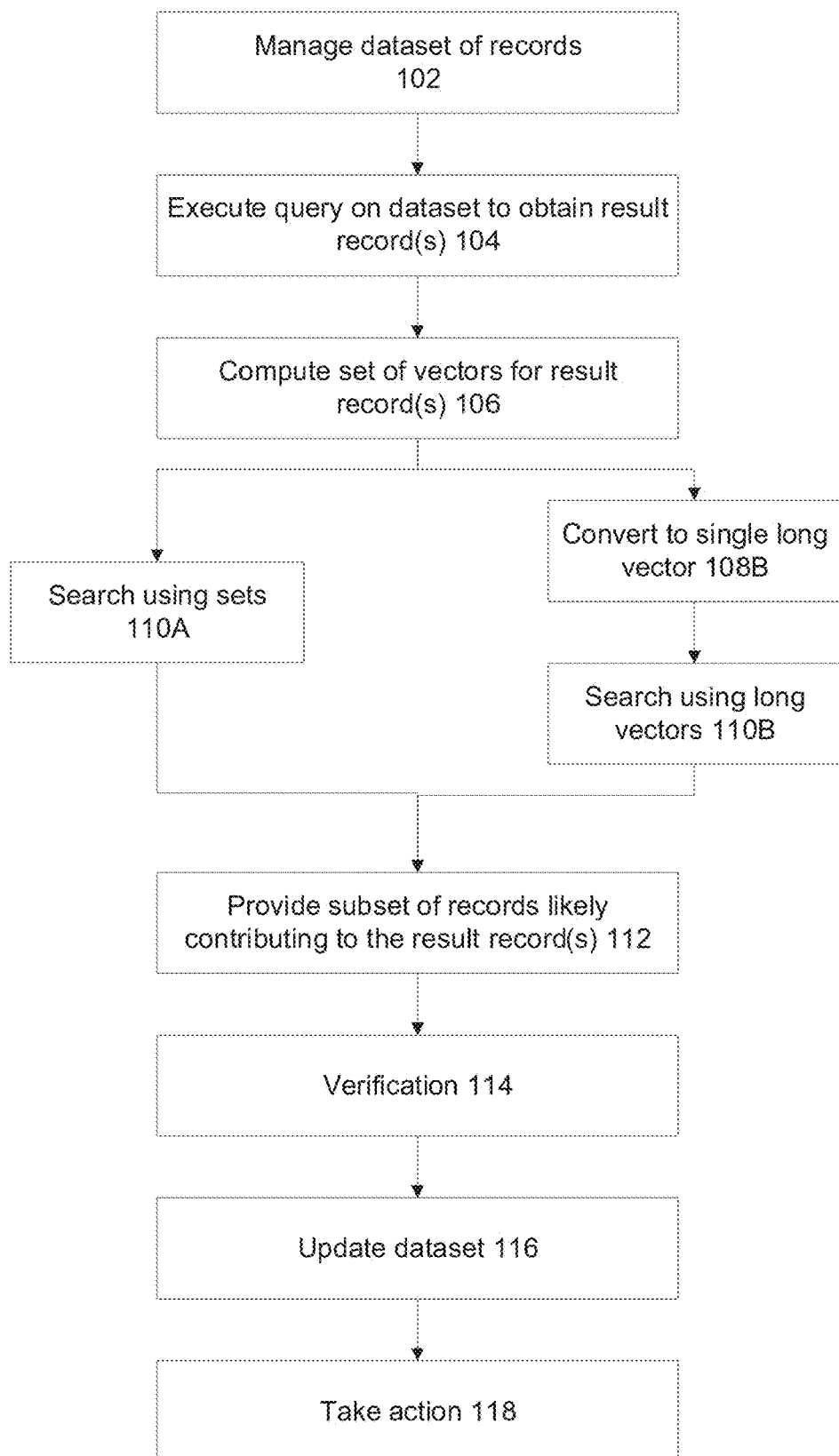
FIG. 1 is a flowchart of a method of computing lineage for a query for execution on a dataset, optionally by converting each set of vectors to a single long vector, in accordance with some embodiments of the present invention.

The present invention, in some embodiments thereof, relates to databases and/or searches and, more specifically, but not exclusively, to systems and methods for estimating lineage of database records and/or searching sets of vectors.

As used herein, the term tuple and record are used interchangeably.

An aspect of some embodiments of the present invention relate to systems, methods, computing devices, and/or code (stored on a data storage device and executable by one or more processors) for computing lineage for a query for execution on a dataset. The dataset includes multiple records, each record is associated with one or more sets of vectors of real numbers that encode an approximation of lineage of the respective record. The set of vectors is computed by an encoding process, for example, a trained machine learning model such as a neural network. One or more result records are obtained in response to executing a query on the dataset. Set(s) of vectors are computed for result record(s) using the encoding process. Given the set(s) of vectors computed for the result (target) tuples, a search is performed for a closest set(s) of vectors among the sets of vectors of records of the dataset. The search is performed to identify a subset of records of the dataset whose sets of vectors are statistically similar to the set of vectors computed for the result record. The subset of records represents records having a likelihood of contributing to the existence of the result record(s) in response to execution of the query.

Optionally, for each record of the dataset, the set(s) of vectors is converted to a single long vector. The set(s) of vectors computed for the result record is converted to a single long vector. The searching may be done by searching the single long vector representing the result record(s) on the single long vectors representing the records, to identify a subset of single long vectors. Each long vector of the subset is statistically similar to the single long vector representing the result record.

An aspect of some embodiments of the present invention relate to systems, methods, computing devices, and/or code (stored on a data storage device and executable by one or more processors) for searching a dataset of records, where each record includes one or more sets of vectors. For each record, the set(s) of vectors are converted to a single long vector. A query is executed on the dataset of records to obtain one or more output records. The set(s) of vectors of the output record are converted to a single long vector. The single long vector obtained from the query is searched on the single long vectors of the records of the dataset, to identify a subset in which each vector is statistically similar to the single long vector computed for the query. The set(s) of vectors and the associated records of the identified subset, which are statistically similar to the vectors of the search query, are provided.

Optionally, each single long vector includes a first component used for computation of the average of pair-wise similarities between the two sets and a second component used for computation of the maximum of the pair-wise similarities used for the searching. The pair-wise similarities is at least one of: (i) balancing a minimum squared Euclidean distance between a single long vector of the dataset and the single long vector of the output record(s), and an average of squared Euclidean distances for pairs of single long vectors including one single long vector from the dataset and one single long vector from the output record(s), and (ii) balancing between a maximum cosine similarity amongst pairs of single long vectors of the dataset, including one single long vector from the dataset and one single long vector from the output record(s), and an average pair-wise similarity between the pairs of single long vectors.

The length of a vector is the square root of the sum of the squares of its components. Normalizing a vector is computed by dividing each of the vector's components by its length.

Optionally, vectors in each set of vectors are normalized prior to constructing cosine-based long vectors. The normalization is required for the dot product between long vectors to be able to compute the correct pairwise cosine similarities. In contrast, if not normalization is performed, the dot product between two cosine-based long vectors computes pairwise dot products, instead, which are irrelevant.

Optionally, and based on the specific application, vectors in each set of vectors are normalized prior to constructing Euclidean-based long vectors. This prevents providing extra weight in similarity calculation to vectors which are very long that may dominate the distances calculations.

At least some embodiments described herein address the technical problem of efficiently searching records of a dataset, optionally by a search engine. At least some embodiments described herein improve the technology of search engines, by improving computational efficiency of a computer executing a search engine on a dataset of records, for example, reducing processor utilization, reducing processing time (i.e., search time), and/or reducing memory utilization. At least some embodiments described herein improve upon prior searching approaches. In at least some embodiments described herein, the solution to the technical problem, and/or the improvement to the technology, and/or improvements over existing approaches, are based on approaches for searching for one or more sets of vectors of records which are statistically similar to a set of vectors of a result record(s) obtained by running the query on the records. The search may be done based on similarity based on cosine, which indicates similarity in direction between the sets of vectors (i.e., from the query and the records), and/or based on Euclidean distance which indicates similarity in terms of distance between the sets of vectors. Alternatively or additionally, the sets of vectors are converted to a single long vector. The single long vector representing the result record is searched on single long vectors representing the records of the dataset.

At least some embodiments described herein improve the technology of data provenance, mostly concerned with annotating the results of database (DB) queries with provenance information which is useful in explaining query results at various resolution levels. At least some embodiments described herein track the lineage of tuples throughout their database lifetime. That is, at least some embodiments consider a scenario in which tuples (records) that are produced by a query may affect other tuple insertions into the DB, as part of a normal workflow. As time goes on, exact provenance explanations for such tuples become deeply nested, increasingly consuming space, and resulting in decreased clarity and readability.

At least some embodiments described herein relate to an approach for approximating lineage tracking, using a Machine Learning (ML) and Natural Language Processing (NLP) technique; for example, word embedding. At least some embodiments described herein relate to summarizing (and approximating) the lineage of each tuple via a small set of constant-size vectors (the maximum number of vectors per-tuple may be a hyperparameter). For explicitly (and independently of DB contents) inserted tuples—the vectors may be obtained via a pre-trained word vectors model over their underlying database domain "text". During the execution of a query, at least some embodiments described herein construct the lineage vectors of the final (and intermediate) result tuples in a similar fashion to that of semiring-based exact provenance calculations. At least some embodiments described herein extend the + and · operations to generate sets of lineage vectors, while retaining the ability to propagate information and preserve the compact representation. Therefore, the solution provided by at least some embodiments described herein does not suffer from space complexity blow-up over time, and, in addition, it "naturally ranks" explanations to the existence of a tuple.

At least some embodiments described herein relate to a genetics-inspired improvement to at least some implementations described herein. The data columns of an entity (and potentially other columns) are a tuple's basic properties, i.e., the "genes" that combine to form its genetic code. At least some embodiments described herein relate to a design on an alternative lineage tracking mechanism, that of keeping track of and querying lineage (via embeddings) at the column ("gene") level; thereby, at least some embodiments described herein manage to better distinguish between the provenance features and the textual characteristics of a tuple. Finding the lineage of a tuple in the DB is analogous to finding its predecessors via DNA examination. At least some embodiments described herein further introduce several optional improvements and/or extensions to the implementations described herein: tuple creation timestamp, column emphasis, Bloom Filters of queries, and query dependency DAG, i.e., directed acyclic graphs. At least some embodiments described herein may integrate the lineage computations into the PostgreSQL system via an extension (ProvSQL) and experimentally exhibit useful results in terms of accuracy against exact, semiring-based, justifications. In the experiments, the focus is on tuples with multiple generations of tuples in their lifelong lineage which are analyzed in terms of direct and distant lineage. The experiments suggest a high usefulness potential for the proposed approximate lineage methods and the further suggested enhancements. This especially holds for the column-based vectors method which exhibits high precision and high per-level recall.

At least some embodiments described herein relate to providing explanations (or justifications) for the existence of tuples in a Database Management System (DBMS, DB). These explanations are also known as data provenance [12-A]. Provenance in the literature [15-A, 24-A] often refers to forms of "justifying" the existence of tuples in query results. That is, the provenance context is the state of the database (DB) just before the query execution. The specific type of provenance on which at least some embodiments described herein relate to is lineage [13-A], namely a collection of DB tuples whose existence led to the existence of a tuple t in a query result.

At least some embodiments described herein track lineage impact of tuples throughout their existence, while distinguishing between tuples that are inserted explicitly and independently of DB content (these may be considered "building blocks") and tuples that are inserted via a query (or, more generally, whose content depends on the contents of the DB). In a real-life setting—tuples that are inserted via a query may be, for example, one or more of the following: (1) A hierarchy of materialized views—where each view can depend both on the DB and on previously defined views. (2) Tuples that are inserted via a SQL INSERT INTO SELECT statement. (3) Tuples that are inserted via a SQL UPDATE statement. (4) A query result with explicitly added data fields, that is added back to some table in the DB. For example, get names of customers retrieved from an orders table, calculate some non-database-resident "customer profile" for each customer and insert both into a customer_profile table for providing future recommendations.

As time goes on, provenance information for tuples that are inserted via a query may become complex (e.g., by tracking semiring formulas, as presented in [20-B], or circuits as presented in [16-B, 44-B]). At least some embodiments described herein provide "simple to work with" and useful approximate lineage (using ML and NLP techniques), while requiring a constant additional space per tuple. This approximate lineage compares favorably against state of the art "exact provenance tracking system" in terms of explainability and maintainability.

Exemplary technical advantages that are potentially provided by at least some embodiments described herein include: (1) Space-efficiency, with constant additional space per tuple, usage of word vectors to encode lifelong lineage. (2) A family of processes and enhancements that render the approach practical for both direct (i.e., current DB state) and indirect (i.e., all history) lineage computations. (3) Experimentation which exhibits high usefulness potential.

To help understand improvements provided by at least some embodiments described herein over prior approaches, some prior approaches are now described.

Provenance—source, origin [40-A]. In computing, provenance information describes the origins and the history of data within its lifetime. When talking about database management systems, the commonly used term is data provenance [12-A]. The idea behind data provenance is keeping additional information (meta-data) allowing us to easily answer a number of useful "meta-questions".

Data provenance helps with providing explanations for the existence of tuples in a query result. The context of these explanations is usually the DB state prior to the query execution.

Over the past 15 years or so, provenance research has advanced in addressing both theoretical [12-A, 16-A, 20-A] and practical [14-A, 15-A, 23-A, 24-A, 26-A, 45-A] aspects. In particular, several different notions of data provenance (lineage, why, how and where) were formally defined [8-A, 12-A, 13-A].

A few prior works [1-A, 29-A, 30-A, 41-A] focus on approximate (or summarized) provenance. That is, seeking a compact representation of the provenance, at the possible cost of information loss, in an attempt to deal with the growing size and complexity of exact provenance data in real-life systems.

ProvSQL is an open-source project developed by Pierre Senellart et al. [45-A]. According to the official GitHub page [43-A]: "The goal of the ProvSQL project is to add support for (m-) semiring provenance and uncertainty management to PostgreSQL databases, in the form of a PostgreSQL extension/module/plugin. It is a work in progress at the moment."

Next, concepts that are incorporated in ProvSQL are presented and their implementation is briefly discussed.

As shown previously by Green et al. [20-A] and Karvounarakis et al. [25-A], provenance information can be expressed via semiring formulas (polynomials). These formulas may blow-up in terms of space consumption, and, thus, they are problematic for practical use. An alternative (more compact) representation for provenance annotations is circuits [16-A, 44-A], which are constructed per-query. A provenance circuit is an inductively built directed acyclic graph (DAG), with the following properties: The leaves contain annotations of tuples from the input DB. Inner nodes represent operators from a particular semiring (termed gates by Senellart et al.). The edges (termed wires by Senellart et al.) connect nodes to an operator, representing operands of an intermediate calculation. The sub-DAG under a given node represents the semiring formula for deriving it.

PostgreSQL (Postgres) hooks [33-A] make it possible to extend/modify its behavior without rebuilding Postgres, by interrupting the execution process at certain points. Similarly to Postgres itself, the hooks API is written in C. Every hook is accessible via a global function pointer, initially set to NULL. During an extension's loading (following a CREATE EXTENSION command) Postgres calls the extension's own_PG_init function (if implemented), which has access to the hooks handler pointers (at this point, a hook function can be registered). When Postgres needs to call a hook, it checks the relevant function pointer, and calls the registered function, if the pointer is set (i.e., not NULL).

ProvSQL [43-A] uses the planner_hook, which is called after a query has been parsed, and before it is sent to the query planner. ProvSQL currently supports a wide range of non-aggregate SQL queries (for more details see [43-A, 45-A]). The generated query result includes a provsql column of unique tokens, identifying gates of the produced provenance circuit.

Classic NLP research focuses on understanding the structure of text. For example, building dependency-based parse trees [27-A, 35-A] that represent the syntactic structure of a sentence via grammatical relations between its words. These approaches do not account for the meaning of words. Word embedding aims to encode meanings of words (i.e., semantics), via low dimension (usually, 200-300) real-valued vectors, which can be used to compute the similarity of words as well as test for analogies [38-A]. Two of the most influential methods for computing word embeddings are the Word2Vec family of algorithms, by Mikolov et al. [36-A, 37-A] and GloVe by Pennington et al. [39-A]. Furthermore, applying neural-network (NN) techniques to NLP problems (machine translation [47-A], named entity recognition [18-

A], sentiment analysis [34-A] etc.) naturally leads to the representation of words and text as real-valued vectors.

Technical problems become apparent when considering Distant Lineage (i.e., indirect, history long, explanations for the existence of tuples in the DB) with traditional and state of the art "exact provenance tracking" techniques: (1) Formula based representations may blow-up in terms of space consumption. A naive implementation using semiring polynomials [20-A] requires saving the full provenance polynomial for each tuple, resulting in a massive growth in space consumption (for tuples that are produced by a query and that may depend on result tuples of previous queries). (2) Inductively built representations become very complex over time. Thus, they result in impractical provenance querying time. A naive implementation using circuits [16-A, 44-A] would simply keep on constructing provenance circuits as described herein. During lineage querying, the process may end up with very complex circuits, such that numerous leaves are derived via a circuit of their own (these leaves are tuples that were produced by previous queries and were inserted to the DB). Hence, even if a significant amount of sharing is realized across the provenance circuits-they are inevitably going to blow-up in space consumption. This approach renders keeping and querying the full provenance as impractical and requires limiting heavily the provenance resolution, otherwise (e.g., return a summarized explanation). That is, querying complex data structures like circuits is impractical for provenance querying in modern DB systems. (3) Alternatively, if only lineage is desired, approaches could just store with each tuple a set of all the tuples it depends on. This will be cheaper than circuits but still prohibitively expensive. Here too, one could think of circuit-like techniques where tuples that have a subset in common, of tuples in their lineage, could share this subset. But again, this is complex and suffers from similar problems, as discussed above. (4) Complex explanations are not very human-readable. Deutch et al. [14-A] showed how to generate more human-readable explanations—but they are arguably still complex. A "top-n justifications" style lineage, which is simpler and provides ranking of justifications, might be more useful for an analyst in a real-time interaction with the data.

At least some embodiments described herein are based on word vectors models. Such a model is composed of a collection of real-valued vectors, each associated with a relevant DB term. The process of deriving vectors from DB-derived text is called relational embedding, which is a very active area of research [3-A, 9-A, 21-A].

As in Bordawekar et al. [6-A], at least some embodiments described herein train a Word2Vec model [42-A] on a corpus that is extracted from the relevant DB. A naive transformation of a DB to unstructured text (a sequence of sentences) can be achieved by simply concatenating the textual representation of the different columns of each tuple into a separate sentence. This approach has several technical problems [6-A]. First, when dealing with natural language text, there is an implicit assumption that the semantic influence of a word on a nearby word is inversely proportional to the distance between them. However, not only that a sentence extracted from a tuple does not necessarily correspond to any natural language structure, but, it can be actually thought of as "a bag of columns"; i.e., the order between different columns in a sentence usually has no semantic implications. Additionally, all columns are not the same. That is, some columns-derived terms may hold more semantic importance than others in the same sentence (generated from a tuple). For instance, a primary key column, a foreign key column, or an important domain-specific column (e.g., a manufacturer column in a products table). This implies that in order to derive meaningful embeddings from the trained word vectors, at least some embodiments described herein should consider inter-column discrimination, during both word vectors training and lineage vectors construction phases. The quality of the word vectors model may be significant to the success of at least some embodiments described herein. However, optimizing the overall performance should focus not only on the training phase, but also on the way at least some embodiments described herein utilize the trained model. Next, one such exemplary optimization is described.

Extracting sentence embeddings from text has been a well-researched topic in the NLP community over the last seven years. State-of-the-art pre-trained models (e.g., Universal Sentence Encoder [10-A, 11-A] and BERT [17-A]) are trained on natural language texts, and thus are not suitable for sentences generated from relational tuples (see discussion above). Hence at least some embodiments described herein train a word embedding model and infer the sentence vectors as a function of the set of word vectors containing all the words in a sentence. At least some embodiments described herein average the word vectors for each column separately, and then apply weighted average on the "column vectors" (the weight is based on the relative importance of a column, as discussed above). As will be shown, column-based vectors result in significant improvements to lineage encoding.

Classic approaches to provenance implementation in DBMSs are briefly surveyed herein, and a state-of-the-art "exact provenance tracking" system (ProvSQL) is briefly described. At least some embodiments improve over the classic approaches and/or the state-of-the art by approximating lineage (a specific type of provenance) using embedding techniques. Inventors draw upon inspiration from word vectors in the NLP domain. The improvements of at least some embodiments is in consuming a reasonable constant amount of space per DB tuple. Experimental results of two approximate lineage embodiments, denoted TV (for tuple vectors) and CV (for column vectors), are described below. The experimental results provide insights as to performance based on at least some embodiments when compared to the exact lineage obtained from the ProvSQL system. The examples presented suggest a high usefulness potential for the proposed approximate lineage according to at least some embodiments and optional suggested enhancements described herein. This especially holds for the Column Vectors method which exhibits high precision and high per-level recall.

At least some embodiments implicitly produce a "natural ranking" of explanations. It is unclear how to get this kind of ranking from semiring provenance polynomials (it might require significant additional work). There is a work by Deutch et al. [15-A] that ranks derivation trees for Datalog programs; the ranking is based on weights assigned to the deriving Datalog rules and tuples from the underlying database. In contrast, at least some embodiments deal with simpler SQL queries and producing ranking does not require much additional work. However, it is unclear how these ranking ideas would speed up identifying finding a set of tuples that explains the existence of a query result tuple.

Comparisons to other, possibly simpler methods, is useful; yet, obvious ideas seem inferior to word embedding. For example, one could think of achieving the same functionality using simple data-type dependent featurization such as numerical scaling and one-hot encoding. This "simpler approach" makes assumptions about the problem domain, e.g., the vocabulary. Thus, rendering the update of such vocabulary impractical, as opposed to word embeddings via Word2Vec or other tools that can be modified to support incremental training [5-A]. Most importantly, word embeddings support similarity queries by grouping closely "semantically" similar words in a low dimensional space. This property lies at the heart of the lineage-approximation according to at least some embodiments, as it enables encoding lineage in a low-dimensional space with similar "grouping" properties. One-hot encoding cannot help to achieve any of these characteristics.

At least some embodiments described herein relate to a similarity measure between two sets A and B of vectors, that balances the average and maximum cosine (or Euclidean) similarity between pairs of vectors, one from set A and one from set B. This measure may be used for lineage tracking in a database, for example, as described herein. To practically realize this measure, an approximate search process is provided, that given a set of vectors A and sets of vectors $B=B_1, \ldots, B_n$, the search process quickly locates the subset of $B_i$ (e.g., with a desired number of sets) with the highest similarity measures, e.g., that maximizes the similarity measure. For the case where all sets are singleton sets, i.e., essentially each is a single vector, there are known efficient approximate search processes, e.g., approximated versions of tree search algorithms, locality-sensitive hashing (LSH), vector quantization (VQ) and proximity graph algorithms. Approximate search processes for the general case of non-singleton sets are described herein. The underlying idea in these processes is encoding a set of vectors via a "long" single vector. Moreover, such a similarity measure is used as descried herein and/or in [12-B], in which a lineage is obtained via an embedding based method, such that each tuple/column is associated with a set of vectors. As described herein, and/or in [12-B], a lineage of a tuple is the set of tuples that explains its existence, either in a query result, or more generally, due to a sequence of database operations.

To employ the set-based similarity measure, the following search problem is to be solved. Given a set of vectors A and sets of vectors $B_1, \ldots, B_n$, where all vectors are of the same dimension D (e.g., 200), efficiently locate the set $B_i$ that maximizes the similarity measure, $1 \leq I \leq n$. A straightforward and inefficient implementation, would compare A with each $B_i$. This deployment is infeasible for large databases where n may be in the billions. A markedly more efficient search method is needed. A similar problem was addressed by [6-B] which employs a very different similarity measure on two sets of vectors than the one used herein. To mitigate the "expensive" operation of computing distance between set A and each of the $B_i$ sets, they devised a "cheap" filter test that eliminates non-winners. However, they will still apply, at least the filter test, to all the $B_i$ sets.

For the case where all sets are singleton sets, i.e., essentially each is a single vector, there are known efficient approximate vector search algorithms to efficiently locate similar singleton sets of vectors. The most popular solutions are based on approximated versions of tree algorithms [10-B, 17-B], LSH [8-B, 1-B], VQ [11-B, 9-B] and proximity graph algorithms [2-B, 13-B]. To practically employ this measure, such an approximate search process is adapted to the current setting of set-based similarity.

As described herein and/or in [12-B], the database tuples are each associated with a set of lineage vectors. Given a target tuple which is associated with a set of lineage vectors A, whose existence is to be explained, such an efficient search process would enable locating tuples, say $t_1, \ldots, t_m$, where for $i \in [1, m]$, each tuple $t_i$ is associated with a set of lineage vectors $S_i$, such that $S_1, \ldots, S_m$ are the closest, via the set-based similarity measure, to set A amongst all the tuple-associated sets of vectors in the database.

At least some embodiments described herein relate to approximate search processes for the general case of set-based similarity. The underlying idea in these processes is encoding a set of vectors via a "long" single vector. Once a set is represented via one single long vector, known approximate search techniques for vectors may be employed. Thus, the search problem on sets is reduced (i.e., transformed) to a search problem on single vectors, using at least some embodiments described herein.

At least some embodiments described herein include two steps. First, a search approach is outlined, assuming that all sets of vectors have the same cardinality (cardinality means 'number of elements'), say N, e.g., each such set has 3 vectors. Then, the approach is generalized to the more complex case in which sets may have differing cardinalities. The construction is based on the principle of "assumed winners".

At least some embodiments described herein, and/or in [12-B] relate to an approach for lineage tracking, which is based on Machine Learning (ML) and/or Natural Language Processing (NLP) techniques. The main idea is summarizing, and thereby approximating, the lineage of every tuple or a tuple column via a small set of up to max_vectors_num (a hyperparameter) constant-size vectors.

In NLP, word vectors are vectors, whose elements are real numbers, which represent the "semantic ties" of a word in a text [14-B, 15-B]. Word vectors support similarity queries by grouping closely "semantically" similar words in a low-dimensional space. Sets of vectors of at least some embodiments described herein encode lineage, and provide word vectors like "grouping" properties [16-B]. That is, given a set-set similarity metric, lineage querying is supported by grouping closely the vector sets of related (lineage wise) tuples/columns.

Given two word vectors, the similarity score may be computed as the cosine similarity between the vectors. At least some embodiments described herein calculate the similarity between the lineage representations of two tuples/columns. In both cases the tuple, or column, is associated with a set of lineage vectors. That is, at least some embodiments described herein calculate the similarity between two sets of vectors. The rationale behind the following formula is balancing between the "best pair" of vectors (in terms of similarity) in the two sets and the similarity between their average vectors:

$$\text{sim}(A, B) = \frac{w_{max} \cdot \max(ps) + w_{avg} \cdot avg(ps)}{w_{max} + w_{avg}}$$

where A and B are sets of vectors, ps is the set of pair-wise similarities between a pair of vectors, one taken from set A and one taken from set B. $w_{max}$ and $w_{avg}$ are (user-specified) hyperparameters. max and avg are functions that return the maximum and average values of a collection of numbers, respectively. This logic holds for both tuple-based vectors and column-based vectors (i.e., vector sets kept for each column separately).

Given a tuple and its lineage embedding vectors, the pair-wise similarity may be calculated against every other tuple in the DB (or a subset, e.g., in a specific table) and return the top K (a parameter) most lineage-similar tuples (these resemble a subset of the lineage [7-B]). There are many algorithms for approximate vector search, e.g., based on LSH [8-B]. Approximate vector search is a very active area of research and implementation and known approaches (see, e.g., [18-B]) may be utilized; however, these approaches are not directly applicable to embodiments described herein, since at least some embodiments described herein operate on sets of vectors instead of single vectors. At least some embodiments described herein provide a practical reduction, i.e., transformation via a computer program, from the case of set-set similarity to the case of vector-vector similarity. Therefore, as vector-vector similarity can be handled efficiently using known methods, at least some embodiments described herein efficiently deploy a system using the set-set similarity measure outlined above.

A prevailing similarity measure between vectors is the cosine similarity. For this measure, there are numerous efficient approximate search methods that given a vector (target vector) and a set of vectors, locate the closest (or k closest, k being a parameter) vectors in the set to the given target vector. There are applications that need to measure similarity between sets of vectors, for example, embodiments described herein and/or as exhibited in [12-B]. A similarity measure that balances between the maximum cosine similarity amongst pairs of vectors, one from each set, and the average pair-wise similarity between pairs of vectors, one from each set, is described herein. At least some embodiments described herein efficiently reduce the vector set-vector set similarity to vector-vector similarity. This enables using any approximate vector similarity search process to, given a set of vectors, efficiently search among sets of vectors for the closest one or k-closest ones (k being a parameter). This is first done assuming all considered sets have the same cardinality, and then generalizing to sets of vectors with varying cardinalities, up to a given maximum cardinality, as described herein.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
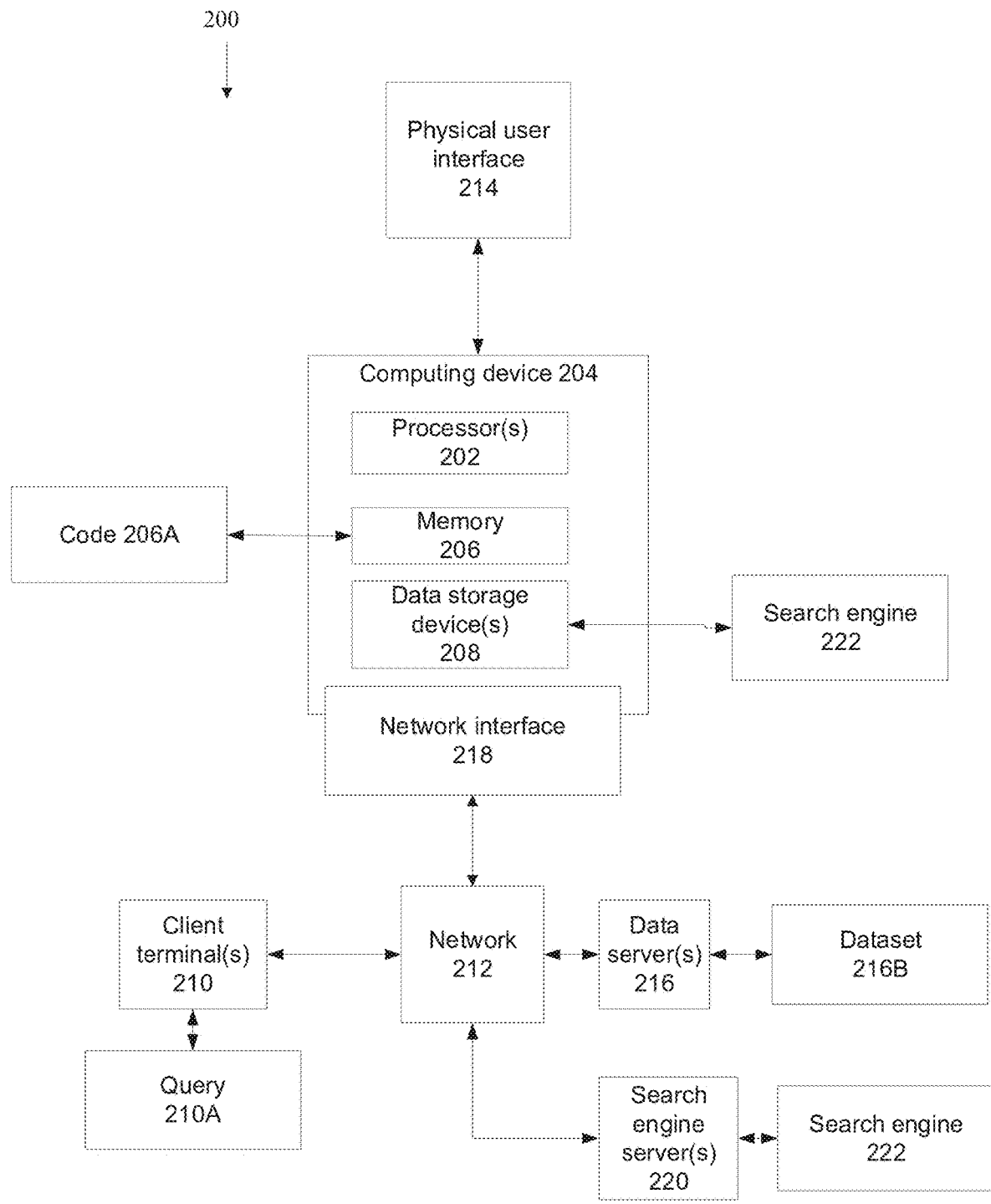
FIG. 2 is a block diagram of components of a system for computing lineage for a query for execution on a dataset, optionally by converting each set of vectors to a single long vector, in accordance with some embodiments of the present invention.

Reference is now made to FIG. 1, which is a flowchart of a method of computing lineage for a query for execution on a dataset, optionally by converting each set of vectors to a single long vector, in accordance with some embodiments of the present invention. Reference is also made to FIG. 2, which is a block diagram of components of a system 200 for computing lineage for a query for execution on a dataset, optionally by converting each set of vectors to a single long vector, in accordance with some embodiments of the present invention.

System 200 may implement the acts of the method described with reference to FIG. 1 and FIGS. 3-27, by processor(s) 202 of a computing device 204 executing code instructions (e.g., code 206A) stored in a memory 206 (also referred to as a program store).

Computing device 204 may be implemented as, for example one or more and/or combination of: a group of connected devices, a client terminal, a server, a search engine server, a virtual server, a computing cloud, a cloud data center, a virtual machine, a desktop computer, a thin client, a network node, a network server, and/or a mobile device (e.g., a Smartphone, a Tablet computer, a laptop computer, a wearable computer, glasses computer, and a watch computer).

Different architectures of system 200 may be implemented. For example:

Computing device 204 may be implemented as one or more servers (e.g., network server, web server, a computing cloud, a virtual server, a network node) that provides services to multiple client terminals 210 over a network 212, for example, for searching lineage of records obtained by using a query, as described herein.

Computing device 204 may receive query 210A from a client terminal 210, process query 210A (e.g., convert to a single long vector), and feed the query to a search engine 222 hosted by computing device 204 for searching dataset 216B stored on network server(s) 216. Computing device 204 provides the results to the respective client terminal 210.

Computing device 204 may interface with a search engine server(s) 220 that executes search engine 222. For example, search engine server(s) 220 receives a query 210A from client terminal 210. Query 210A is provided to computing device 204 for example, for computing a single long vector (e.g., by processor 202 executing code 206A). The single long vector is fed back to search engine 222 of search engine server(s) 220 for searching dataset 216B stored by data server(s) 216.

Communication between client terminal(s) 210 and/or search engine server(s) 220 and/or computing device 204 over network 212 may be implemented, for example, via an application programming interface (API), software development kit (SDK), functions and/or libraries and/or add-ons added to existing applications executing on client terminal(s) 210, an application for download and execution on client terminal 210 and/or search engine server 220 that communicates with computing device 204, function and/or interface calls to code executed by computing device 204, a remote access session executing on a web site hosted by computing device 204 accessed via a web browser executing on client terminal(s) 210 and/or search engine server 220.

Computing device 204 may be implemented as a stand-alone device (e.g., client terminal, smartphone, computing cloud, virtual machine, kiosk, server) that includes locally stored code that implement one or more of the acts described with reference to FIG. 1 and FIGS. 3-27. For example, query 210A is processed to compute a query result record associated with set(s) of vectors which is transformed into a single long vector which is fed into a locally stored search engine that searches datasets stored on data servers and/or data locally stored by the computing device.

Dataset 216B may include records, each with a respective lineage vector set(s), as described herein. Data server(s) 216 may include network connected devices that stores dataset 216B, for example, servers that host web sites.

Search engine 222 may include a customized search engine designed to perform a vector search to search dataset 216B by identifying a nearest set of vectors, as described herein.

Hardware processor(s) 202 of computing device 204 may be implemented, for example, as a central processing unit(s) (CPU(s)), a graphics processing unit(s) (GPU(s)), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Memory 206 stores code instructions executable by hardware processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 206 stores code 206A that implements one or more features and/or acts of the method described with reference to FIG. 1 and FIGS. 3-27 when executed by hardware processor(s) 202.

Computing device 204 may include data storage device(s) 208 for storing data, for example, search engine 222. Data storage device(s) 208 may be implemented as, for example, a memory, a local hard-drive, virtual storage, a removable storage unit, an optical disk, a storage device, and/or as a remote server and/or computing cloud (e.g., accessed using a network connection).

Network 212 may be implemented as, for example, the internet, a broadcast network, a local area network, a virtual network, a wireless network, a cellular network, a local bus, a point to point link (e.g., wired), and/or combinations of the aforementioned.

Computing device 204 may include a network interface 218 for connecting to network 212, for example, one or more of, a network interface card, an antenna, a wireless interface to connect to a wireless network, a physical interface for connecting to a cable for network connectivity, a virtual interface implemented in software, network communication software providing higher layers of network connectivity, and/or other implementations.

Computing device 204 and/or client terminal(s) 210 include and/or are in communication with one or more physical user interfaces 214 that include a mechanism for user interaction, for example, to enter data (e.g., enter the query) and/or to view data (e.g., the retrieved records obtained from executing the query).

Exemplary physical user interfaces 214 include, for example, one or more of, a touchscreen, a display, gesture activation devices, a keyboard, a mouse, and voice activated software using speakers and microphone.

Client terminal(s) 210 and/or server(s) 216 may be implemented, for example, as a desktop computer, a server, a virtual server, a network server, a web server, a virtual machine, a thin client, a cellular telephone, a smart phone, and a mobile device.

Referring now back to FIG. 1, at 102, a dataset of records is managed (e.g., accessed, provided, obtained). The records may be, for example, database records such as storing medical data, insurance data, and the like. The records may be arranged in a table that includes rows and/or columns or in a hierarchical or graph structure. The records may be created from another data source to enable searching, for example, created from an image (e.g., records represent patches and/or visual features of the image), from audio (e.g., records represent digital samples of the audio), and/or from machine learning models such as encodings and/or values of hidden layers of a neural network.

Each record is associated with one or more sets of vectors of real numbers that encode an approximation of lineage of the respective record. Optionally, each field of each record is associated with one or more set of vectors.

The set(s) of vectors may be computed by an encoding process. An exemplary encoding process for computing set(s) of vectors for records is now described. A corpus of the dataset is obtained. Words of records of the corpus are each converted into a single text unit. A word embedding model is trained on a training dataset that includes the single text units. The encoding process includes the word embedding model that is trained. Each word of each record is fed into the word embedding model to obtain one or multiple word vectors. An intra and/or inter-field weighted average is computed over the word vectors of each word of the respective record. The set of vectors are designated as the intra and/or inter-field weighted average. When the records include non-text data, for example, numbers such as representing images, extracted features, and/or encodings of a neural network, the term "word" may refer to units of the non-text data or computer-generated representations thereof.

Optionally, respective records (e.g., each record, some records) are associated with timestamps indicating when the respective record was created. The timestamp is used, for example, for filtering out records which are non-lineage records from the identified subset of records, according to timestamps indicating later creations. In other words, a current record cannot be descendent from later records with timestamps later than the current record. In another example, the timestamps may be used to limit the search described herein to vectors having time stamps falling within a target time interval and/or for excluding from the search vectors with timestamps falling outside the target time interval.

The timestamps may be used for significantly improving performance and/or relevance of results, using time-aware lineage querying, i.e., keeping different vectors search structures for different time segments (e.g., per month, per quarter, per 6 months, per year, and others), where such a structure includes the tuples that were added during that time segment. This enables confining the search to a smaller set that may be more relevant. Then, progress may be made to other previous time segments for further analysis. The different time segment-based vector structures may be concurrently searched by multiple cores and/or stored on different hardware and explored in parallel, for example, for reducing search time.

Optionally, the query is analyzed to identify one or more columns of interest, for example, name, ID, and the like. The search is performed by assigning larger weights to records having the column of interest. The larger weights may be assigned based on the assumption that records are more likely to have a lineage with records of the same column of interest, for example, same name and/or ID that of other names and/or other IDs.

At 104, one or more result records are obtained in response to executing a query on the dataset. The query may be, for example, a standard database query, written in a standard query language (SQL). For non-database records, such as images, audio, neural network encodings, and the like, the query may be an image processing, audio processing, and/or machine learning model processing function, for example, run a smoothing operation on an image patch.

Optionally, dependencies between queries are tracked in a directed acyclic graph (DAG) structure. During searching, weights assigned to the identified subset of records are inversely proportional to a distance on the DAG between the query and other queries that created records corresponding to the identified subset.

At 106, set(s) of vectors are computed for the result record.

Optionally, the query includes instructions for insertion of a new record into the dataset (e.g., add a new record). In such a case, the set(s) of vectors are computed by the encoding process for the new record. The new record is annotated, and thereby associated, with the corresponding computed set(s) of vectors. The annotated new record is inserted into the dataset.

Alternatively, the query includes at least one operation executed on the records to generate one or more new record (e.g. average of existing records, apply a function to existing records). In such a case, the set of vectors may be computed for the new record(s) by executing the corresponding operation(s) on the sets of vectors of the records according to the query.

When the at least one operation includes an OR operator indicating alternative use of data, the set of vectors for the new record(s) may be computed as a lineage embedding of two records using the OR operator, see for example, FIG. 4. The lineage embedding of two records may be computed using the OR operator by computing a union vector set by a union operation between the set of vectors of a first record and the set of vectors of a second record. When the number of vector members of the union vector set is greater than a maximum number of vectors, the vector members of the union vector set may be clustered into clusters. The number of clusters may be set according to the maximum number of vectors. The lineage embedding may be set as the set of vectors that include vectors of centroids of the clusters. The number of vectors of centroids matches the maximum number of vectors.

When the at least one operation includes an AND operator indicating join use of data, the set of vectors for the new record(s) may be computed as a lineage embedding of two records using the AND operator, see for example, FIG. 5. The lineage embedding of two records using the AND operator may be computed by computing a Cartesian product of the set of vectors of a first record and the set of vectors of a second record, to obtain a set of pairs of vectors. A respective average vector is computed for each pair of vectors of the Cartesian product. The lineage embedding is set as set(s) of vectors that include the average vectors.

At least some embodiments described herein relate to an approach for lineage tracking, which is based on ML and/or NLP techniques. At least some embodiments described herein relate to summarizing, and thereby approximating, the lineage of every tuple with a set of up to max_vectors (e.g., a hyperparameter) vectors. For tuples that are inserted explicitly into the DB, the vectors are obtained using a pre-trained word embeddings model denoted M over the underlying "text" of the tuple, as is shown for example, in FIG. 3 below. Reference is now made to FIG. 3, which is a pseudocode for initialization of lineage vectors of records, in accordance with some embodiments of the present invention.

During a query execution process, at least some embodiments described herein form the lineage of query result tuples in a similar fashion to that of provenance semirings [20-A]. At least some embodiments described herein extend the + and · operations (Refer to FIGS. 4-5 respectively) to generate lineage embeddings, while retaining the ability to propagate information and preserve the representation of lineage via a set of up to max_vectors, constant-size vectors. At least some embodiments described herein obtain lineage embeddings (i.e., vectors) for query output tuples by using this process. These new tuples (and their lineage) may be later inserted into the DB (depending on the specific application).

Reference is now made to FIG. 4, which is a pseudocode for performing an addition operation between lineage vectors, in accordance with some embodiments of the present invention.

Reference is now made to FIG. 5, which is a pseudocode for performing a multiplication operation between lineage vectors, in accordance with some embodiments of the present invention.

Different formats for writing formats are interchangeable, and not limiting. For example, a column representation of a vector as below:

$$\vec{L}_V^n = \begin{pmatrix} \frac{\vec{v}_{1,1}}{\|\vec{v}_1\|} \\ \vdots \\ \frac{\vec{v}_{1,n}}{\|\vec{v}_1\|} \\ \vdots \\ \frac{\vec{v}_{|V|,1}}{\|\vec{v}_{|V|}\|} \\ \vdots \\ \frac{\vec{v}_{|V|,n}}{\|\vec{v}_{|V|}\|} \end{pmatrix}$$

Is interchangeable with a horizontal format of the vector:

$$\left( \frac{\vec{v}_{1,1}}{\|\vec{v}_1\|}, \ldots, \frac{\vec{v}_{1,n}}{\|\vec{v}_1\|}, \ldots, \frac{\vec{v}_{|V|,1}}{\|\vec{v}_{|V|}\|}, \ldots, \frac{\vec{v}_{|V|,n}}{\|\vec{v}_{|V|}\|} \right)$$

Examples of the addition and multiplication lineage vectors constructions using the pseudocode of FIGS. 4 and/or 5 are now described. Let $\vec{v}_1, \vec{v}_2, \vec{v}_3, \vec{v}_4 \in R^2$ be vectors, such that:

$\vec{v}_1 = (-1, 0.5)$, $\vec{v}_2 = (1,1)$, $\vec{v}_3 = (-0.5, 1)$, $\vec{v}_4 = (0, -1)$ Suppose there are two tuples $t_1$, $t_2$ with respective sets of lineage vectors $LV_1$, $LV_2$, such that:

$LV_1 = \{\vec{v}_1, \vec{v}_2, \vec{v}_3\}$, $LV_2 = \{\vec{v}_4\}$

Finally, the hyperparameters are:

max_vectors=3

The construction of $LV_3$, which represents the lineage embeddings of $t_1 + t_2$ using the pseudocode described with reference to FIG. 4 (corresponds to alternative use of data, i.e., OR in the query) is as follows:

1. $LV_1 \cup LV_2 = \{\vec{v}_1, \vec{v}_2, \vec{v}_3\} \cup \{\vec{v}_4\} = \{\vec{v}_1, \vec{v}_2, \vec{v}_3, \vec{v}_4\}$
2. $|\{\vec{v}_1, \vec{v}_2, \vec{v}_3, \vec{v}_4\}| = 4 > 3 = $ max_vectors
3. $LV_3 = $ ClusterVectorsUsingKMeans($\{\vec{v}_1, \vec{v}_2, \vec{v}_3, \vec{v}_4\}$) = $\{\vec{c}_1, \vec{c}_2, \vec{c}_3\}$ such that:

$\vec{c}_1 = (-0.75, 0.75)$, $\vec{c}_2 = (1, 1)$, $\vec{c}_3 = (0, -1)$ are the centroids of the three clusters.

The construction of $LV_3$, that represents the lineage embeddings of $t_1 \cdot t_2$ using the pseudocode described with reference to FIG. 5 (corresponds to joint use of data, i.e., AND in the query) is as follows:

1. CartesianProduct($LV_1, LV_2$) = $\{(\vec{v}_1, \vec{v}_4), (\vec{v}_2, \vec{v}_4), (\vec{v}_3, \vec{v}_4)\}$
2. $\{$Avg$(\vec{v}_1, \vec{v}_4)$, Avg$(\vec{v}_2, \vec{v}_4)$, Avg$(\vec{v}_3, \vec{v}_4)\} = \{\vec{a}_1, \vec{a}_2, \vec{a}_3\}$ such that:

$\vec{a}_1 = (-0.5, -0.25)$, $\vec{a}_2 = (0.5, 0)$, $\vec{a}_3 = (-0.25, 0)$ are the average vectors, of each pair, in the Cartesian product.

3. $|\{\vec{a}_1, \vec{a}_2, \vec{a}_3\}| = 3 \leq 3 = $ max_vectors
4. $LV_3 = \{\vec{a}_1, \vec{a}_2, \vec{a}_3\}$ Referring now back to FIG. 1, at 110A, the sets of vectors of the records of the dataset are searched to identify a set of vectors that is statistically similar to the set of vectors computed for the result record.

The search is performed for the set of vectors as a whole. The search may be performed by searching for a set of vectors of the records of the dataset with most similar direction to the set of vectors of the query result record, for example, using a function based on cosine. Alternatively or additionally, the search may be performed by searching for a set of vectors of the records of the dataset with closest statistical distance within a space to the set of vectors of the query result record. The distance referred to herein may be, for example, Euclidean distance, and/or Cosine similarity. The search based on closest Euclidean statistical distance may be done, for example, using a function based on Euclidean distance. Optionally, the searching is performed by balancing a minimum squared Euclidean distance between all pairs of vectors, one vector from the dataset record associated set and one vector from the query result vector associated set, and an average of squared Euclidean distances for pairs of vectors including one vector from the dataset record associated set of vectors and one vector from the query result vector associated set of vectors.

Given two word vectors, the similarity score may be computed as the cosine similarity between them. At least some embodiments described herein calculate the similarity between the lineage representations of two tuples/columns; in both cases, the tuple or column, is associated with a set of lineage vectors. That is, at least some embodiments described herein calculate the similarity between two sets of vectors. The practical rationale behind the following formula is balancing between the "best pair" of vectors (in terms of similarity) in the two sets and the similarity between their average vectors:

$$\text{sim}(A, B) = \frac{w_{max} \cdot \max(ps) + w_{avg} \cdot avg(ps)}{w_{max} + w_{avg}}$$

where ps is the set of pair-wise cosine similarities between a pair of vectors, one taken from set A and one taken from set B. $w_{max}$ and $w_{avg}$ are (user-specified) hyperparameters. max and avg are functions that return the maximum and average values of a collection of numbers, respectively. Given a tuple and its set of lineage embedding vectors, at least some embodiments described herein calculate the pair-wise similarity against every other set of lineage embedding vectors of a tuple in the DB (or a DB subset, e.g., in a specific table) and return the top n (a parameter) most lineage-similar tuples (these resemble a subset of the lineage [13-A]). There are different approaches available for approximate vector search, e.g., based on LSH [19-A]. Approximate vector search is a very active area of research (see, e.g., [46-A]); however, these approaches are not directly applicable to embodiments described herein, since at least some embodiments described herein operate on sets of vectors instead of single vectors. At least some embodiments described herein efficiently reduce (i.e., transform) the set-set similarity problem to a vector-vector similarity problem. This enables using any approximate vector similarity search algorithm to, given a set of vectors, efficiently search among sets of vectors for the closest one or k-closest ones (k is a user specified parameter).

Examples of technical advantages of lineage vectors computed by at least some embodiments described herein is as follows: Each manually inserted tuple—has a set consisting of a single tuple vector. Each tuple in the result of a query—has a set of up to max_vectors (a hyperparameter) tuple vectors. When calculating similarity—at least some embodiments described herein compare between two sets of lineage vectors, by using the formula for sim(A, B) described herein.

As noted herein, text obtained from database relations does not behave like natural language text, and a sequence of columns values in a tuple does not usually construct a natural language sentence. Thus, a technical problem is encountered-building lineage vectors at the tuple level and comparing tuples on this basis is noisy and potentially lossy (i.e., loses information) in terms of information. At least some embodiments described herein provide a technical solution to this technical problem using a genetics-inspired approach. Suppose a DB tuple presents the external appearance (i.e., phenotype) of a DB entity, as dictated by the genetic code of the entity. The overall columns of an entity are its basic properties, i.e., the genes that combine to construct its genetic code. The visible columns, contained in its overall columns, of an entity (record) are its data columns (i.e., fields). In this setting, querying the direct lineage of a result tuple is analogous to finding its predecessors through DNA-based tracking. Following the approach presented above, at least some embodiments described herein provide an alternative lineage tracking mechanism, that of keeping track of and querying lineage (via embeddings) at the column (gene) level. This approach provides the technical advantage of better distinguishing between the provenance features and the textual characteristics of a tuple.

An exemplary implementation is now described:
1. Each tuple has a set of (up to max_vectors) column lineage vectors per-column, instead of a single set of tuple vectors (per-tuple). The set of columns (features, characteristics) for which a tuple t has lineage embeddings is denoted as t.lineage_columns.
2. A column name is formally denoted, using the full name notation, as T. Attr, such that T is a relation name and Attr is a column name. This is meant to achieve better distinction at the lineage vectors level between tuples that originate from different relations with the same column names.
3. Given a tuple t, t.lineage_columns= t.native_columns∪t.inherited_columns, here ∪ denotes set union, such that t.native_columns is the set of data columns of t and t.inherited_columns is the set of columns (features, characteristics) that t "inherited" from its predecessors, but are not necessarily reflected as data columns in t. Note that the same column name may be in t and inherited from its predecessors as well. This technical issue will be dealt with shortly. In the following examples A, B, C, D are used to represent the full name of a column for brevity. For example, suppose a tuple $t \in T_{AB}$ (a table with only two columns—A and B) has the per-column lineage vectors $CV_t = \{A:LV_A, B:LV_B, C:LV_C, D:LV_D\}$ ($CV_t$ is a map of: t.lineage_columns→sets of lineage vectors), t.native_columns={A, B}, t.inherited_columns={C, D} and t.lineage_columns={A, B, C, D}.

Note. From here on, the notation $CV_t$.columns is used to denote the set of columns in the domain of the map $CV_t$.

4. When combining lineage embeddings (see FIG. 6), all calculations are done at the column level.

Reference is now made to FIG. 6, which is a pseudocode for computing addition of column lineage vectors, in accordance with some embodiments of the present invention.

Reference is now made to FIG. 7, which is a pseudocode for computing multiplication of column lineage vectors, in accordance with some embodiments of the present invention.

5. After constructing a new tuple t ET via a query q and its per-column lineage vectors $CV_t$ (via a series of + and · operations, for example, using the pseudocode described with reference to FIGS. 4-5, respectively)—special care is to be taken in constructing lineage vectors per the native_columns of t, which might or might not be inherited from t's predecessors. That is, for every column A∈t.native_columns (A represents the full name of a column for brevity):

(a) If A∉t.inherited_columns and t.A is set to an existing value from some column A' in the DB, e.g., q=(INSERT INTO T SELECT A' FROM . . . ) then the following is set $CV_t[A]=CV_t[A']$.

(b) If A∈t.inherited_columns and t.A is set to an existing value from some column A'≠A in the DB, e.g., q=(INSERT INTO T SELECT A' FROM . . . ) then the following is set $CV_t[A]=CV_t[A] \cdot CV_t[A']$. This way, both the existing lineage data and the newly calculated one for the column A are incorporated.

(c) If A∉t.inherited_columns and t.A is set to some constant value, e.g., q=(INSERT INTO T SELECT const FROM . . . ) then the following is set $CV_t[A]=\{initial\_vector(const)\}$, such that initial_vector (const) is calculated according to the pseudocode described with reference to FIG. 3 with the "textified" form of const as input data.

(d) If A∈t.inherited_columns and t.A is set to some constant value, e.g., q=(INSERT INTO T SELECT const FROM . . . ) then the following is set $CV_t[A]=CV_t[A] \cdot \{initial\_vector(const)\}$. This way, both the existing lineage data and the newly calculated one for the column A are incorporated.

6. When comparing a tuple t (and its lineage embeddings) to a set of other tuples T':

(a) If t'.lineage_columns ⊆t.lineage_columns (t'∈T') then t' is definitely not a part of the lineage of t. Otherwise, all of the "genes" (columns) of t' would be reflected in t.

(b) The similarity between t and t'∈T' is averaged over the pair-wise similarities of their respective mutual genes (lineage columns). For example, say a tuple t that has lineage vectors for columns A,B,C is compared to another tuple t' that has lineage vectors for columns B,C,D (here, t' is an arbitrary tuple, which is not necessarily in the lineage of t):

sim(t, t')=avg({sim(t.B,t'.B),sim(t.C, t'.C)})

where avg is a function that returns the average of a collection of numbers. sim(t.B, t'.B) is the calculated similarity between the lineage vectors for column B of t and t' (similarly for column C). Observe that A and D are not mutual "genes" of the tuples t and t', and, thus they do not hold lineage information that is valuable to the similarity calculation.

Examples of the addition and multiplication column lineage vectors constructions, using the pseudocode of FIGS. 4-5, respectively, are now provided. Suppose there are two tuples $t_1$, $t_2$ with respective maps of columns→sets of lineage vectors $CV_1$, $CV_2$, such that:

$CV_1=\{A:LV_A, B:LV_{B_1}\}$, $CV_2=\{B:LV_{B_2}, C:LV_C\}$

A, B, C are full column names and $LV_A$, $LV_{B_1}$, $LV_{B_2}$, $LV_C$ are sets of lineage vectors. The construction of $CV_3$, which represents the column lineage embeddings of $t_1+t_2$ using the pseudocode of FIG. 6 (corresponds to alternative use of data, i.e., OR in the query), is now described:

1. $CV_3=\{\ \}\rightarrow\{\ \}$
2. $CV_1.columns \cup CV_2.columns=\{A, B\} \cup \{B, C\}=\{A, B, C\}$
3. $A \in CV_1.columns \wedge A \notin CV_2.columns$
   $\Rightarrow CV_3[A]=CV_1[A]=LV_A$
4. $B \in (CV_1.columns \cap CV_2.columns)=$
   $\Rightarrow CV_3[B]=CV_1[B]+CV_2[B]=LV_{B_1}+LV_{B_2}$
5. $C \notin CV_1.columns \wedge C \in CV_2.columns$
   $\Rightarrow CV_3[C]=CV_2[C]=LV_C$
6. $CV_3=\{A:LV_A, B:LV_{B_1}+LV_{B_2}, C:LV_C\}$ The construction of $CV_3$, that represents the column lineage embeddings of $t_1 \cdot t_2$ using the pseudocode of FIG. 7 (corresponds to joint use of data, i.e., AND in the query) is now described:

1. $CV_3=\{\ \}\rightarrow\{\ \}$
2. $CV_1.columns \cup CV_2.columns=\{A, B\} \cup \{B, C\}=\{A, B, C\}$
3. $A \in CV_1.columns \wedge A \notin CV_2.columns$
   $\Rightarrow CV_3[A]=CV_1[A]=LV_A$
4. $B \in (CV_1.columns \cap CV_2.columns)$
   $\Rightarrow CV_3[B]=CV_1[B] \cdot CV_2[B]=LV_{B_1} \cdot LV_{B_2}$
5. $C \notin CV_1.columns \wedge C \in CV_2.columns$
   $\Rightarrow CV_3[C]=CV_2[C]=LV_C$
6. $CV_3=\{A:LV_A, B:LV_{B_1} \cdot LV_{B_2}, C:LV_C\}$ The rationale behind embodiments described herein is partially inspired by the construction of "tuple vectors" by means of averaging the "sentence vectors" of the columns, as described herein. t.lineage_columns (for a tuple t) might get large and include (almost) all the columns in the DB. This creates a technical problem-rendering this solution is impractical, since large modern systems may operate with hundreds and even more columns across the DB. Embodiments described herein relate to various practical solutions that can serve to limit the number of lineage columns per tuple, for example: Set a bound b on the number of lineage_columns (a user-defined hyperparameter). Another option is to give native priority. That is, prefer keeping native_columns and cutting-off inherited_columns, whose influence on this tuple is more remote, when the bound is reached (see example herein). Another option is to remove the relation name prefix from a column name, i.e., consider all T. Attr as simply Attr. This might result in a loss of information, but hopefully not too harmful to the overall performance of the method. Observe that the assumption described herein, that t' cannot be in the lineage of t if its "genes" are not contained in t's genes, breaks down under this lineage column cut-off technique. A decision must be made to either accept this possibility of false negatives or suggest filtering only if the containment rate of t'.lineage_columns in t.lineage_columns is below some threshold. Another technical problem and solution thereof is now presented. Since the processor throws away lineage columns (to keep the memory footprint constant)—a "genes containment" as a filter cannot be relied upon, hence the processor may start to filter out real lineage tuples (obtain false negatives). Thus, a modified heuristic to mitigate this technical problem is presented. The construction of $CV_3$, that represents the column lineage embeddings of $t_3=t_1+t_2$, such that the result is a new tuple $t_3 \in T_{AB}$ (a table with only two columns—A and B), is now described. In addition, a bound of b=2 is used on the number of retained lineage_columns and native priority is implemented:

1. (see example 6(b)@)
   $CV_3=\{A: LV_A, B: LV_{B_1}+LV_{B_2}, C: LV_C\}$
   $\Rightarrow t_3.lineage\_columns=\{A, B, C\}$
2. $t_3 \in T_{AB} \Rightarrow t_3.native\_columns=\{A, B\}$, $t_3.inherited\_columns=\{C\}$ 3. |t$_3$.lineage_columns|=3>2=b
4. $CV_3$={A: $LV_A$, B: $LV_B$, +$LV_{B_2}$}

(observe that the inherited_column C was eliminated)

For embodiments that approximate the top-n justifications for the existence of a query result tuple, as described herein, a simple technique to partially verify the collection of lineage candidates is described. The approach is based on applying the query q that generated the tuple to be explained, t, to the collection of lineage tuples obtained by embodiments described herein. If t is output in the result of applying q on these lineage candidates, then a sufficiently small (though, perhaps non-complete) explanation for the existence of t is found. In another example, ProvSQL can help us provide an exact provenance formula, offering additional functionalities, for example, computing HOW-PROVENANCE, from the relatively small group of lineage candidates. an exact provenance tracking application, e.g., ProvSQL [43-A] may be used, by applying q to the collection of tuples obtained by embodiments described herein, to explain t (given that t is "verified"). This technique relies on the fact that executing q on a small collection of tuples (even with exact provenance tracking) is significantly cheaper in terms of time and storage consumption than applying the query on the whole, potentially large, DB.

Filtering out non-lineage tuples by a tuple's creation timestamp is a good practice, and may help with filtering out very similar but non-lineage tuples, which might not be detected by the other methods. It may be especially significant for querying distant lineage (i.e., when the database (DB) has existed for a sufficiently long time, so that a tuple's creation timestamp becomes a strong distinguishing factor).

When analyzing lineage embeddings of query-result tuples against other tuples in the DB, certain columns of interest may be emphasized. These columns may be derived from the structure of the query. For example, for a query that asks for distinct manufacturer names of products that contain soda, intuitively, the manufacturer and ingredients columns (of the products table) are selected to have more influence on the respective lineage embeddings than other columns that are not mentioned in the query.

An exemplary implementation for query-dependent column weighting is now described.

1. Given a query q, at least some embodiments parse q to retrieve the columns of interest and save them as additional meta information for every tuple in the result of q.
2. When comparing a tuple from the result of q with another tuple from the DB, at least some embodiments compare between respective column vectors and calculate a weighted average of the similarities while prioritizing the columns of interest. For example, for a tuple t that has lineage vectors for columns A,B that was created by a query q, such that q.cols_of_interest={B}; and t is compared with another tuple t' that has lineage vectors for columns A,B:

$$\text{sim}(t, t') = \frac{w_A * \text{sim}(t.A, t'.A) + w_B * \text{sim}(t.B, t'.B)}{w_A + w_B}$$

where $w_A$ and $w_B$ are respective column weights such that $w_B > w_A$ as column B is mentioned in the query. sim(t.A, t'.A) is the calculated similarity between the lineage vectors for column A of t and t' (similarly for column B). It is observed that although column A is not a column of interest in the example, it is a mutual "gene" of tuples t and t', and, thus it still holds lineage information that is valuable to the similarity calculation.

The above described technique is applicable mainly for direct lineage. In the context of distant lineage the above described technique may be used to get "immediate contributors" but also take into account lineage tuples identified without the above described technique (they will naturally tend to be ranked lower).

A technical problem that arises is to distinguish between very similar/nearly identical tuples (text-wise). At least some embodiments provide a technical solution by keeping additional information per-tuple, that encodes the queries that had the tuple in their lineage (i.e., for every tuple t-keep track of every query q, such that t was involved meaningfully in the evaluation of q). Also, for each query-inserted tuple t record the query q that inserted it. This approach enables filtering out (in a probabilistic manner) tuples that were not involved meaningfully in the evaluation of a query.

An exemplary approach for filtering out tuples is now described:

1. Initialize a Scalable Bloom Filter [2-A] of size B (a hyperparameter) for every tuple in the DB.
2. For every tuple t that is involved meaningfully in the evaluation of a query q: insert q (hashed) to t's Bloom filter.
3. When comparing a tuple t (and its lineage embeddings) that was created by a query q (as recorded with this tuple) to a set of other tuples T', embodiments may precede similarity calculations with the following step: if q∉t'.bloom_filter then t' was definitely not involved in the evaluation of q. Thus, it cannot be a part of t's direct lineage.

The above described approach for filtering out tuples filters tuples that were not directly involved in the evaluation of a query; hence, it is not applicable to distant (indirect) lineage. A possible technique of extending the above described approach is a recursive approach that takes into account the query that produced each already discovered (presumed lineage) tuple.

Bloom Filters are probabilistic, but they do not produce false negatives. Thus, they can be reliably used to filter out non-lineage tuples (in this case, a false negative is a tuple t that was involved in the evaluation of a query q, but q∉t.bloom_filter).

Embodiments may emphasize a size-bounded lineage representation. Therefore, it seems that using a Scalable Bloom filter (per-tuple) contradicts this notion, as its size is ultimately bounded by the number of queries served by the system. Therefore, embodiments may use a "switch & reset policy" for these Bloom filters: Instead of only one Bloom filter-maintain two Bloom filters per-tuple (both of them are filled). One filter is "big and old" and one is "small and young". Lineage "filtering" is done against the old one. Once the young one has seen sufficiently many queries-embodiments switch to the young one and recycle the old filter. Embodiments then call the young old and create a new (empty) young filter. This way information is lost but only about relatively "old" queries. In order to maintain the invariant of "no false negatives" when querying the old Bloom filter of a tuple t—it is important to keep track of the oldest query id that is tracked by the old filter. That is, say the current old filter of t encodes information only for queries q with q.id≥t.oldest_query_id; then given a tuple t' which was created by a query q' with q'.id<t.oldest_query_id-embodiments do not test for the existence of q' in t.bloom_filter (otherwise, there is a risk of returning a false negative).

Bloom Filters are a universal enhancement that may be applied to any lineage-approximation technique. They complement beautifully the word embedding based lineage vectors, but are far from being a "silver bullet" on their own. In particular, in the extreme case where most (or even all) the tuples of a table (e.g., denoted Table A" participate in the evaluation of a query q, the Bloom Filters (almost) will not help filtering when comparing a tuple from the result of q to tuples from Table A).

Another technical problem relates to distinguishing between very similar/nearly identical tuples (text-wise) during both direct and distant lineage querying (Bloom filters are one way to achieve this for direct lineage). Additionally, another technical problem may relate to enhancing the natural ranking of lineage tuples by amplifying the "generational gaps". The idea is that tuples from earlier generations in the distant lineage tree structure (of a query-inserted tuple) are to be assigned a lower similarity score during distant lineage querying. The technique is keeping track of dependencies between queries in a DAG structure and weighting the similarity scores of query-inserted tuples (during lineage querying) inversely proportional to the distance, between their inserting queries to the query that computed the explained tuple, in the query dependency DAG. A query q depends on a query p if a tuple $t_p$ that was created by p was meaningfully involved in the evaluation of q (i.e., $t_p$ is in the distant lineage of some result tuple $t_q$ in the result of q). This approach provides lower similarity scores to tuples that were not involved meaningfully in the evaluation of a query (directly or remotely) and amplifies the natural ranking of the results in terms of query creation dependencies.

An exemplary implementation of computing weights using a query dependency directed acyclic graph (DAG) is now provided:
1. If there is a tuple $t_p$ that is involved meaningfully in the evaluation of a query q: q depends on the query p that inserted $t_p$ into the DB.
2. Initialize an empty query dependency DAG G=(V, E) with a maximum number of nodes S and a maximum height H (both are user-defined hyperparameters), such that V is a set of queries and E={(q, p)∈ V×V|q depends on p}.
3. When comparing a tuple $t_q$ (and its lineage embeddings) that was created by a query q (as recorded with this tuple) to another tuple $t_p$ in the DB, replace similarity calculations with the following steps:
   (a) Denote the sub-tree of q in G (i.e., rooted at q) as $G_q=(V_q, E_q)$.
   (b) Denote the query that created the tuple $t_p$ (as recorded with this tuple) as p.
   (c) If p∈ $V_q$ then multiply the similarity for $t_p$ by $w_d \leq 1$, which is inversely proportional to the distance d from q to p in $G_q$. One possible implementation for the distance-dependent weighting is $$w_d = \max\left\{\frac{1}{2}, 1 - \frac{(d-1)}{10}\right\},$$

such that $w_1=1$, $w_2=9/10$, etc., and $\forall 1 \leq d \leq H: w_d \geq 1/2$. Other implementations exist as well.

(d) If p∉ $V_q$ then multiply the similarity for $t_p$ by $0 < w_{outsider} < w_{d=H}$ (a user-defined hyperparameter). Note that since limits were defined on the maximum number of nodes S and maximum height H, some nodes will need to be removed when those limits are reached (see details below). Thus, this approach might start producing false negatives at some point; and to not lose those tuples completely, some embodiments multiply their similarity by some small, non-zero constant, instead of plainly filtering them out.

4. Embodiments may include a lineage tracking system with constant additional space per tuple. The query dependency DAG adheres to this philosophy and is limited in size by the hyperparameters S and H. Several design choices may be implemented to enforce these limits, while maintaining effectiveness.

Alternatively to the search of sets of vectors of described with reference to 110A, at 108B, for each record of the dataset, the set of vectors is converted to a single long vector. The set of vectors computed for the result record is also converted to a single long vector.

Optionally, each one of the vectors of the set of vectors is of a same dimension. A dot product between a first single long vector computed from a first set of vectors and a second single long vector computed from a second set of vectors is used to compute all pair-wise interactions between the first set of vectors and the second set of vectors. The single long vector is created by concatenating a number of copies of each normalized vectors of each set of vectors. where the number of copies equals the number of vectors in the one set of vectors, wherein each vector that is concatenated is a normalized vector of the one set of vectors repeated a number of times equal to the number of vectors.

At 110B, multiple single long vectors of the records are searched to identify a subset of long vectors such that each long vector in this subset is statistically similar to the single long vector computed for the query result record.

Additional exemplary details for construction of single long vectors from sets of vectors, and performing a search using the single long vectors, are now provided.

Referring now back to the technical problem of searching for a first set of vectors within a second set of sets of vectors, by converting each set of vectors to single long vectors, it is first assumed that all sets of vectors are of a constant cardinality N. The idea is transforming each set of vectors into a single long vector, so that the dot product of two such long vectors computes all pair-wise interactions, and is equivalent to the similarity calculation (between sets of vectors) described herein. Note that all vectors are of the same constant dimension D (e.g., 100, a hyperparameter).

An exemplary approach for Long Vectors construction is now described:
1. Let A be a target set of vectors of cardinality N, for which the closest candidate set of vectors is to be found.
2. Let V be a candidate set of vectors for A of cardinality N. Construct a long candidate vector $\vec{L}_V \in R^{|A| \times |V| \times D}$ from V by concatenating |A| copies of each (normalized) $\vec{v}_i \in V$, in order $\vec{v}_1, \ldots, \vec{v}_{|V|}$:

$$\vec{L}_V = \begin{pmatrix} \frac{\vec{v}_{1,1}}{\|\vec{v}_1\|} \\ \vdots \\ \frac{\vec{v}_{1,|A|}}{\|\vec{v}_1\|} \\ \vdots \\ \frac{\vec{v}_{|V|,1}}{\|\vec{v}_{|V|}\|} \\ \vdots \\ \frac{\vec{v}_{|V|,|A|}}{\|\vec{v}_{|V|}\|} \end{pmatrix}_{|A|=|\overline{V}|=N} \begin{pmatrix} \frac{\vec{v}_{1,1}}{\|\vec{v}_1\|} \\ \vdots \\ \frac{\vec{v}_{1,N}}{\|\vec{v}_1\|} \\ \vdots \\ \frac{\vec{v}_{N,1}}{\|\vec{v}_N\|} \\ \vdots \\ \frac{\vec{v}_{N,N}}{\|\vec{v}_N\|} \end{pmatrix}$$

such that $\vec{v}_{i,j}$ is the $j^{th}$ copy of $\vec{v}_i$.

3. Now, a long vector $\vec{L}_A \in R^{|A| \times |V| \times D}$ is built by concatenating all (normalized) $\vec{a}_i \in A$, in order $\vec{a}_1, \ldots, \vec{a}_{|A|}$, and duplicating the result $|V|$ times:

$$\vec{L}_A = \begin{pmatrix} \frac{\vec{a}_{1,1}}{\|\vec{a}_1\|} \\ \vdots \\ \frac{\vec{a}_{|A|,1}}{\|\vec{a}_{|A|}\|} \\ \vdots \\ \frac{\vec{a}_{1,|V|}}{\|\vec{a}_1\|} \\ \vdots \\ \frac{\vec{a}_{|A|,|V|}}{\|\vec{a}_{|A|}\|} \end{pmatrix}_{|A|=|\overline{V}|=N} \begin{pmatrix} \frac{\vec{a}_{1,1}}{\|\vec{a}_1\|} \\ \vdots \\ \frac{\vec{a}_{N,1}}{\|\vec{a}_N\|} \\ \vdots \\ \frac{\vec{a}_{1,N}}{\|\vec{a}_1\|} \\ \vdots \\ \frac{\vec{a}_{N,N}}{\|\vec{a}_N\|} \end{pmatrix}$$

such that $\vec{a}_{i,j}$ is the $j^{th}$ copy of $\vec{a}_i$.

4. $\vec{L}_A$ is used to capture the average of all pair-wise cosine similarities with vectors from a candidate set V (note that $a_{i,j}=a_i$ and $v_{j,i}=v_j$):

$$\vec{L}_A \cdot \vec{L}_V = \sum_{i=1}^{|A|} \sum_{j=1}^{|V|} \frac{\vec{a}_{i,j}}{\|\vec{a}_i\|} \cdot \frac{\vec{v}_{j,i}}{\|\vec{v}_j\|} = \text{sum(ps)} =$$
$$= \text{avg(ps)} \times |A| \times |V| =_{|A|=|V|=N} \text{avg(ps)} \times N^2$$

where ps is the multi-set of pair-wise similarities between a pair of vectors, one taken from set V and one taken from set A.

5. To capture the maximum of the pair-wise similarities (denoted max(ps)) build $|A| \times |V| = N^2$ long "selector" vectors $\vec{\sigma}_{1,1}, \ldots, \vec{\sigma}_{|A|,1}, \ldots, \vec{\sigma}_{1,|V|}, \ldots, \vec{\sigma}_{|A|,|V|}$, each $\vec{\sigma}_{i,j} \in R^{|A| \times |V| \times D}$ "assumes" which of the $|A| \times |V| = N^2$ pair-wise interactions is maximal:

$$\vec{\sigma}_{i,j} = \begin{pmatrix} \vec{0}_{1,1} \\ \vdots \\ \vec{0}_{|A|,1} \\ \vdots \\ \vec{1}_{i,j} \\ \vdots \\ \vec{0}_{1,|V|} \\ \vdots \\ \vec{0}_{|A|,|V|} \end{pmatrix}$$

i.e., $\vec{\sigma}_{i,j}$ is a concatenation of $O_s = (j-1) \times |A| + (i-1)$ $\vec{0}$ vectors, followed by one $\vec{1}$ vector, and ending with $|A| \times |V| - (O_s+1)$ $\vec{0}$ vectors, where $\vec{0} \in R^D$ is the "all zeros" vector and $\vec{1} \in R^D$ is the "all ones" vector. $\vec{\sigma}_{i,j}$ "assumes" the maximum occurs in the cosine similarity product between $\vec{a}_i$ and $\vec{v}_j$. Consequently, the following is obtained:

$$\vec{\sigma}_{i,j} \odot \vec{L}_A = \begin{pmatrix} \vec{0}_{1,1} \\ \vdots \\ \vec{0}_{|A|,1} \\ \vdots \\ \frac{\vec{a}_{i,j}}{\|\vec{a}_i\|} \\ \vdots \\ \vec{0}_{1,|V|} \\ \vdots \\ \vec{0}_{|A|,|V|} \end{pmatrix}$$

such that $\vec{a}_{i,j}$ is the $j^{th}$ copy of $\vec{a}_i$ and $\odot$ is the Hadamard (i.e., element-wise) product. This results in:

$$(\vec{\sigma}_{i,j} \odot \vec{L}_A) \cdot \vec{L}_V = \frac{\vec{a}_{i,j}}{\|\vec{a}_i\|} \cdot \frac{\vec{v}_{j,i}}{\|\vec{v}_j\|} = \frac{\vec{a}_i}{\|\vec{a}_i\|} \cdot \frac{\vec{v}_j}{\|\vec{v}_j\|}$$

6. Next, construct $|A| \times |V| = N^2$ long target vectors $\vec{\tau}_{1,1}, \ldots, \vec{\tau}_{|A|,1}, \ldots, \vec{\tau}_{1,|V|}, \ldots, \vec{\tau}_{|A|,|V|}$ ($\vec{\tau}_{i,j} \in R^{|A| \times |V| \times D}$):

$$\vec{\tau}_{i,j} = \frac{1}{w_{max} + w_{avg}} \cdot \left( w_{max} \cdot (\vec{\sigma}_{i,j} \odot \vec{L}_A) + \frac{w_{avg}}{|A| \times |V|} \cdot \vec{L}_A \right)$$

where $w_{max}$ and $w_{avg}$ are (user-specified) hyperparameters, as described herein.

7. Each long target vector $\vec{\tau}_{i,j}$ computes the desired similarity calculation via a dot product with a long candidate vector $\vec{L}_V$, under the assumption that $\vec{a}_i$ and $\vec{v}_j$ have the maximal pair-wise similarity:

$$\vec{\tau}_{i,j} \cdot \vec{L}_V = \frac{w_{max} \cdot (\vec{\sigma}_{i,j} \odot \vec{L}_A) \cdot \vec{L}_V + \frac{w_{avg}}{|A| \times |V|} \cdot \vec{L}_A \cdot \vec{L}_V}{w_{max} + w_{avg}} =$$

$$= \frac{w_{max} \frac{\vec{a}_{i,j} \cdot \vec{v}_{j,i}}{\|\vec{a}_i\| \, \|\vec{v}_j\|} + w_{avg} \cdot avg(\text{ps})}{w_{max} + w_{avg}} =$$

$$= \frac{w_{max} \frac{\vec{a}_i \cdot \vec{v}_j}{\|\vec{a}_i\| \, \|\vec{v}_j\|} + w_{avg} \cdot avg(\text{ps})}{w_{max} + w_{avg}}$$

An exemplary practical real world search method based on the long vectors is now described:

1. Insert all the long candidate vectors (of a constant dimension $N^2 \times D$) into a vector search structure S. Note that known approximate vector search techniques, such as LSH [8-B, 1-B] (or any other technique, as described herein), may be utilized here for searching efficiency. Search structure S is search technique-specific.
2. Recall that for a candidate set of vectors V, the long candidate vector is $\vec{L}_V$.
3. Now, suppose a target set of vectors A, of cardinality N, is provided. Construct $N^2$ long target vectors $\vec{\tau}_{1,1}, \ldots, \vec{\tau}_{N,N}$.
4. Look separately for the closest (dot-product wise) long candidate vector $\vec{L}_{i,j}$ in S, to each $\vec{\tau}_{i,j}$, respectively.
5. Compute the similarity scores $\vec{\tau}_{1,1} \cdot \vec{L}_{1,1}, \ldots, \vec{\tau}_{N,1} \cdot \vec{L}_{N,1}, \ldots, \vec{\tau}_{1,N} \cdot \vec{L}_{1,N}, \ldots, \vec{\tau}_{N,N} \cdot \vec{L}_{N,N}$. The one yielding the highest score, for example $\vec{L}_{i,j}$, identifies the desired candidate set of vectors $V_{i,j}$, according to the set-oriented similarity formula described herein. If u>0 closest sets are desired, the u sets yielding the u highest scores are output.

The cardinality of a set is the number of elements in it. Some embodiments described herein relate to construction of a long candidate vector $\vec{L}_V$ from a candidate set of vectors V, and a collection of long target vectors $\vec{\tau}_{i,j}$ (where $i \in [1, |A|=N]$ and $j \in [1, |V|=N]]$) from a target set of vectors A, under the assumption that all sets of vectors are of a constant cardinality N. It is evident that these constructions are tightly coupled with the cardinalities of the target and candidate sets of vectors, namely |A| and |V|. Hence, a refined version (i.e., additional embodiments) that supports sets of vectors of varying cardinalities, such that each set of vectors V has a cardinality $|V| \in [1, \text{max\_vectors\_num}]$ (max_vectors_num, a user-defined hyperparameter, is hereafter denoted as M, for brevity), is provided. Recall that all vectors are of the same constant dimension D. This greatly extends the applicability and flexibility of the search method in handling sets of varying cardinalities.

The general idea is pre-computing M long candidate vectors $\vec{L}_V^1, \ldots, \vec{L}_V^M$ instead of a single $\vec{L}_V$, and a collection of long target vectors it, for each $k \in [1, M]$ (where $i \in [1, |A|]$ and $j \in [1, k]$). Each $\vec{L}_V^n \in R^{n \times |V| \times D}$, where $n \in [1, M]$, "assumes" in its construction that the cardinality of a target set of vectors is n. Each $\vec{\tau}_{i,j}^k \in R^{|A| \times k \times D}$, where $k \in [1, M]$, "assumes" in its construction that the cardinality of a candidate set of vectors is k. Consequently, instead of a single form of long candidate and target vectors (of dimension $N^2 \times D$, as is the case in section 3), potentially M×M different such forms (in terms of dimension and (n, k) construction parameters) are obtained, such that each long vector of dimension $n \times k \times D$, where $n, k \in [1, M]$, is associated with a separate search structure $S_{1,1}, \ldots, S_{M,M}$, depending on its (n, k) form.

Another exemplary approach for Long Vectors construction is now described:

1. Let V be a candidate set of vectors of cardinality $|V| \in [1, M]$. Construct M long candidate vectors $\vec{L}_V^1, \ldots, \vec{L}_V^M$, such that each $\vec{L}_V^n \in R^{n \times |V| \times D}$, where $n \in [1, M]$, is constructed from V by concatenating n copies of each (normalized) $\vec{v}_i \in V$, in order $\vec{v}_1, \ldots, \vec{v}_{|V|}$:

$$\vec{L}_V^n = \begin{pmatrix} \frac{\vec{v}_{1,1}}{\|\vec{v}_1\|} \\ \vdots \\ \frac{\vec{v}_{1,n}}{\|\vec{v}_1\|} \\ \vdots \\ \frac{\vec{v}_{|V|,1}}{\|\vec{v}_{|V|}\|} \\ \vdots \\ \frac{\vec{v}_{|V|,n}}{\|\vec{v}_{|V|}\|} \end{pmatrix}$$

such that $\vec{v}_{i,j}$ is the $j^{th}$ copy of $\vec{v}_i$. $\vec{L}_V^n$ "assumes" the cardinality of the target set of vectors is n.

2. Let A be a target set of vectors of cardinality $|A| \in [1, M]$.
3. Now, build M long vectors $\vec{L}_A^1, \ldots, \vec{L}_A^M$, such that $\vec{L}_A^k \in R^{|A| \times k \times D}$, where $k \in [1, M]$, is built by concatenating all (normalized) $\vec{a}_i \in A$, in order $\vec{a}_1, \ldots, \vec{a}_{|A|}$, and duplicating the result k times:

$$\vec{L}_A^k = \begin{pmatrix} \frac{\vec{a}_{1,1}}{\|\vec{a}_1\|} \\ \vdots \\ \frac{\vec{a}_{|A|,1}}{\|\vec{a}_{|A|}\|} \\ \vdots \\ \frac{\vec{a}_{1,k}}{\|\vec{a}_1\|} \\ \vdots \\ \frac{\vec{a}_{|A|,k}}{\|\vec{a}_{|A|}\|} \end{pmatrix}$$

such that $\vec{a}_{i,j}$ is the $j^{th}$ copy of $\vec{a}_i$. $\vec{L}_A^k$ "assumes" the cardinality of the candidate set of vectors is k.

4. Let V be a candidate set of vectors for A of cardinality $|V| \in [1, M]$. Long vector $\vec{L}_A^{k=|V|} \in R^{|A| \times |V| \times D}$ is used to capture the average of all pair-wise cosine similarities with vectors from V ($\vec{L}_V^{n=|A|} \in R^{|A| \times |V| \times D}$):

$$\vec{L}_A^{k=|V|} \cdot \vec{L}_A^{n=|A|} = \vec{L}_A^{|V|} \cdot \vec{L}_V^{|A|} = \sum_{i=1}^{|A|} \sum_{j=1}^{|V|} \frac{\vec{a}_{i,j} \cdot \vec{v}_{i,j}}{\|\vec{a}_i\| \, \|\vec{v}_i\|} =$$

$$= \text{sum (ps)} = avg \text{ (ps)} \times |A| \times |V|$$

where ps is the multi-set of pair-wise similarities between a pair of vectors, one taken from set V and one taken from set A.

5. To capture the maximum of the pair-wise similarities (denoted max(ps)) build $|A| \times k$ long "selector" vectors $\vec{\sigma}_{1,1}^k, \ldots, \vec{\tau}_{|A|,1}^k, \ldots, \vec{\tau}_{1,k}^k, \ldots, \vec{\tau}_{|A|,k}^k$, for each $k \in [1, M]$. That is, a total of $$\sum_{k=1}^{M} |A| \times k = |A| \times \sum_{k=1}^{M} k = |A| \times \frac{M(1+M)}{2}$$

long "selector" vectors. Each $\vec{\tau}_{i,j}^k \in R^{|A| \times k \times D}$ "assumes" which of the $|A| \times k$ pair-wise interactions is maximal:

$$\vec{\sigma}_{i,j}^k = \begin{pmatrix} \vec{0}_{1,1} \\ \vdots \\ \vec{0}_{|A|,1} \\ \vec{1}_{i,j} \\ \vdots \\ \vec{0}_{1,k} \\ \vdots \\ \vec{0}_{|A|,k} \end{pmatrix}$$

i.e., $\vec{\tau}_{i,j}^k$ is a concatenation of $O_s = (j-1) \times |A| + (i-1)$ $\vec{0}$ vectors, followed by one $\vec{1}$ vector, and ending with $|A| \times k - (O_s + 1)$ $\vec{0}$ vectors, where $\vec{0} \in R^D$ is the "all zeros" vector and $\vec{1} \in R^D$ is the "all ones" vector. $\vec{\tau}_{i,j}^k$ of "assumes" the maximum occurs in the cosine similarity product between $\vec{a}_i$ and $\vec{v}_j$. Also, $\vec{\tau}_{i,j}^k$ "assumes" the cardinality of the set of lineage vectors of the candidate tuple is k. Consequently, the following is obtained:

$$\vec{\sigma}_{i,j}^k \odot \vec{L}_A^k = \begin{pmatrix} \vec{0}_{1,1} \\ \vdots \\ \vec{0}_{|A|,1} \\ \frac{\vec{a}_{i,j}}{\|\vec{a}_i\|} \\ \vdots \\ \vec{0}_{1,k} \\ \vdots \\ \vec{0}_{|A|,k} \end{pmatrix}$$

such that $\vec{a}_{i,j}$ is the $j^{th}$ copy of $\vec{a}_i$ and $\odot$ is the Hadamard (i.e., element-wise) product. This results in:

$$\left(\vec{\sigma}_{i,j}^{k=|V|} \odot \vec{L}_A^{k=|V|}\right) \cdot \vec{L}_V^{n=|A|} = \left(\vec{\sigma}_{i,j}^{|V|} \odot \vec{L}_A^{|V|}\right) \cdot \vec{L}_V^{|A|} = \frac{\vec{a}_{i,j}}{\|\vec{a}_i\|} \cdot \frac{\vec{v}_{j,i}}{\|\vec{v}_j\|} = \frac{\vec{a}_i}{\|\vec{a}_i\|} \cdot \frac{\vec{v}_j}{\|\vec{v}_j\|}$$

6. Next, construct $|A| \times k$ long target vectors $\vec{\tau}_{1,1}^k, \ldots, \vec{\tau}_{|A|,1}^k, \ldots, \vec{\tau}_{1,k}^k, \ldots, \vec{\tau}_{|A|,k}^k$ for each $k \in [1, M]$. That is, a total of $$\sum_{k=1}^{M} |A| \times k = |A| \times \sum_{k=1}^{M} k = |A| \times \frac{M(1+M)}{2}$$

long target vectors $\vec{\tau}_{i,j}^k \in R^{|A| \times K \times D}$.

$$\vec{\tau}_{i,j}^k = \frac{1}{w_{max} + w_{avg}} \cdot \left(w_{max} \cdot \left(\vec{\sigma}_{i,j}^k \odot \vec{L}_A^k\right) + \frac{w_{avg}}{|A| \times k} \cdot \vec{L}_A^k\right)$$

where $w_{max}$ and $w_{avg}$ are (user-specified) hyperparameters, as described herein. $\vec{\tau}_{i,j}^k$ "assumes" the cardinality of the set of lineage vectors of the candidate tuple is k.

7. Each long target vector $\vec{\tau}_{i,j}^{k=|V|} \in R^{|A| \times |V| \times D}$ computes the desired similarity calculation via a dot product with a long candidate vector $\vec{L}_V^{n=|A|} \in R^{|A| \times |V| \times D}$, under the assumption that $\vec{a}_i$ and $\vec{v}_j$ have the maximal pair-wise similarity:

$$\vec{\tau}_{i,j}^{k=|V|} \cdot \vec{L}_V^{n=|A|} = \vec{\tau}_{i,j}^{|V|} \cdot \vec{L}_V^{|A|} =$$

$$= \frac{w_{max} \cdot \left(\vec{\sigma}_{i,j}^{|V|} \odot \vec{L}_A^{|V|}\right) \cdot \vec{L}_V^{|A|} + \frac{w_{avg}}{|A| \times |V|} \cdot \vec{L}_A^{|V|} \cdot \vec{L}_V^{|A|}}{w_{max} + w_{avg}} =$$

$$= \frac{w_{max} \cdot \frac{\vec{a}_{i,j}}{\|\vec{a}_i\|} \cdot \frac{\vec{v}_{j,i}}{\|\vec{v}_j\|} + w_{avg} \cdot avg(ps)}{w_{max} + w_{avg}} =$$

$$= \frac{w_{max} \cdot \frac{\vec{a}_i}{\|\vec{a}_i\|} \cdot \frac{\vec{v}_j}{\|\vec{v}_j\|} + w_{avg} \cdot avg(ps)}{w_{max} + w_{avg}}$$

Another exemplary search technique is now described:

1. Initialize $M \times M$ vector search structures $S_{1,1}, \ldots, S_{M,M}$, such that $S_{n,k}$ holds long candidate vectors of dimension $n \times k \times D$ (i.e., long vectors of candidate sets of cardinality k, assuming target sets of cardinality n). Note that known approximate vector search techniques, such as LSH [8-B, 1-B] (or any other technique, as described herein), may be utilized here for searching efficiency.

2. For each candidate set of vectors V of cardinality $|V| \in [1, M]$, and its respective construction of M long candidate vectors $\vec{L}_V^n \in R^{n \times |V| \times D}$, for each $n \in [1, M]$, insert $\vec{L}_V^n$ into the vector search structure $S_{n,|V|}$.

3. Now, given a target set of vectors A of cardinality $|A| \in [1, M]$, construct $|A| \times k$ long target vectors $\tau_{1,1}^k, \ldots, \vec{\tau}_{|A|,k}^k$, for each $k \in [1, M]$.

4. Hereafter, denote a set of vectors V with cardinality k as $V^k$.

5. For each $k \in [1, M]$, look separately for the closest (dot-product wise) candidate long vector $\vec{L}_{V_{i,j}}^{n=|A|} \in R^{|A| \times k \times D}$ in $S_{|A|,k}$, to each $\vec{\tau}_{i,j}^k \in R^{|A| \times k \times D}$, respectively. Intuitively, this focuses on candidate sets of vectors of cardinality k.

6. Next, select the "best" one among the "winners" of different k values. Compute the similarity scores $\vec{\tau}_{1,1}^k \cdot \vec{L}_{V_{1,1}^k}^{|A|}, \ldots, \vec{\tau}_{|A|,1}^k \cdot \vec{L}_{V_{|A|,1}^k}^{|A|}, \ldots, \vec{\tau}_{1,k}^k \cdot \vec{L}_{V_{1,k}^k}^{|A|}, \ldots, \vec{\tau}_{|A|,k}^k \cdot \vec{L}_{V_{|A|,k}^k}^{|A|}$, for each $k \in [1, M]$ (a total of $$\sum\nolimits_{k=1}^{M}|A|\times k=|A|\times\sum\nolimits_{k=1}^{M}k=|A|\times\frac{M(1+M)}{2}.$$

computations). The one yielding the highest score, for example $\vec{L}_{V_{\bar{i},\bar{j}}^{k}}^{|A|}$, identifies the desired candidate set of vectors $V_{\bar{i},\bar{j}}^{k}$, according to the set-oriented similarity formula described herein. The generalization of finding the u closest sets is straightforward.

It is noted that keeping track for which cardinalities (between 1 and M) there are sets of this cardinality among the ones searched, the number of long vectors constructed may be reduced and separately search for each such cardinality. In addition, the maximum cardinality M need only be known in advance for the target sets (those associated with dataset records for which nearest neighbor sets are searched) and the database of sets of vectors may admit new sets of vectors of arbitrary cardinalities. This can be relaxed by dynamically performing additional construction (of long candidate vectors) once a "new target set cardinality" M'>M appears. At any rate, the number of relevant cardinalities (those actually appearing) of stored sets of vectors may affect the efficiency of the search method, namely, the more possible cardinalities there are, the more long target vectors need be constructed.

Reference is now made to FIG. 8, which is an exemplary proof of correctness of the method applied to constant cardinality of sets of vectors, in accordance with some embodiments of the present invention.

Reference is now made to FIG. 9, which is another exemplary proof of correctness of the method applied to constant cardinality of sets of vectors, in accordance with some embodiments of the present invention.

The proof for the special case described above with reference to FIGS. 8 and/or 9, where all sets of vectors are of a constant cardinality N, is provided. The proof of the general case, with sets of vectors of varying cardinalities, is much more involved and requires significantly more bookkeeping; but, it is essentially the same proof as that for the special case.

It is noted that the proof described above with reference to FIGS. 8 and/or 9 is correct under the assumption of using the exact vector search process in step (4), described herein. The correctness and accuracy with an approximate search method depend only on the correctness and accuracy of said approximate search method.

Another exemplary search approach for searching using long vectors created from sets of vectors is now described.

Reference is now made to FIG. 27, which is a pseudocode for an exemplary approach for construction of long vectors, in accordance with some embodiments of the present invention. The pseudocode is for construction procedure of long vectors $\vec{L}_{a_1}, \ldots, \vec{L}_{a_{|A|}}$ from a vector set A. The same procedure is applied to both candidate and target sets of vectors.

Linear algebraic constructions are now presented, transforming each set of vectors A into |A| long independent vectors, so that the dot product of two such long vectors (one derived from set A and one from set B) computes all pair-wise interactions, and is equivalent to the similarity calculation (between sets of vectors) described herein. Note that the long vectors construction is permutation invariant to the order of vectors in the sets. A reduction approach from sets of vectors to long vectors, that supports sets of vectors of varying cardinalities, with only a 2× factor memory overhead, is described. It is noted that all vectors are of the same constant dimension denoted D (a hyperparameter of the system).

Each long target vector $\vec{L}_{a_i} \in \mathbb{R}^{2 \cdot D}$ (derived from a target set of vectors A) computes the desired similarity calculation via a dot product with a long candidate vector $\vec{L}_{b_i} \in \mathbb{R}^{2 \cdot D}$ (derived from a candidate set of vectors B), under the assumption that $\vec{a}_i \in \mathbb{R}^{D}$ and $\vec{b}_j \in \mathbb{R}^{D}$ have the maximal pair-wise similarity, using the equations shown in FIG. 26. Each candidate/target set of vectors A in the database is transformed into |A| long vectors $\vec{L}_{a_i} \in \mathbb{R}^{2 \cdot D}$. This means that the long vectors have only a 2× factor memory overhead, compared to the original sets of vectors. Constructing long vectors requires O(|A|·2·D)=O(|A|·D) copying operations and O(|A|·D) floating point operations for the normalization of the vectors in A, for each set A in the database.

Reference is now made to FIG. 10, which is a pseudocode for another exemplary search approach for searching using long vectors created from sets of vectors, in accordance with some embodiments of the present invention. The exemplary search approach is as follows:

Prior to the approach described in the pseudocode, insert all the long candidate vectors (of a constant dimension 2·D) into a vector search structure denoted S which provides "k closest vectors" queries functionality with respect to a dot product similarity metric. Note that known approximate vector search techniques, such as LSH [6-D, 2-D], can be utilized here for efficiency (while sacrificing some accuracy). Search structure S is search technique-specific.

The pseudocode search approach for the top-k closest sets, given a target set of vectors A, is now described. Hereafter, closest_lvs[i] (line 5) denotes the set of the k*-closest (line 2) long candidate vectors for each $\vec{L}_{a_i}$, respectively, where k* denotes the number of closest long vectors to search for in S. Note that if there are more than k* closest candidate vectors to $\vec{L}_{a_i}$, e.g., when multiple long candidate vectors have the same (dot product wise) similarity score to $\vec{L}_{a_i}$, the approach may still return only a collection of k* top candidates, with an arbitrary selection among equal candidates. That is, in any case, |closest_lvs [i]|=k*. Also, for readability, reference is made to "the top-k collection" despite the fact that it may not be unique. Intuitively, a selection of the "k-best" among the "winners" of different $\vec{L}_{a_i}$ long target vectors is made. The pseudocode is for mapping (line 9) all the long candidate vectors in the union set closest_lvs_all (line 7), and sort (unique$_{top(k)}$ on line 10) the candidates sets according to the (dot product wise) similarity scores with their respective $\vec{L}_{a_i}$ long target vectors. The ones yielding the top-k scores, relating to k unique candidate sets (line 10), are the desired top-k candidate sets of vectors, according to the set-oriented similarity formula. In case |top_k|<k, i.e., there are less than k sets identified in top_k (line 12), a step that increases k* and redoes the search is added.

The transformation of sets of vectors to long vectors enables, for example, using known approximate vector search approaches, rendering the search approaches described herein practical (e.g., in terms of using available processing resources, within a reasonable processing time) and/or scalable.

Yet another search approach based on long vectors constructed from sets of vectors is now described.

Some ML-related indexing structures and methods use the Euclidean distance metric as a natural extension of its traditional use in two- or three-dimensional spatial applications. For example, in classification and clustering, the distances of multiple data points to known classes or cluster centroids may be measured. The measurements are used in assigning these data points to clusters. An alternative approach, known as squared Euclidean distance, can be used to avoid the expensive square root computations and is often preferable.

The Euclidean distance metric may be used for searching using sets of vectors as described with reference to 110A, and/or for searching using long vectors, as described with reference to 110B.

An order agnostic set-set distance formula to calculate the distance between two sets of vectors is provided. The "logic" behind the distance formula is balancing between the "best pair" of vectors (minimum in terms of squared Euclidean distance) in the two vector sets and the average of all the squared Euclidean distances for pairs of vectors, one from each set:

$$dist(A, B) = \frac{w_{avg} \cdot avg(pd) + w_{min} \cdot min(pd)}{w_{avg} + w_{min}}$$

$$pd = \{d^2(\vec{a}_i, \vec{b}_j) | \vec{a}_i \in A, \vec{b}_j \in B\}$$

where A and B are sets of vectors. $d^2$ is the squared Euclidean distance between a pair of vectors. $w_{avg}$ and $w_{min}$ are (user-specified) hyperparameters. avg and min are functions that return the average and minimum values of a collection of numbers, respectively.

It is noted that the average of pair-wise Euclidean distances of vectors in sets A and B cannot be computed by first deriving some average on set A and some average on set B. So, the construction in this case is more complex than the construction for cosine similarity-based. It is assumed that each set of vectors A has a cardinality $|A| \in PC$, where PC is a fixed set of arbitrary possible cardinalities, e.g., PC={1,3, 4} means that sets can be of cardinality 1, 3 and 4. The set of possible cardinalities PC is a user-defined hyperparameter of the system. Linear algebraic constructions, transforming each set of vectors into a long vector, are presented, so that the squared Euclidean distance of two such long vectors computes all pair-wise interactions, and is equivalent to the distance calculation (between sets of vectors) presented above. Note that the squared Euclidean distance may be exchanged with Manhattan distance, as a drop-in (with no additional adjustments), in the formula presented above, the construction of long vectors described below (aside from removing the square root from the constants) and the search using the long vectors described below. This might be more beneficial for certain applications, especially for high-dimensional data, where Manhattan distance yields more robust results [1-D].

The general idea is pre-computing $|PC| \cdot |B|$ long candidate vectors $\vec{\beta}_j^t \in R^{(t \cdot |B|+1) \cdot D}$, where $t \in PC$ and $1 \le j \le |B|$, for a candidate set of vectors B, and a collection of $|PC| \cdot |A|$ long target vectors $\vec{\alpha}_i^c \in R^{(|A| \cdot c+1) \cdot D}$, where $c \in PC$ and $1 \le i \ge |A|$, for a target set of vectors A. Each $\vec{\beta}_j^t$ "assumes" in its construction that the cardinality of a target set of vectors is t. Each $\vec{\alpha}_i^c$ "assumes" in its construction that the cardinality of a candidate set of vectors is c. Consequently, $|PC| \cdot |PC|$ different forms of long candidate and target vectors are obtained (i.e., two long vectors $\vec{1}_1 \in R^{(t \cdot c+1) \cdot D}$ and $\vec{1}_2 \in R^{(c \cdot t+1) \cdot D}$ are considered of different forms, although the dimension is the same, for $t \neq c$). Each long vector of dimension $(t \cdot c+1) \cdot D$, where $t, c \in PC$, is associated with a separate search structure $S_{t,c}$, depending on its (t, c) form (there are additional options, e.g., combining such search structures of equal dimensions).

Reference is now made to FIG. 11, which is a pseudocode of another exemplary approach for converting a set of vectors to a single long vector, in accordance with some embodiments of the present invention.

The pseudocode describes a construction procedure of long vectors $\vec{\alpha}_1^c, \ldots, \vec{\alpha}_{|A|}^c$, for all $c \in PC$, from a vector set A. Almost the same procedure is applied to both candidate and target sets of vectors, with a slight difference in the order of concatenation (for candidates the loop starting at line 4 is performed, and for targets the loop starting at line 10 is performed).

Each long target vector $\vec{\alpha}_i^{c=|B|} \in R^{(|A| \cdot |B|+1) \cdot D}$ computes the desired distance calculation dist(A,V) via a squared Euclidean distance with each of the long candidate vectors $\vec{\beta}_j^{t=|A|} \in R^{(|A||B|+1) \cdot D}$, under the assumption that $\vec{a}_i$ and $\vec{b}_j$ have a minimal pair-wise distance:

$$d^2(\vec{\alpha}_i^{c=|B|}, \vec{\beta}_j^{t=|A|}) = d^2(\vec{\alpha}_i^{|B|}, \vec{\beta}_j^{|A|}) =$$

$$= \frac{d^2(\vec{L}_A^{|B|}, \vec{L}_b^{|A|}) + w_{min} \cdot d^2(\vec{a}_i, \vec{b}_j)}{w_{avg} + w_{min}} =$$

$$= \frac{\frac{w_{avg}}{|A| \cdot |B|} \cdot \sum_{p=1}^{|A|} \sum_{q=1}^{|B|} d^2(\vec{a}_{p,q}, \vec{b}_{q,p}) + w_{min} \cdot d^2(\vec{a}_i, \vec{b}_j)}{w_{avg} + w_{min}} =$$

$$= \frac{w_{avg} \cdot \frac{sum(pd)}{|A| \cdot |B|} + w_{min} \cdot d^2(\vec{a}_i, \vec{b}_j)}{w_{avg} + w_{min}} =$$

$$= \frac{w_{avg} \cdot avg(pd) + w_{min} \cdot d^2(\vec{a}_i, \vec{b}_j)}{w_{avg} + w_{min}}$$

An exemplary search method is as follows:

Initialize $|PC| \cdot |PC|$ vector search structures $S_{t,c}$, one for each $t, c \in PC$, such that $S_{t,c}$ holds long candidate vectors compatible with t, c, and cardinality, $(t \cdot c+1) \cdot D$ (i.e., long vectors of candidate sets of cardinality c, assuming target sets of cardinality t). The search structure $S_{t,c}$ provides "k closest vectors" queries functionality with respect to a squared Euclidean distance similarity metric, as described herein, and an approximate vector search structure can be utilized.

For each candidate set of vectors B of cardinality $|B| \in PC$, and its respective $|PC| \cdot |B|$ long candidate constructed vectors $\vec{\beta}_j^t \in R^{(t \cdot |B|+1) \cdot D}$, where $t \in PC$ and $1 \le j \le |B|$, insert $\vec{\beta}_j^t$ into the vector search structure $S_{t,|B|}$.

The search is nearly the same as described with reference to the pseudocode of FIG. 10, but instead of constructing $|A|$ long target vectors for a target set A (line 3.4.2), $|PC| \cdot |A|$ are computed (requiring a change in line 4) long target vectors $\vec{\alpha}_i^c \in R^{(|A| \cdot c+1) \cdot D}$, where $c \in PC$ and $1 \le i \le |A|$. The other difference is that instead of a single search structure S, each long target vector $\vec{\alpha}_i^c$ looks for the k closest long candidate vectors (line 5) in a separate search structure $S_{|A|,c}$.

At 110A, multiple records are returned by the search. In 110B, a single record is returned by the search.

At 112, a subset of the records corresponding to the identified set of vectors (when search is done as in 110A) and/or corresponding to the identified single long vector (when search is done as in 110B) is provided, for example, presented on a display, forwarded to another computing device, stored on a data storage device, and/or fed into another process such as for triggering an automated action. The records in the subset of records have a likelihood (e.g., above a threshold) of contributing to the existence of the result record in response to execution of the query.

The set of vectors and the associated records of the identified subset are statistically similar to the set of vectors of the search query.

At 114, the subset of the records may be verified. The verification may be done, for example, by applying the query to the subset of records to obtain one or more test outcomes, optionally test record(s). The correct lineage may be verified when the test record(s) matches or is statistically similar (e.g., above a threshold) to the result record. When approximate search is used on long vectors, it may happen that verification query fails to produce the target record. In this case, the number of records k searched for in the various search structures is increased, so as to capture more possible lineage records. This may need be repeated a number of times.

Using embodiments described herein that approximate the top-k justifications for the existence of a query result tuple, an approach to partially verify the collection of lineage candidates is now described. The query denoted q that generated the tuple to be explained, denoted t, is applied to the collection of lineage tuples denoted S, obtained as described herein. If t is in the result of applying q on S, then a sufficiently small (though, non-precise) explanation for t is found. Alternatively or additionally, an exact provenance tracking application, e.g., ProvSQL [1-C], may be utilized by applying q to the collection of tuples obtained by at least some embodiments described herein, to explain t (given that t is "verified"). This relies on the fact that executing q on a small collection of tuples (even with exact provenance tracking) is significantly computationally more efficient than applying the query on the whole, potentially large, dataset. In case the computed lineage is insufficient, it may be extended (adjusting the parameters).

At 116, the dataset of records may be updated. Optionally, for each respective record, at least one previous query where the respective record was involved in the evaluation of the previous query and/or where the previous query inserted the respective record, is stored. The stored previous query may be used, for example, for filtering out records that are similar to the identified subset of records but that were not involved in the evaluation of the query.

At 118, one or more actions may be taken in response to the identified subset of records. For example, alerts may be generated. In another example, the subset of records are fed into a process that automatically analyzes the subset of records for detection of errors and/or correction of errors.

Various embodiments and aspects of the present invention as delineated hereinabove and as claimed in the claims section below find experimental and/or calculated support in the following examples.

A practical problem is asking, given a set of tuples $C=\{t1, \ldots, tn\}$, which tuples are in the lineage of many of the tuples in C. This may be answered by using two different measure, and-close and or-close. For and-close, the equation $t=(t1\cdot(t2\cdot(\ldots(tn-1\cdot tn)))$ is computed as a "target vector", and using at least some embodiments described herein to find the tuples in its lineage, the natural ranking provides the desired answer. For or-close, if all tuples in C have the same columns (i.e., identical schemas), the equation $t=(t1+(t2+(\ldots(tn-1+tn)))$ is computed as a "target vector", and using at least some embodiments described herein to find the tuples in its lineage, the natural ranking provides the desired answer. The and-close method is preferable when the cardinality of C (i.e., n) is small. The or-close method is preferable when the cardinality of C is large. It is also possible to combine the results provided by the and-close and the or-close methods in various ways (e.g., the top answers from each method) that may be made available to a human analyst.

An exemplary approach for Long Vectors construction using a cosine similarity measure is now described with reference to FIGS. 24-26. The computations based on FIGS. 24-26 are based on Inventors' discovery, stemming from the distributive property of addition and multiplication, that the average of pairwise cosine similarities between vectors in sets A and B may be calculated by calculating first the average vector of the normalized vectors in set A and the average vector of the normalized vectors in set B and taking the dot product between these average vectors, rather than using previously suggested approaches for using averages of non-normalized vectors.

Optionally, each single long vector includes a first component used for computation of the pair-wise interactions and a second component used for computation of the statistical similarity used for the searching. The statistical similarity of the searching may computed, for example, by at least one of: (i) balancing a minimum squared Euclidean distance between a single long vector of the dataset and a single long vector of the output record(s) obtained from the query, and an average of squared Euclidean distances for pairs of single long vectors including one single long vector from the dataset and one single long vector from the output record of the query, and (ii) balancing between a maximum cosine similarity amongst pairs of single long vectors of the dataset, including one single long vector from the dataset and one single long vector from the output record(s) of the query, and an average pair-wise similarity between the pairs of single long vectors.

Reference is now made to FIG. 24, which displays the construction of the average vectors for set A (target) and B (candidate), in accordance with some embodiments of the present invention.

Reference is now made to FIG. 25, which displays the construction of long vectors obtained by concatenating a copy of the average vector of A with each vector of A, multiplied by appropriate weighting parameters, and similarly for set B, in accordance with some embodiments of the present invention.

Reference is now made to FIG. 26, which presents a calculation showing that the dot product between the constructed long target and candidate vectors properly computes the similarity measure, assuming that the maximum similarity is realized by the vectors $\vec{a}_i$ and $\vec{b}_j$, in accordance with some embodiments of the present invention.

EXAMPLES

Reference is now made to the following examples, which together with the above descriptions illustrate some embodiments of the invention in a non-limiting fashion.

Inventors first establish an explanation quality measure, in terms of precision and per-level recall. Then results of the approximate lineage system experimentation against an "exact provenance tracking system"—ProvSQL, are presented and analyzed.

Experimental Setup

It is noted that max_vectors_num was chosen manually in the experiments to be 4.

Precision Calculation

As described herein, Inventors expect explanations computed using embodiments described herein to approximate the exact lineage of query result tuples. Thus, in order to test the aforementioned algorithms and implementation, Inventors devised an explanation quality measure for explaining a single tuple t, where n is a parameter:

$$\text{Precision}(t, n) = \frac{|ApproxLineage(t, n) \cap ExactLineage(t)|}{|ApproxLineage(t, n)|}$$

where ApproxLineage(t, n) denotes the set of the top n (by lineage similarity) tuples, returned as explanations (i.e., approximate lineage) for t by embodiments described herein. ExactLineage(t) denotes the set of tuples that comprise the exact distant lineage of t, it can be calculated recursively from the semiring polynomial that is returned by the ProvSQL system for t. For example, if the direct lineage of $t_4$ and $t_5$ are the sets $\{t_1, t_2, t_3\}$ and $\{t_1\}$, respectively, and the direct lineage of a tuple $t_6$ is the set $\{t_4, t_5\}$ then the total distant lineage for the tuple $t_6$ is $\{t_1, t_2, t_3, t_4, t_5\}$. The parameter n is set by Inventors in each experiment, that is, it is a parameter of the experiment. Precision(t, n) is tunable via the parameter n, i.e., when n is small Inventors test for precision of the "top" explanations found.

In machine learning projects, results usually include precision and recall (e.g., in traditional statistics and classification problems). However, here the situation is slightly different, what is really interesting is to assess the quality of explanations outcomes of embodiments described herein by measuring "how many of the top n (by lineage similarity) tuples are actually part of the exact lineage?". By contrast, traditional recall does not seem to be a meaningful metric in this case, as many query-result tuples might have long histories. Hence, a top-n justifications result is preferred over "returning all the correct lineage tuples", and this is what is measured.

Distant Lineage: Per-Level Recall

In order to assess the quality of a distant lineage answer in a more insightful way, in the experiments the "exact distant lineage" is saved in a hierarchical structure, which is analyzed per-level. Consider a list L of sets per-tuple, s.t. L[i] is the set of all lineage tuples at the $i^{th}$ derivation depth level. Note that i starts at 0, s.t. the $0^{th}$ lineage level is a set containing the target tuple only. For example, if the direct lineage of $t_4$ and $t_5$ are the sets $\{t_1, t_2, t_3\}$ and $\{t_1\}$, respectively, and the direct lineage of a tuple $t_6$ is the set $\{t_3, t_4, t_5\}$ (note that $t_3$ appears in both the $1^{st}$ and the $2^{nd}$ lineage levels of $t_6$, in this example) then the hierarchical lineage DAG for the tuple $t_6$, and the hierarchical list structure that represents it, look as described with reference to FIG. 12.

Figure 12:
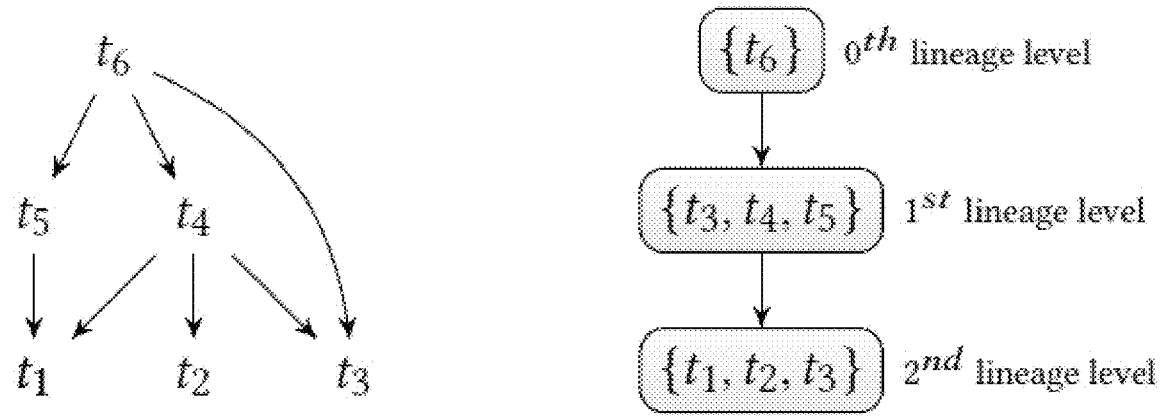
FIG. 12 is a schematic depicting a hierarchical lineage DAG for a tuple and a corresponding hierarchical list structure, in accordance with some embodiments of the present invention.

Reference is now made to FIG. 12, which is a schematic depicting a hierarchical lineage DAG for a tuple and a corresponding hierarchical list structure, in accordance with some embodiments of the present invention. Each rectangle is an entry in the list L.

Explanations may be expected to have a "natural ranking" property in terms of lineage levels. That is, it may be expected that the similarity between a target tuple and tuples in its distant lineage to be inversely related to the distance between them in the hierarchical lineage DAG structure. Thus, Inventors devise an explanation quality measure Recall(t, i) for the explanation of a single tuple t and its lineage level i. Let D(t, i) be the number of unique returned tuples in the exact lineage of t up until the $i^{th}$ level (including); formally, $D(t, i) = |U_{j=1}^{i} L_t[j]|$. Define $$\text{Recall}(t, i) = \frac{|ApproxLineage(t, D(t, i)) \cap L_t[i]|}{|L_t[i]|}$$

where ApproxLineage(t, D(t, i)) is the set of the top D(t, i) (by lineage similarity) tuples, returned as explanations (i.e., approximate lineage) for t by our system. $L_t$ is the hierarchical list structure for t, as defined above, i.e., $L_t[i]$ is the set of all lineage tuples at the $i^{th}$ derivation depth level of t.

Initial Experiments

In [32-A] Inventors present initial experimentation results on both the MovieLens [22-A] and BFPDB [28-A] datasets. These experiments focus on direct lineage analysis, comparing per-tuple lineage vectors with per-column lineage vectors, and exhibit the usefulness of improvements suggested herein, such as Bloom-Filters of queries.

Advanced Experiments—BFPDB Dataset

Results of at least some embodiments of the lineage tracking approach described herein over the USDA BFPDB dataset [28-A] on more elaborate and complex test scenarios, are presented. In particular, the focus is on tuples with multiple generations in their lifelong lineage history which are analyzed in terms of direct and distant lineage. The performance of embodiments described herein are quantitatively assessed using precision and per-level recall (e.g., as described herein) and qualitatively by observing the "top-n" returned lineage tuples (by similarity).

It is noted that Bloom-Filters of queries are not applicable to the querying of distant lineage. Hence, they are not used in the following experiments. Optional improvements described herein, such as query-dependent column weighting, tuple creation timestamp and weighting with query dependency DAG are used (in the following experiments) for both the Tuple Vectors and the Column Vectors approximate lineage computation methods.

The USDA Branded Food Products Database (BFPDB) [28-A] is the result of a Public-Private Partnership, whose goal is to enhance public health and the sharing of open data by complementing USDA Food Composition Databases with nutrient composition of branded foods and private label data, provided by the food industry. Among others, the dataset includes three tables: Products—contains basic information on branded products (manufacturer, name, ingredients). Nutrients—each tuple contains all nutrient value information about some product. Serving_size—each tuple contains information about a product's serving size (as well as unit of measurement) and food preparation state. Each product in the BFPDB dataset has a unique identifier, ndb_no.

Inventors simulated a DBMS that contains a significant portion of tuples that depend on the contents of the BFPDB dataset, as a platform for testing and analyzing distant lineage. Thus, Inventors built a hierarchy of "materialized views", such that each "view" is a table, constructed from tuples that were generated by a single query. In particular, the following materialized views are detailed (the text colors are intended as a visual aid, such that each lineage generation has a brighter color, the farther it is from the base relations): sugars was directly created from tuples of the tables products and nutrients. It contains all the products-related information from the products table, for products that have a sugars nutrient-related information in the nutrients table. exp2 was directly created from tuples of the materialized views unprepared and protein. It contains distinct manufacturers of products that have water as an ingredient, and contain protein nutrient information; also, these manufacturers produce unprepared products. exp3 was directly created from tuples of the materialized views prepared, unprepared and protein. It contains distinct manufacturers of products that have water and sugar as an ingredient, and contain protein nutrient information; also, these manufacturers produce prepared and unprepared products. exp4 was directly created from tuples of the materialized views exp2 and readytodrink. It contains distinct names of readytodrink products that contain mango in their name, and are produced by manufacturers from the exp2 materialized view.

As stated earlier, Inventors consider those tables that do not depend on the contents of the DB when these tables are created, and thereafter, as base tables. Again, note that tuples can be manually inserted to and deleted from base tables, but, not in a programmatic manner over the DB, e.g., via a SQL INSERT statement that is based on the DB contents. In the present case, the base tables are: products, nutrients and serving_size. Note that each materialized view depends directly on tuples from the base tables (as defined above) or on tuples from other previously constructed materialized views.

Experiments

Inventors tested queries on a subset of the BFPDB dataset, that consists of all the tables and materialized views discussed above. In the experiments Inventors mimic an analyst's interaction with the data by comparing the approximate lineage vectors of a target tuple with a "heterogeneous" group of tuples (e.g., all related base tables or all related materialized views) and ranking all the tuples among the group according to similarity scores.

Experiment 1

Inventors ask for distinct manufacturers that appear in the exp3 materialized view, and produce products that have salt as an ingredient:
  SELECT p.manufacturer
  FROM exp3, products p
  WHERE exp3.manufacturer=p.manufacturer
  AND POSITION ('salt' IN p.ingredients)>0
  GROUP BY p.manufacturer Reference is now made to FIG. 13, which is a table presenting results of Experiment 1, in accordance with some embodiments of the present invention.

The table of FIG. 13 presents lineage related statistics, collected when computing the approximate lineage of the single result tuple in the output of a query (red gold) against all the tuples from the related base tables: products, nutrients and serving_size, which contain 29,322 tuples in total, as part of Experiment 1, in accordance with some embodiments of the present invention.

Reference is now made to FIG. 14, which is another table presenting results of Experiment 1, for the querying of lineage for the tuple red gold vs. related base tables with column vectors, including an analyst's view, in accordance with some embodiments of the present invention.

Reference is now made to FIG. 15, which is another table presenting results of Experiment 1, for the querying of lineage for the tuple red gold vs. related base tables with tuple vectors, including an analyst's view, in accordance with some embodiments of the present invention.

FIGS. 14-15 present the top 20 tuples from the related base tables, ranked by similarity, using the CV and TV methods, respectively. Inventors make the following observations by analyzing the results: (1) The lineage sizes of the different levels (1-3) sum up to more than the total distant lineage size (63+0+160>160). In this case, it means that all 63 tuples from the $1^{st}$ lineage level (which contains tuples from the products relation) are also a part of the $3^{rd}$ lineage level (which contains tuples from the products, nutrients and serving_size relations). From analyzing the query Inventors conclude that these are the 63 tuples from the products table that affect the query result directly (via the FROM clause) and indirectly (via tuples from exp 3). (2) The Column Vectors (CV) method demonstrates overall superiority, compared to the Tuple Vectors (TV) method. Moreover, the CV method has a precision of 0.9 for the top 0.75·160=120 tuples in the approximate lineage, and 0.74 for the top 160 tuples. That is, most of the errors are produced for the lower ranked tuples (ranked 121, . . . , 160). (3) The CV method exhibits relatively high L[1] and L[3] recall scores (see FIG. 13), evidenced by observing the Lineage Level(s) column in FIG. 14. That is, not only that all the top-20 tuples by similarity are really a part of the distant lineage, but also, the ranking preserves a level-based bias (most of the top-20 are in the $1^{st}$ lineage level). By contrast, the TV method is less impressive on this front, as is evidenced by the No results in FIG. 15. Note that a random choice of the top 160 lineage tuples would have yielded a $$\frac{160}{29,322} \approx 0.006$$

precision score, which is several orders of magnitude worse than the scores of the CV and TV methods.

Experiment 2

Inventors ask for distinct pairs of (manufacturer, name) for products from the sugars materialized view, that contain rice in their name, and are produced by manufacturers that appear in the exp2 materialized view:
  SELECT p.manufacturer, t.name
  FROM (SELECT DISTINCT sgr.name
    FROM exp2, sugars sgr
    WHERE exp2.manufacturer=sgr.manufacturer
    AND POSITION ('rice' IN sgr.name)>0) t, products p
  WHERE t.name=p.name
  GROUP BY p.manufacturer, t.name Reference is now made to FIG. 16, which is a table of experimental results for Experiment 2, in accordance with some embodiments of the present invention.

Reference is now made to FIG. 17, which is another table of experimental results for Experiment 2 for the querying of lineage for the result tuple No. 2 vs. related materialized views with column vectors, including an analyst's view, in accordance with some embodiments of the present invention. FIG. 17 presents results for tuple No. 2 vs. related materialized views with Column Vectors, including an analyst's view.

Reference is now made to FIG. 18 for the querying of lineage for the result tuple No. 2 vs. related materialized views with tuple vectors, including an analyst's view, which is another table of experimental results for Experiment 2, in accordance with some embodiments of the present invention. FIG. 18 presents results for tuple No. 2 vs. related materialized views with Tuple Vectors, including an analyst's view.

Figure 16:
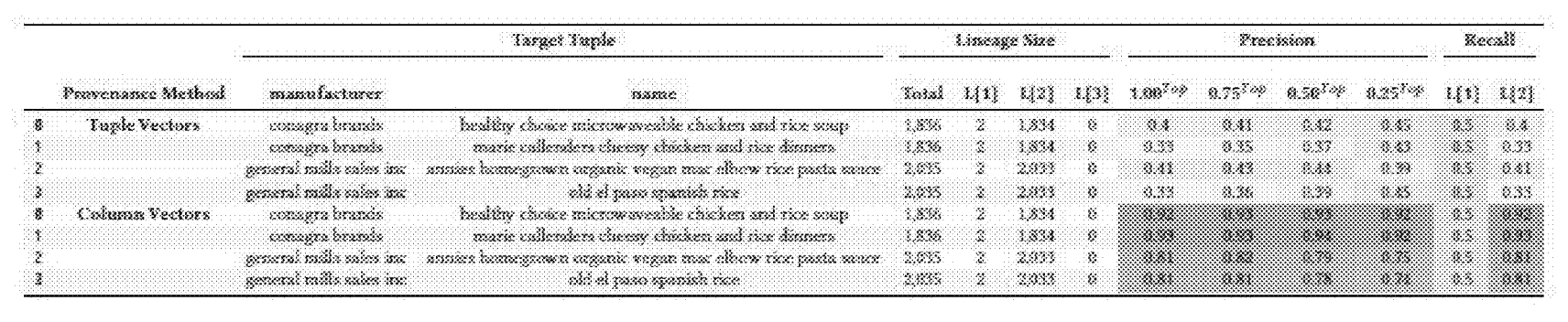

The table of FIG. 16 presents lineage related statistics, collected when computing the approximate lineage of four (out of nine, for brevity) of the result tuples in the output of this query against all the tuples from the related materialized views: exp2, protein, sugars and unprepared, which contain 10,298 tuples in total. Tables of FIGS. 17-18 present the top 15 tuples from the related materialized views, ranked by similarity to result tuple No. 2, using the CV and TV methods, respectively. Inventors make the following observations by analyzing the results: (1) Once again, the CV method demonstrates overall superiority, compared to the TV method, in terms of total precision and per-level recall. Analyzing result tuple No. 2, the top rated tuple in both the CV and TV methods (see FIG. 17 and FIG. 18, respectively) is the only sugars tuple in the $1^{st}$ lineage level. The $2^{nd}$ tuple in the $1^{st}$ (L[1]) lineage level (from exp2) is "discovered" earlier (ranked $3^{rd}$ vs. $5^{th}$) in the CV method, with no similarity score separation from the higher ranked tuples. By contrast, the TV method exhibits a significant similarity score drop all across the top 15 ranked tuples (0.97 for $1^{st}$ ranked vs. 0.81 for $5^{th}$ ranked vs. 0.65 for $15^{th}$ ranked). Inventors view a more stable similarity score progression as indicating a better overall performance. (3) Analyzing Tables of FIGS. 17-18, it seems the numbers for result No. 2 are not as good (compared to previous experiments and the result tuples No. 0 and No. 1 in this current experiment). A closer look reveals that out of the top 100 ranked tuples (by similarity)—all the mistakes are made on tuples from the sugars and protein materialized views. The No tuples from sugars and protein are mostly products that appear also in the unprepared materialized view, and are actually in the lineage (i.e., Yes tuples) of result tuple No. 2. It seems that these No tuples from sugars and protein have the same lineage vectors per the product related columns as the respective Yes tuples from unprepared. Now, the Query Dependency DAG has no real filtering capabilities in this case (since the queries that created sugars and protein are relevant), hence Inventors are not able to effectively eliminate these mistakes.

Experiment 3

Inventors ask for distinct pairs of (manufacturer, name) for products that are listed in the exp4 materialized view:

SELECT p.manufacturer, exp4.name
FROM exp4, products p
WHERE exp4.name=p.name
GROUP BY p.manufacturer, exp4.name Reference is now made to FIG. 19, which is a table of experimental results for Experiment 3, in accordance with some embodiments of the present invention. FIG. 19 presents query results vs. related base tables (products, nutrients and serving_size).

Reference is now made to FIG. 20, which is another table of experimental results for Experiment 3, for the querying of lineage for the result tuple No. 0 vs. related base tables with column vectors, including an analyst's view, in accordance with some embodiments of the present invention. FIG. 20 presents results for tuple No. 0 vs. related base tables with Column Vectors, including an analyst's view.

Reference is now made to FIG. 21, which is another table of experimental results for Experiment 3, for the querying of lineage for the result tuple No. 0 vs. related base tables with tuple vectors, including an analyst's view, in accordance with some embodiments of the present invention. FIG. 19 presents results for tuple No. 0 vs. related base tables with Tuple Vectors, including an analyst's view.

The Table of FIG. 19 presents lineage related statistics, collected when computing the approximate lineage of the (two) result tuples in the output of this query ((campbell soup company, v8 beverage carrot mango), (campbell soup company, v8 vfusion beverage peach mango)) against all the tuples from the related base tables: products, nutrients and serving_size, which contain 29,322 tuples in total. Tables of FIGS. 20-21 present a subset of the top 83 tuples from the related base tables, ranked by similarity to result tuple No. 0, using the CV and TV methods, respectively. Inventors make the following observations by analyzing the results: (1) The lineage sizes (of both result tuples) of the different levels (1-4) sum up to more than the total distant lineage sizes. E.g., looking at result tuple No. 0:2+0+4+80>82. In this case, it means that at least two of the four tuples from the $3^{rd}$ lineage level (which contains tuples from the products and serving_size relations) are also a part of either the $1^{st}$ lineage level (which contains tuples from the products relation), or the $4^{th}$ lineage level (which contains tuples from the products, nutrients and serving_size relations). (2) The Column Vectors (CV) method demonstrates overall superiority, compared to the Tuple Vectors (TV) method, topping at a precision score of 0.81 for the top 82 (total lineage size) approximate lineage tuples, for both result tuples. Moreover, the TV method demonstrates unusually low ($\approx 0.2$) precision scores for this query. (3) The TV method exhibits perfect L[1] and L[3] recall scores, and a low L[4] recall score, for both result tuples (see FIG. 19). Inventors conclude that the TV method is highly effective in finding the $1^{st}$ and $3^{rd}$ lineage-level tuples, but performs poorly in finding the $4^{th}$ lineage-level tuples, as is evidenced by the No results in the Table of FIG. 20. (4) The CV method exhibits relatively high L[1] and L[4] recall scores and a somewhat mediocre L[3] recall score for both result tuples (see Table of FIG. 19), evidenced by observing the Lineage Level(s) column in Table of FIG. 20. That is, not only that almost all the top-20 tuples by similarity are really a part of the distant lineage, but also, the ranking preserves a level-based bias (the top-2 tuples are the only ones that appear both in the $1^{st}$, $3^{rd}$ and $4^{th}$ lineage levels). (5) Analyzing the Tables of FIGS. 20-21, Inventors note that the two $3^{rd}$ lineage-level tuples from the serving_size relation are discovered significantly earlier in the ranking by the TV method ($3^{rd}$ and $4^{th}$ tuples, by similarity) in comparison with the CV method ($80^{th}$ and $83^{rd}$ tuples, by similarity). This means that the TV method does a better job on the $3^{rd}$ lineage level, in terms of recall. This observation is backed up by the L[3] recall results Inventors see in the Table of FIG. 19. (6) Notice the $4^{th}$ ranked tuple (by similarity) in the Table of FIG. 20, which is a No lineage tuple, with a relatively high similarity score. A closer look reveals that this tuple is a product named v8 splash beverage mango peach, which is also produced by campbell soup company. Interestingly, it also appears as the first No tuple when analyzing result tuple No. 1 vs. related base tables with the CV method (we do not show this explicitly). Note that a random choice of the top 82 lineage tuples would have yielded a $$\frac{82}{29,322} \approx 0.003$$

precision score, which is several orders of magnitude worse than the scores of the CV (and even the TV) methods.

Long Vectors Search Experiment

Inventors performed calculations and/or experiments to evaluate searching using the long vectors, created as described herein. Inventors have experimented with the long vectors approach described herein and exhibited that it computes the correct result as well as the fact that by using the approximate search, made possible by using long vectors, Inventors obtain a speedup of about ×25.

Experimental results that corroborate the correctness of the proof of correctness of the method of searching involving constant cardinality of sets of vectors described above is now provided. Then, inventors show that the approach of at least some embodiments described herein may be significantly accelerated by using an approximate (quantization based) vector search algorithm [11-B], while maintaining a reasonably high "k-closest sets" recall score. Inventors conclude that this performance boost makes the approach of at least some embodiments practical, and scale-able to massive databases of sets of vectors.

Dataset

To the extent of Inventor's knowledge, there is no current benchmark to compare the performance of nearest neighbor search approaches on datasets of sets of vectors. As in [11-B], Inventors choose the Glove1.2M dataset for benchmarking, for its data distribution properties (low correlation across dimensions and equal variance in each dimension). This dataset contains roughly 1.2 million GloVe [20-B] word vectors, each of dimension 100, trained on a twitter-derived corpus, and is a publicly available benchmark at ann-benchmarks(dot)com [3-B]. To construct a database of sets of vectors of a constant cardinality, Inventors choose the hyperparameter N=3 and divided the Glove1.2M dataset into roughly 400 k sets of N=3 vectors each. The dataset has additional 10 k test vectors, which is also transformed into around 3.3 k test sets of N=3 vectors each.

Metrics.

Throughout the experiments, inventors measured the recall, i.e., the fraction of true k-closest neighbors found, for different values of k, on average over all test queries, against the time it takes to serve a single search query, on average over all test queries. The true k-closest neighbors for each of the test queries are calculated with an exact brute-force search on vector sets implementation, using the vector set-vector set similarity formula from section 2.2.

Hardware Setup.

Benchmarks used by Inventors are all conducted on an Intel Xeon 5220R machine with a single CPU thread (unless explicitly stated otherwise).

Experiments

Exact Search

A naive brute-force search implementation, using long vectors (as described herein) was implemented to compare the k-closest retrieved by this approach, against the true neighbors, for different values of $k \in [1, 10]$, over all test queries. The results showed perfect outputs, in terms of recall (1.0) and the order of the returned k-closest neighbors. This gives an experimental corroboration to the correctness of the proof presented with reference to FIGS. 16 and/or 17.

Approximate Search

First, for reference, it is noted that an exact brute-force search on vectors sets takes around 2700 milliseconds (ms) per query, on average over all test queries. The choice of k for the k-closest task, with a brute-force exact search, does not affect the running time since the bottleneck is in the sorting phase.

Figure 22:
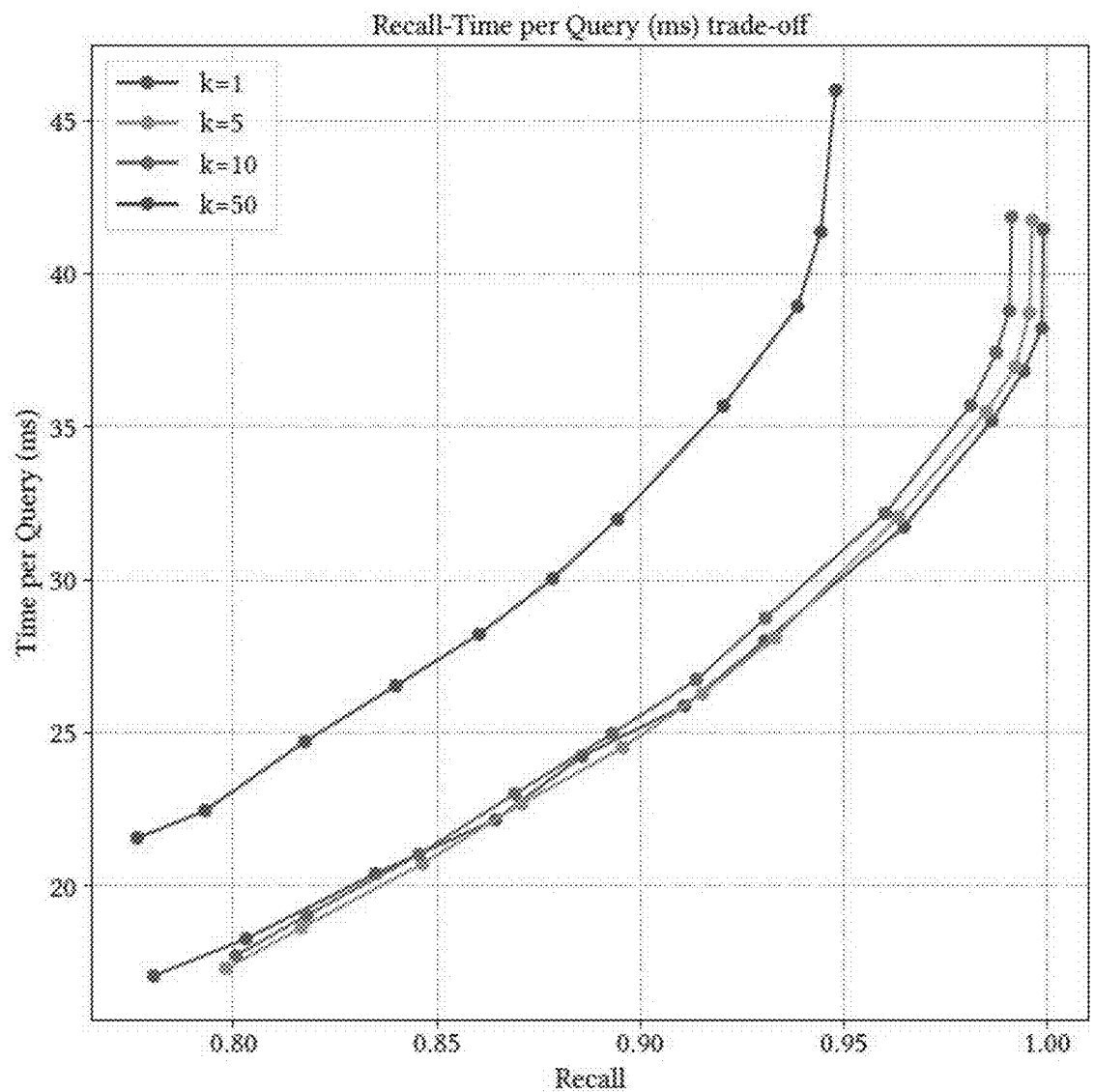
FIG. 22, which is a graph of recall-time per query (milliseconds (ms)) trade-off for k-closest task (with different k values), of experiments performed to evaluation the Cosine based long vectors approach, in accordance with some embodiments of the present invention.

Reference is now made to FIG. 22, which is a graph of recall-time per query (ms) trade-off for k-closest task (with different k values), of experiments performed to evaluate the Cosine based long vectors approach, in accordance with some embodiments of the present invention.

Each testing point on a curve, was derived using Google's approximate (quantization based) vector search algorithm [11-B], and tweaking its num_leaves_to_search hyperparameter. Specifically, for k=10 Inventors got a 0.991 mean recall score, with a 0.033 std, over all test queries at just 41.9 ms per query. I.e., Inventors obtained a speedup of ×64 using an approximate search over long vectors, while maintaining a very high recall score. It should be noted that additional speedup can be gained with parallelization (on an 8-core Xeon 5220R machine) and batching of the search queries. Choosing k=10 with a mean recall of 0.991 goes down to 15.8 ms per query on non-batched queries, and down to 6.2 ms on batched queries.

Another Experiment Based on the Pseudocode with Respect to FIG. 10 and/or FIG. 11

A series of experiments that corroborate the correctness of approach described herein, for example, with reference to FIG. 10 and/or FIG. 11, are now described. The experiments exhibit a significant performance boost, compared to current methods, by using an approximate (quantization based) vector search algorithm [8-D], while maintaining a very high "k-closest sets" recall score.

Metrics

The recall, i.e., the fraction of true k-closest neighbors found, is measured for different values of k, on average over all test queries, against the time it takes to serve a single search query, on average over all test queries. The true k-closest neighbors for each of the test queries are calculated with an exact brute-force search on vector sets implementation, using the vector-set-vector-set similarity formula described herein.

Hardware Setup

Benchmarks were conducted on an Intel Xeon 5220R machine with a single CPU thread.

Dataset

Inventors choose the Sift1M [10-D] dataset for benchmarking. This dataset contains 1 million local SIFT [13-D] image descriptors (vectors), each of dimension 128, and is a publicly available benchmark (for Euclidean distance) at http://ann-benchmarks(dot)comann-benchmarks(dot)com [4-D]. Inventors constructed a database of sets of vectors of varying cardinalities (out of a pre-defined set of possible cardinalities), i.e., choosing the hyperparameter PC={1,2,3} and dividing the Sift1M dataset into 250K sets of cardinality 1, 125K sets of cardinality 2 and around 83.3K sets of cardinality 3. The dataset has additional 10K test vectors, which Inventors also transformed into 2K test sets of cardinality 1, 2K test sets of cardinality 2 and 2K test sets of cardinality 3. It is noted that each candidate set B of cardinality $|B| \in PC$ and dimension D=128 is transformed into $|PC|=|1,2,3|=3$ long vectors of dimension $(t \cdot |B|+1) \cdot D$, for each t in PC, that is, a total of $3 \cdot (1+2+3) \cdot |B| \cdot D = 18 \cdot |B| \cdot D$. With a dataset of sets that takes roughly 800 MB in RAM, the constructed long vectors occupy roughly 9.3 GB, meaning, about a 10× in this case, which is reasonable given the performance gains.

Approximate Search

First, for reference, it is noted note that an exact brute-force search on vector sets takes roughly 11500 ms per query, on average over all test queries. This brute-force search is an exhaustive, non-optimized search, utilizing Scipy's [19-D] implementation for pair-wise squared Euclidean distance calculation between two sets of vectors.

Figure 23:
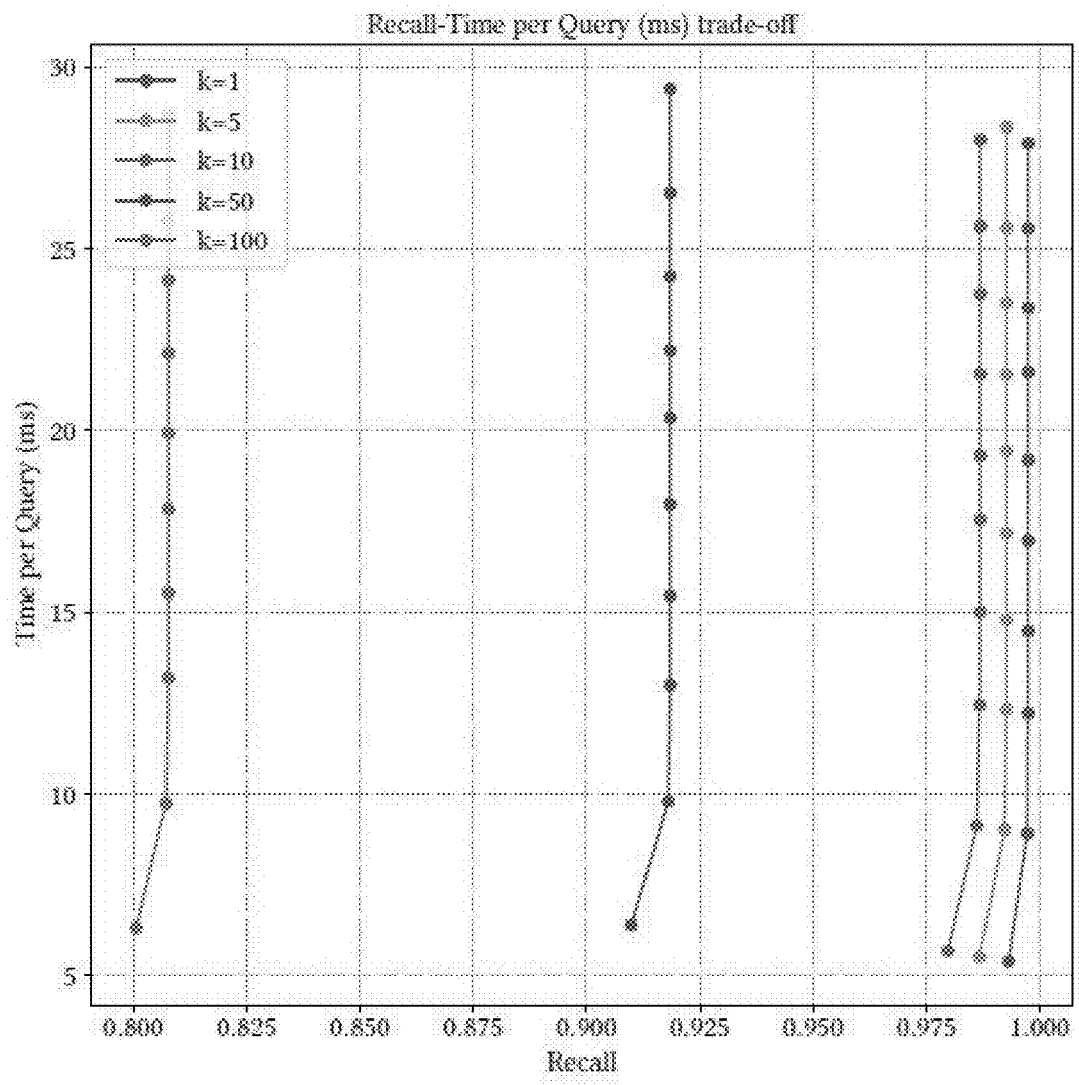
FIG. 23 is a graph depicting experimental results of time per query vs. recall curve, using an approximate search on Euclidean based long vectors, for different choices of k, in accordance with some embodiments of the present invention.

Reference is now made to FIG. 23, which is a graph depicting experimental results of time per query vs. recall curve, using an approximate search on Euclidean based long vectors, for different choices of k, in accordance with some embodiments of the present invention. Each testing point on a curve was derived using Google's ScaNN [8-D], fixing the num_leaves hyperparameter on 1000, and tweaking its num_ leaves_to_search hyperparameter. Specifically, for k=10 and num_leaves_to_search=900, a 0.99 mean recall score, with a 0.046 std, is obtained over all test queries at 25.63 ms per query. That is, a speedup of about 450×, over exact brute-force search of vector sets, is obtained using an approximate search over long vectors, while maintaining a very high recall score. For another choice of hyperparameters, k=10 and num_leaves_to_search=100, a 0.979 mean recall score, with a 0.055 std, is obtained over all test queries at 5.67 ms per query. Note that compared to the achieved results on the Glove1.2M dataset (with cosine similarity-based long vectors), the ones in FIG. 23 show better (and more robust) results in terms of time per query vs. recall.

REFERENCES (ALL OF WHICH ARE INCORPORATED HEREIN BY REFERENCE IN THEIR ENTIRETY)

[1-A] Eleanor Ainy, Pierre Bourhis, Susan B. Davidson, Daniel Deutch, and Tova Milo. 2015. Approximated Summarization of Data Provenance. In Proceedings of the 24th ACM International on Conference on Information and Knowledge Management (Melbourne, Australia) (CIKM '15). Association for Computing Machinery, New York, NY, USA, 483-492. https://doi(dot)org/10(dot)1145/2806416(dot)2806429

[2-A] Paulo SΘrgio Almeida, Carlos Baquero, Nuno Preguita, and David Hutchison. 2007. Scalable Bloom Filters. Inf. Process. Lett. 101, 6 (March 2007), 255-261.

[3-A] Siddhant Arora and Srikanta Bedathur. 2020. On Embeddings in Relational Databases. arXiv:2005.06437 [cs.DB]

[4-A] Rajesh Bordawekar, Bortik Bandyopadhyay, and Oded Shmueli. 2017. Cognitive Database: A Step towards Endowing Relational Databases with Artificial Intelligence Capabilities. CoRR abs/1712.07199 (2017). arXiv: 1712.07199 http://arxiv(dot)org/abs/1712(dot)07199

[5-A] Rajesh Bordawekar and Oded Shmueli. [n.d.]. Creating cognitive intelligence queries from multiple data corpuses. U.S. Pat. No. 10,984,030 (2021).

[6-A] Rajesh Bordawekar and Oded Shmueli. 2016. Enabling Cognitive Intelligence Queries in Relational Databases using Low-dimensionalWord Embeddings. CoRR abs/1603.07185 (2016). arXiv:1603.07185 http://arxiv(dot)org/abs/1603(dot)07185

[7-A] Rajesh Bordawekar and Oded Shmueli. 2017. Using Word Embedding to Enable Semantic Queries in Relational Databases. In Proceedings of the 1st Workshop on Data Management for End-to-End Machine Learning, DEEM@SIGMOD 2017, Chicago, IL, USA, May 14, 2017, Sebastian Schelter and Reza Zadeh (Eds.). ACM, 5:1-5:4. https://doi(dot)org/10(dot)1145/3076246(dot)3076251

[8-A] Peter Buneman, Sanjeev Khanna, and Wang Chiew Tan. 2001. Why and Where: A Characterization of Data Provenance. In Database Theory—ICDT 2001, 8th International Conference, London, UK, Jan. 4-6, 2001, Proceedings (Lecture Notes in Computer Science, Vol. 1973), Jan Van den Bussche and Victor Vianu (Eds.). Springer, 316-330. https://doi(dot)org/10(dot)1007/3-540-44503-X_20

[9-A] Riccardo Cappuzzo, Paolo Papotti, and Saravanan Thirumuruganathan. 2020. Creating Embeddings of Heterogeneous Relational Datasets for Data Integration Tasks. In Proceedings of the 2020 ACM SIGMOD International Conference on Management of Data (Portland, OR, USA) (SIGMOD '20). Association for Computing Machinery, New York, NY, USA, 1335-1349. https://doi(dot)org/10(dot)1145/3318464(dot)3389742

[10-A] Daniel Cer, Yinfei Yang, Sheng-yi Kong, Nan Hua, Nicole Limtiaco, Rhomni St. John, Noah Constant, Mario Guajardo-Cespedes, Steve Yuan, Chris Tar, Yun-Hsuan Sung, Brian Strope, and Ray Kurzweil. [n.d.]. Universal Sentence Encoder. https://github(dot)com/tensorflow/tfjs-models/tree/master/universalsentence-encoder.

[11-A] Daniel Cer, Yinfei Yang, Sheng-yi Kong, Nan Hua, Nicole Limtiaco, Rhomni St. John, Noah Constant, Mario Guajardo-Cespedes, Steve Yuan, Chris Tar, Yun-Hsuan Sung, Brian Strope, and Ray Kurzweil. 2018. Universal Sentence Encoder. CoRR abs/1803.11175 (2018). arXiv: 1803.11175 http://arxiv(dot)org/abs/1803(dot)11175

[12-A] James Cheney, Laura Chiticariu, Wang-Chiew Tan, et al. 2009. Provenance in databases: Why, how, and where. Foundations and TrendsR in Databases 1, 4 (2009), 379-474.

[13-A] Yingwei Cui, Jennifer Widom, and Janet L. Wiener. 2000. Tracing the Lineage of View Data in a Warehousing Environment. ACM Trans. Database Syst. 25, 2 (June 2000), 179-227. https://doi(dot)org/10(dot)1145/357775(dot)357777

[14-A] Daniel Deutch, Nave Frost, and Amir Gilad. 2017. Provenance for Natural Language Queries. Vldb 10, 5 (2017), 577-588. https://doi(dot)org/10(dot)14778/3055540(dot)3055550

[15-A] Daniel Deutch, Amir Gilad, and Yuval Moskovitch. 2015. Selective provenance for datalog programs using top-k queries. Proceedings of the VLDB Endowmen (2015). https://doi(dot)org/10(dot)14778/2824032(dot)2824039

[16-A] Daniel Deutch, Tova Milo, Sudeepa Roy, and Val Tannen. 2014. Circuits for Datalog Provenance. Icdt (2014).

[17-A] Jacob Devlin, Ming-Wei Chang, Kenton Lee, and Kristina Toutanova. 2018. BERT: Pre-training of Deep Bidirectional Transformers for Language Understanding. arXiv preprint arXiv:1810.04805 (2018).

[18-A] Dan Gillick, Cliff Brunk, Oriol Vinyals, and Amarnag Subramanya. 2016. Multilingual Language Processing From Bytes. Proceedings of the 2016 Conference of the North American Chapter of the Association for Computational Linguistics: Human Language Technologies (2016). https://doi(dot)org/10(dot)18653/v1/n16-1155

[19-A] Aristides Gionis, Piotr Indyk, and Rajeev Motwani. 1999. Similarity Search in High Dimensions via Hashing. In Proceedings of the 25th International Conference on Very Large Data Bases (VLDB '99). Morgan Kaufmann Publishers Inc., San Francisco, CA, USA, 518-529.

[20-A] Todd J Green, Grigoris Karvounarakis, and Val Tannen. 2007. Provenance semirings. In Proceedings of the twenty-sixth ACM SIGMOD-SIGACT-SIGART symposium on Principles of database systems. ACM, 31-40.

[21-A] Michael Günther, Maik Thiele, Julius Gonsior, and Wolfgang Lehner. 2021. Pre-Trained Web Table Embeddings for Table Discovery. In Fourth Workshop in Exploiting AI Techniques for Data Management (Virtual Event, China) (aiDM '21). Association for Computing Machinery, New York, NY, USA, 24-31. https://doi(dot)org/10(dot)1145/3464509(dot)3464892.

[22-A] F. Maxwell Harper and Joseph A. Konstan. 2015. The MovieLens Datasets: History and Context. ACM Trans. Interact. Intell. Syst. 5, 4, Article 19 (December 2015), 19 pages. https://doi(dot)org/10(dot)1145/2827872

[23-A] Zack Ives, Yi Zhang, Soonbo Han, and Nan Zheng. 2019. Dataset Relationship Management. In CIDR 2019, 9th Biennial Conference on Innovative Data Systems Research, Asilomar, CA, USA, Jan. 13-16, 2019, Online Proceedings. www(dot)cidrdb(dot)org. http://cidrdb(dot)org/cidr2019/papers/p55-ives-cidr19(dot)pdf

[24-A] Zachary G. Ives, Todd J. Green, Grigoris Karvounarakis, Nicholas E. Taylor, val Tannen, Partha Pratim Talukdar, Marie Jacob, and Fernando Pereira. 2008. The ORCHESTRA Collaborative Data Sharing System. ACM SIGMOD Record (2008). https://doi(dot)org/10(dot)1145/1462571(dot)1462577

[25-A] Grigoris Karvounarakis and Todd J. Green. 2012. Semiring-annotated Data: Queries and Provenance? SIGMOD Rec. 41, 3 (October 2012), 5-14. https://doi(dot)org/10(dot)1145/2380776(dot)2380778

[26-A] Grigoris Karvounarakis, Zachary G. Ives, and Val Tannen. 2010. Querying data provenance. In Proceedings of the 2010 international conference on Management of data-SIGMOD '10. https://doi(dot)org/10(dot)1145/1807167(dot)1807269

[27-A] Dan Klein and Christopher Manning. 2004. Corpus-Based Induction of Syntactic Structure: Models of Dependency and Constituency. In Proceedings of the 42nd Annual Meeting of the Association for Computational Linguistics (ACL-04). Barcelona, Spain, 478-485. https://doi(dot)org/10(dot)3115/1218955(dot)1219016

[28-A] Alison Kretser, Delia Murphy, and Pamela Starke-Reed. 2017. A partnership for public health: USDA branded food products database. Journal of Food Composition and Analysis 64 (2017), 10-12. https://doi(dot)org/10(dot)1016/j(dot)jfca.2017(dot)07(dot)019 The 39th National Nutrient Databank Conference: The Future of Food and Nutrient Databases: Invention, Innovation, and Inspiration.

[29-A] Seokki Lee, Bertram Ludascher, and Boris Glavic. 2018. Provenance Summaries for Answers and Non-Answers. Proc. VLDB Endow. 11, 12 (August 2018), 1954-1957. https://doi(dot)org/10(dot)14778/3229863(dot)3236233

[30-A] Seokki Lee, Xing Niu, Bertram Ludascher, and Boris Glavic. 2017. Integrating Approximate Summarization with Provenance Capture. In Proceedings of the $9^{th}$ USENIX Conference on Theory and Practice of Provenance (Seattle, WA) (TaPP'17). USENIX Association, USA, 2.

[31-A] Guillaume Lelarge. 2012. Hooks in PostgreSQL. (2012). Talk at FOSDEM 2012 and pgCon 2012.

[32-A] Michael Leybovich and Oded Shmueli. 2020. ML Based Provenance in Databases. In AIDB@VLDB 2020, $2^{nd}$ International Workshop on Applied AI for Database Systems and Applications, Held with VLDB 2020, Monday, Aug. 31, 2020, Online Event/Tokyo, Japan, Bingsheng He, Berthold Reinwald, and Yingjun Wu (Eds.). https://tinyurl(dot)com/LeybovichS20

[33-A] Michael Leybovich and Oded Shmueli. 2021. Efficient Set of Vectors Search. arXiv:2107.06817 [cs.DS]

[34-A] Andrew L. Maas, Raymond E. Daly, Peter T. Pham, Dan Huang, Andrew Y. Ng, and Christopher Potts. 2011. Learning Word Vectors for Sentiment Analysis. In Proceedings of the 49th Annual Meeting of the Association for Computational Linguistics: Human Language Technologies-Volume 1 (Portland, Oregon) (HLT '11). Association for Computational Linguistics, Stroudsburg, PA, USA, 142-150. http://dl(dot)acm(dot)org/citation(dot)cfm?id=2002472(dot)2002491

[35-A] Igor Mel'čuk. 1988. Dependency Syntax: Theory and Practice. State University of New York Press.

[36-A] Tomas Mikolov, Kai Chen, Greg Corrado, and Jeffrey Dean. 2013. Efficient Estimation of Word Representations in Vector Space. In $1^{st}$ International Conference on Learning Representations, ICLR 2013, Scottsdale, Arizona, USA, May 2-4, 2013, Workshop Track Proceedings, Yoshua Bengio and Yann LeCun (Eds.). http://arxiv(dot)org/abs/1301(dot)3781

[37-A] Tomas Mikolov, Ilya Sutskever, Kai Chen, Gregory S. Corrado, and Jeffrey Dean. 2013. Distributed Representations of Words and Phrases and their Compositionality. In Advances in Neural Information Processing Systems 26: 27th Annual Conference on Neural Information Processing Systems 2013. Proceedings of a meeting held Dec. 5-8, 2013, Lake Tahoe, Nevada, United States, Christopher J. C. Burges, Leon Bottou, Zoubin Ghahramani, and Kilian Q. Weinberger (Eds.). 3111-3119. http://papers(dot)nips(dot)cc/paper/5021-distributed-representations-of-wordsand-phrases-and-their-compositionality

[38-A] Tomas Mikolov, Wen-tau Yih, and Geoffrey Zweig. 2013. Linguistic Regularities in Continuous Space Word Representations. In Human Language Technologies: Conference of the North American Chapter of the Association of Computational Linguistics, Proceedings, Jun. 9-14, 2013, Westin Peachtree Plaza Hotel, Atlanta, Georgia, USA, Lucy Vanderwende, Hal Daume III, and Katrin Kirchhoff (Eds.). The Association for Computational Linguistics, 746-751. https://www(dot)aclweb(dot)org/anthology/N13-1090/

[39-A] Jeffrey Pennington, Richard Socher, and Christopher D. Manning. 2014. GloVe: Global Vectors for Word Representation. In Empirical Methods in Natural Language Processing (EMNLP). 1532-1543. http://www(dot)aclweb(dot)org/anthology/D14-1162

[40-A] provenance. 2020. In Meriam-Webster(dot)com. Meriam-Webster. Retrieved Apr. 20, 2020, from https://www(dot)merriam-webster(dot)com/dictionary/provenance.

[41-A] Christopher Re and Dan Suciu. 2008. Approximate Lineage for Probabilistic Databases. Proc. VLDB Endow. 1, 1 (August 2008), 797-808. https://doi(dot)org/10(dot)14778/1453856(dot)1453943

[42-A] Radim Řehůřek and Petr Sojka. 2010. Software Framework for Topic Modelling with Large Corpora. In Proceedings of the LREC 2010 Workshop on New Challenges for NLP Frameworks. ELRA, Valletta, Malta, 45-50. http://is(dot)muni(dot)cz/publication/884893/en.

[43-A] Pierre Senellart. [n.d.]. ProvSQL on Github. https://github(dot)com/PierreSenellart/provsql.

[44-A] Pierre Senellart. 2017. Provenance and Probabilities in Relational Databases: From Theory to Practice. ACM SIGMOD Record (2017), 5-15. https://doi(dot)org/10(dot)1145/3186549(dot)3186551

[45-A] Pierre Senellart, Louis Jachiet, and D I Ens. 2018. ProvSQL: Provenance and Probability Management in PostgreSQL. Vldb (2018), 2034-2037. https://doi(dot)org/10(dot)14778/3229863(dot)3236253

[46-A] Kohei Sugawara, Hayato Kobayashi, and Masajiro Iwasaki. 2016. On Approximately Searching for Similar-Word Embeddings. In Proceedings of the 54th Annual Meeting of the Association for Computational Linguistics (Volume 1: Long Papers). Association for Computational Linguistics, Berlin, Germany, 2265-2275. https://doi(dot) org/10(dot)18653/v1/P16-1214

[47-A] Yonghui Wu, Mike Schuster, Zhifeng Chen, Quoc V. Le, Mohammad Norouzi, Wolfgang Macherey, Maxim Krikun, Yuan Cao, Qin Gao, Klaus Macherey, Jeff Klingner, Apurva Shah, Melvin Johnson, Xiaobing Liu, Łukasz Kaiser, Stephan Gouws, Yoshikiyo Kato, Taku Kudo, Hideto Kazawa, Keith Stevens, George Kurian, Nishant Patil, Wei Wang, Cliff Young, Jason Smith, Jason Riesa, Alex Rudnick, Oriol Vinyals, Greg Corrado, Macduff Hughes, and Jeffrey Dean. 2016. Google's Neural Machine Translation System: Bridging the Gap between Human and Machine Translation. arXiv:1609.08144 [cs.CL].

[1-B] Alexandr Andoni, Piotr Indyk, Thijs Laarhoven, Ilya P. Razenshteyn, and Ludwig Schmidt. Practical and optimal LSH for angular distance. *CoRR*, abs/1509.02897, 2015.

[2-B] Sunil Arya and David M Mount. Approximate nearest neighbor queries in fixed dimensions. In *SODA*, volume 93, pages 271-280.

[3-B] Rajesh Bordawekar, Bortik Bandyopadhyay, and Oded Shmueli. Cognitive database: A step towards endowing relational databases with artificial intelligence capabilities. *CoRR*, abs/1712.07199, 2017.

[4-B] Rajesh Bordawekar and Oded Shmueli. Enabling cognitive intelligence queries in relational databases using low-dimensional word embeddings. *CoRR*, abs/1603.07185, 2016.

[5-B] Rajesh Bordawekar and Oded Shmueli. Using word embedding to enable semantic queries in relational databases. In Sebastian Schelter and Reza Zadeh, editors, *Proceedings of the $1^{st}$ Workshop on Data Management for End-to-End Machine Learning, DEEM@SIGMOD 2017*, Chicago, IL, USA, May 14, 2017, pages 5:1-5:4. ACM, 2017.

[6-B] Stefan Brecheisen, Hans-Peter Kriegel, and Martin Pfeifle. Efficient similarity search on vector sets. *Datenbanksysteme in Business, Technologie und Web*, 11. Fachtagung des GIFachbereichs "Datenbanken und Informationssysteme" (*DBIS*), 2005.

[7-B] Yingwei Cui, Jennifer Widom, and Janet L. Wiener. Tracing the lineage of view data in a warehousing environment. *ACM Trans. Database Syst.*, 25(2):179-227, June 2000.

[8-B] Aristides Gionis, Piotr Indyk, and Rajeev Motwani. 1999. Similarity search in high dimensions via hashing. In *Proceedings of the $25^{th}$ International Conference on Very Large Data Bases* (VLDB '99), page 518-529, San Francisco, CA, USA, 1999. Morgan Kaufmann Publishers Inc.

[9-B] Ruiqi Guo, Sanjiv Kumar, Krzysztof Choromanski, and David Simcha. Quantization based fast inner product search. In *Artificial Intelligence and Statistics*, pages 482-490. PMLR, 2016.

[10-B] Michael E Houle and Michael Nett. Rank-based similarity search: Reducing the dimensional dependence. *IEEE transactions on pattern analysis and machine intelligence*, 37(1):136-150, 2014.

[11-B] Herve Jegou, Matthijs Douze, and Cordelia Schmid. Product quantization for nearest neighbor search. *IEEE transactions on pattern analysis and machine intelligence*, 33(1):117-128, 2010.

[12-B] Michael Leybovich and Oded Shmueli. ML based provenance in databases. In Bingsheng He, Berthold Reinwald, and Yingjun Wu, editors, *AIDB@VLDB 2020, 2nd International Workshop on Applied AI for Database Systems and Applications, Held with VLDB 2020*, Monday, Aug. 31, 2020, Online Event/Tokyo, Japan, 2020.

[13-B] Yu A Malkov and Dmitry A Yashunin. Efficient and robust approximate nearest neighbor search using hierarchical navigable small world graphs. *IEEE transactions on pattern analysis and machine intelligence*, 42(4):824-836, 2018.

[14-B] Tomas Mikolov, Kai Chen, Greg Corrado, and Jeffrey Dean. Efficient estimation of word representations in vector space. In Yoshua Bengio and Yann LeCun, editors, *1st International Conference on Learning Representations, ICLR 2013*, Scottsdale, Arizona, USA, May 2-4, 2013, *Workshop Track Proceedings*, 2013.

[15-B] Tomas Mikolov, Ilya Sutskever, Kai Chen, Gregory S. Corrado, and Jeffrey Dean. Distributed representations of words and phrases and their compositionality. In Christopher J. C. Burges, Léon Bottou, Zoubin Ghahramani, and Kilian Q. Weinberger, editors, *Advances in Neural Information Processing Systems 26: 27th Annual Conference on Neural Information Processing Systems 2013. Proceedings of a meeting held Dec. 5-8, 2013*, Lake Tahoe, Nevada, United States, pages 3111-3119, 2013.

[16-B] Tomas Mikolov, Wen-tau Yih, and Geoffrey Zweig. Linguistic regularities in continuous space word representations. In Lucy Vanderwende, Hal Daumé III, and Katrin Kirchhoff, editors, *Human Language Technologies: Conference of the North American Chapter of the Association of Computational Linguistics, Proceedings*, Jun. 9-14, 2013, Westin Peachtree Plaza Hotel, Atlanta, Georgia, USA, pages 746-751. The Association for Computational Linguistics, 2013.

[17-B] Marius Muja and David G Lowe. Scalable nearest neighbor algorithms for high dimensional data. *IEEE transactions on pattern analysis and machine intelligence*, 36(11):2227-2240, 2014.

[18-B] Kohei Sugawara, Hayato Kobayashi, and Masajiro Iwasaki. On approximately searching for similar word embeddings. In *Proceedings of the 54th Annual Meeting of the Association for Computational Linguistics (Volume 1: Long Papers)*, pages 2265-2275, Berlin, Germany, August 2016. Association for Computational Linguistics.

[1-C] Pierre Senellart, Louis Jachiet, and D I Ens. ProvSQL: Provenance and Probability Management in PostgreSQL. *Vldb*, pages 2034-2037, 2018.

[1-D] Charu C Aggarwal, Alexander Hinneburg, and Daniel A Keim. On the surprising behavior of distance metrics in high dimensional space. In *International conference on database theory*, pages 420-434. Springer, 2001.

[2-D] Alexandr Andoni, Piotr Indyk, Thijs Laarhoven, Ilya P. Razenshteyn, and Ludwig Schmidt. Practical and optimal LSH for angular distance. *CoRR*, abs/1509.02897, 2015.

[3-D] Sunil Arya and David M Mount. Approximate nearest neighbor queries in fixed dimensions. In *SODA*, volume 93, pages 271-280. Citeseer, 1993.

[4-D] Martin Aumüller, Erik Bernhardsson, and Alexander Faithfull. Ann-benchmarks: A benchmarking tool for approximate nearest neighbor algorithms. *Information Systems*, 87:101374, 2020.

[5-D] Stefan Brecheisen, Hans-Peter Kriegel, and Martin Pfeifle. Efficient similarity search on vector sets. *Datenbanksysteme in Business, Technologie und Web*, 11. Fachtagung des GIFachbereichs "Datenbanken und Informationssysteme"(*DBIS*), 2005.

[6-D] Aristides Gionis, Piotr Indyk, and Rajeev Motwani. Similarity search in high dimensions via hashing. In *Proceedings of the 25th International Conference on Very*

Large Data Bases, VLDB '99, page 518–529, San Francisco, CA, USA, 1999. Morgan Kaufmann Publishers Inc.

[7-D] Ruiqi Guo, Sanjiv Kumar, Krzysztof Choromanski, and David Simcha. Quantization based fast inner product search. In *Artificial Intelligence and Statistics*, pages 482-490. PMLR, 2016.

[8-D] Ruiqi Guo, Philip Sun, Erik Lindgren, Quan Geng, David Simcha, Felix Chern, and Sanjiv Kumar. Accelerating large-scale inference with anisotropic vector quantization. In *International Conference on Machine Learning*, pages 3887-3896. PMLR, 2020.

[9-D] Michael E Houle and Michael Nett. Rank-based similarity search: Reducing the dimensional dependence. *IEEE transactions on pattern analysis and machine intelligence*, 37(1):136-150, 2014.

[10-D] Herve Jegou, Matthijs Douze, and Cordelia Schmid. Product quantization for nearest neighbor search. *IEEE transactions on pattern analysis and machine intelligence*, 33(1):117-128, 2010.

[11-D] Matt J. Kusner, Yu Sun, Nicholas I. Kolkin, and Kilian Q. Weinberger. From word embeddings to document distances. In Francis R. Bach and David M. Blei, editors, *Proceedings of the 32nd International Conference on Machine Learning, ICML 2015, Lille, France, 6-11 Jul. 2015*, volume 37 of *JMLR Workshop and Conference Proceedings*, pages 957-966. JMLR.org, 2015.

[12-D] Michael Leybovich and Oded Shmueli. ML based provenance in databases. In Bingsheng He, Berthold Reinwald, and Yingjun Wu, editors, *AIDB@VLDB 2020, 2nd International Workshop on Applied AI for Database Systems and Applications, Held with VLDB 2020, Monday, Aug. 31, 2020, Online Event/Tokyo, Japan*, 2020.

[13-D] David G Lowe. Distinctive image features from scale-invariant keypoints. *International journal of computer vision*, 60(2):91-110, 2004.

[14-D] Yu A Malkov and Dmitry A Yashunin. Efficient and robust approximate nearest neighbor search using hierarchical navigable small world graphs. *IEEE transactions on pattern analysis and machine intelligence*, 42(4):824-836, 2018.

[15-D] Tomas Mikolov, Kai Chen, Greg Corrado, and Jeffrey Dean. Efficient estimation of word representations in vector space. In Yoshua Bengio and Yann LeCun, editors, *1st International Conference on Learning Representations, ICLR 2013, Scottsdale, Arizona, USA, May 2-4, 2013, Workshop Track Proceedings*, 2013.

[16-D] Tomas Mikolov, Wen-tau Yih, and Geoffrey Zweig. Linguistic regularities in continuous space word representations. In Lucy Vanderwende, Hal Daumé III, and Katrin Kirchhoff, editors, *Human Language Technologies: Conference of the North American Chapter of the Association of Computational Linguistics, Proceedings, Jun. 9-14, 2013, Westin Peachtree Plaza Hotel, Atlanta, Georgia, USA*, pages 746-751. The Association for Computational Linguistics, 2013.

[17-D] Marius Muja and David G Lowe. Scalable nearest neighbor algorithms for high dimensional data. *IEEE transactions on pattern analysis and machine intelligence*, 36(11):2227-2240, 2014.

[18-D] Jeffrey Pennington, Richard Socher, and Christopher D. Manning. Glove: Global vectors for word representation. In *Empirical Methods in Natural Language Processing (EMNLP)*, pages 1532-1543, 2014.

[19-D] Pauli Virtanen, Ralf Gommers, Travis E. Oliphant, Matt Haberland, Tyler Reddy, David Cournapeau, Evgeni Burovski, Pearu Peterson, Warren Weckesser, Jonathan Bright, Stefan J. van der Walt, Matthew Brett, Joshua Wilson, K. Jarrod Millman, Nikolay Mayorov, Andrew R. J. Nelson, Eric Jones, Robert Kern, Eric Larson, C J Carey, ilhan Polat, Yu Feng, Eric W. Moore, Jake VanderPlas, Denis Laxalde, Josef Perktold, Robert Cimrman, Ian Henriksen, E. A. Quintero, Charles R. Harris, Anne M. Archibald, Antônio H. Ribeiro, Fabian Pedregosa, Paul van Mulbregt, and SciPy 1.0 Contributors. SciPy 1.0: Fundamental Algorithms for Scientific Computing in Python. *Nature Methods*, 17:261-272, 2020.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant records and vectors will be developed and the scope of the terms record and vector are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method for reducing processing time of at least one hardware processor searching a dataset by executing a search engine based on computing lineage for result records of a query for execution on the dataset, comprising:
   managing a dataset of a plurality of records stored on at least one a data server, each record associated with at least one set of vectors of real numbers that encode an approximation of lineage of the respective record, the at least one set of vectors computed by an encoding process,
   wherein the lineage of a certain record includes a plurality of records of the dataset whose existence led to the existence of the certain record by a sequence of database operations;
   by the at least one hardware processor:
      receiving said query transmitted from at least one client terminal over a communication network;
      accessing, through said communication network, at least one data server storing said dataset;
      conducting a two-phase search, wherein:
         in a first phase:
            instructing the search engine to execute the query on the dataset to identify at least one result record;
            computing at least one set of result vectors comprising lineage for the at least one result record using the encoding process and/or by executing operations on sets, of vectors, of records according to the query;
         in a second phase:
            instructing the search engine to execute a search, using the at least one set of result vectors, on the plurality of sets of vectors of records of the dataset to identify a subset of target records such that each is associated with a target set of vectors that is statistically similar to the at least one set of result vectors of the at least one result record, wherein said searching based on said statistical similarity reduces execution time of said searching;
         wherein the statistical similarity is computed between a target set of vectors and a set of result vectors by considering each of the target set of vectors and the set of result vectors as a respective single unit;
         outputting a subset of the plurality of target records of the dataset corresponding to the identified subset of target records, the subset of the plurality of target records having a likelihood of contributing to the existence of the at least one result record in response to execution of the query by the search engine,
      wherein each set of the target set of vectors and the set of result vectors includes at least two members; and
      feeding the outputted subset to at least one of an automated alert generation process and an automated analysis process for detection and/or corrections of errors of the records.

2. The computer implemented method of claim 1, further comprising:
   converting, for each dataset record, the at least one set of vectors to a single long vector;
   converting the at least one set of vectors computed for the at least one result record to a single long vector;
   wherein searching comprises searching a plurality of single long vector of the plurality of records to identify a subset of long vectors associated with the plurality of records such that each long vector is statistically similar to the single long vector computed for the at least one result record.

3. The method of claim 1, wherein the query comprises insertion of a new record into the dataset, computing comprises computing at least one set of vectors for the new record formed by an encoding process, annotating the new record with the at least one set of vectors computed for the new record, and inserting the annotated new record into the dataset.

4. The method of claim 1, wherein the query comprises at least one operation executed on the plurality of records to generate at least one result record, computing comprises computing the at least one set of vectors for the at least one result record by executing the at least one operation on the at least one set of vectors of the plurality of dataset records according to the query.

5. The method of claim 4, wherein the at least one operation comprises an OR operator indicating alternative use of data, and computing the at least one set of vectors for the at least one result record comprises computation of a lineage embedding of two records using the OR operator.

6. The method of claim 5, wherein the lineage embedding of two records using the OR operator is computed by:
   computing a union vector set by a union operation between the at least one set of vectors of the first record and the at least one set of vectors of the second record;

when the number of vector members of the union vector set is greater than a maximum allowed number of vectors, clustering the vector members of the union vector set into clusters, wherein the number of clusters is set according to the maximum allowed number of vectors, and setting the lineage embedding as at least one set of vectors that includes vectors of centroids of the clusters, wherein the number of vectors of centroids matches the maximum allowed number of vectors.

7. The method of claim 4, wherein the at least one operation comprises an AND operator indicating joint use of data, and computing the at least one set of vectors for the at least one new record comprises computation of a lineage embedding of two records using the AND operator.

8. The method of claim 7, wherein the lineage embedding of two records using the AND operator is computed by:
computing a Cartesian product of the at least one set of vectors of the first record and the at least one set of vectors of the second record, to obtain a set of pairs of vectors;
computing a respective average vector for each pair of vectors of the Cartesian product, and
setting the lineage embedding as at least one set of vectors that includes a plurality of average vectors.

9. The method of claim 1, wherein the at least one set of vectors for each of the plurality of records of the dataset is computed by:
obtaining a corpus of the dataset;
converting words of records of the corpus into a single text unit; and
training a word embedding model on the single text unit, wherein the encoding process comprises the word embedding model that is trained.

10. The method of claim 9, further comprising:
for each respective record:
feeding each of a plurality of words of the respective record into the word embedding model to obtain a plurality of word vectors;
computing an intra and inter-field weighted average over the word vectors of each word of the respective record, and
setting the at least one set of vectors as the intra and inter-field weighted average.

11. The method of claim 1, wherein each column of each record is associated with at least one set of vectors.

12. The method of claim 1, further comprising verifying the subset of the plurality of records, by applying the query to the subset of the plurality of records in the identified subset of records, the subset of the plurality of records having a likelihood of contributing to the existence of the at least one result record in response to execution of the query.

13. The method of claim 1, wherein a respective record of the plurality of dataset records is associated with a respective timestamp indicating when the respective record was created, and further comprising at least one of: (i) filtering out from the identified subset of records, records which are non-lineage records according to their later timestamps, and (ii) filtering out, from the identified subset of records, records which fall outside the target time interval from the searching.

14. The method of claim 1, further comprising:
analyzing the query to identify at least one column of interest, and
wherein the searching is performed by assigning larger weights to records having the at least one column of interest.

15. The method of claim 1, further comprising:
storing for each respective record, at least one previous query where the respective record was involved in the evaluation of the at least one previous query and/or where the at least one previous query inserted the respective record; and
using the stored at least one previous query for filtering out records that are similar to the identified subset of records but that were not involved in the evaluation of the query.

16. The method of claim 1, further comprising:
tracking dependencies between queries in a directed acyclic graph (DAG) structure, wherein during searching, weights assigned to the identified subset of records are inversely proportional to a distance on the DAG between the query and other queries that created records corresponding to the identified subset.

17. The method of claim 1, wherein the searching is performed by balancing a minimum squared Euclidean distance between a vector from the set of vectors associated with a record of the dataset and a vector from the set of vectors associated with the at least one result record, and an average of squared Euclidean distances for pairs of vectors including one vector from the set of vectors associated with a record of the dataset and one vector from the set of vectors associated with the at least one result record.

18. The method of claim 1, wherein the searching is performed by balancing between a maximum cosine similarity between a vector from the set of vectors associated with a record of the dataset and a vector from the set of vectors associated with the at least one result record, and an average of pair-wise cosine similarities for pairs of vectors including one vector from the set of vectors associated with a record of the dataset and one vector from the set of vectors associated with the at least one result record.

19. A method for reducing processing time of at least one hardware processor searching a dataset by executing a search engine, comprising:
by the at least one hardware processor executing said search engine:
receiving a search query transmitted from at least one client terminal over a communication network, said search query comprising at least one set of result vectors for searching on a dataset of a plurality of records, each record including at least one target set of vectors of real numbers that encode an approximation of lineage of the respective record, wherein the lineage of a certain record includes a plurality of records of the dataset whose existence led to the existence of the certain record by a sequence of database operations;
accessing, through said communication network, at least one data server storing said dataset;
converting, for each record, the at least one set of vectors to single long vector;
conducting a two-phase search, wherein:
in a first phase:
instructing the search engine to execute the query on the dataset to identify at least one result record;
converting the at least one set of result vectors computed for a database query's at least one output record comprising a lineage encoding set of vectors to a single long vector;
in a second phase:
instructing the search engine to execute a search on a plurality of single long vectors of the plurality of records to identify a subset in which each long vector is statistically similar to the single long vector computed for the database query, wherein the statistical similarity is computed between a target set of vectors and a set of result vectors by considering each of the target set and the set of result vectors as a respective single unit in the form of the single long vector, wherein said searching based on said statistical similarity reduces execution time of said searching;

outputting the at least one set of vectors and the associated records of the identified subset being statistically similar to the at least one set of vectors of the search query, wherein each set of the target set of vectors and the set of result vectors includes at least two members; and feeding the outputted subset to at least one of an automated alert generation process and an automated analysis process for detection and/or corrections of errors of the records.

20. The method of claim 19, wherein each one of the vectors of a set of vectors is of a same dimension, and a dot product between a first single long vector computed from a first set of vectors and a second single long vector computed from a second set of vectors computes similarities between two sets corresponding to the first set of vectors and the second set of vectors.

21. The method of claim 20, wherein each single long vector includes a first component used for computation of the average of pair-wise similarities between the two sets and a second component used for computation of the maximum of the pair-wise similarities used for the searching.

22. The method of claim 21, wherein the pair-wise similarities is at least one of: (i) balancing a minimum squared Euclidean distance between a single long vector of the dataset and the single long vector of the at least one output record, and an average of squared Euclidean distances for pairs of single long vectors including one single long vector from the dataset and one single long vector from the at least one output record, and (ii) balancing between a maximum cosine similarity amongst pairs of single long vectors of the dataset, including one single long vector from the dataset and one single long vector from the at least one output record, and an average of the pair-wise cosine similarities between the pairs of single long vectors.

23. The method of claim 19, further comprising normalizing vectors in each set of vectors.

24. The method of claim 19, wherein each one of the vectors of one set of vectors is of a same dimension, and wherein the single long vector is created by concatenating a number of copies of each normalized one of the vectors of the one set of vectors, where the number of copies equals the number of vectors in the one set of vectors, wherein each vector that is concatenated is a normalized vector of the one set of vectors repeated a number of times equal to the number of vectors.

* * * * *